(12) United States Patent
Brice, Jr. et al.

(10) Patent No.: US 7,290,070 B2
(45) Date of Patent: *Oct. 30, 2007

(54) MULTIPLE LOGICAL INPUT/OUTPUT SUBSYSTEM FACILITY

(75) Inventors: Frank W. Brice, Jr., Hurley, NY (US); Janet R. Easton, Woodstock, NY (US); Charles W. Gainey, Jr., Poughkeepsie, NY (US); Steven G. Glassen, Wallkill, NY (US); Beth Glendening, Poughkeepsie, NY (US); Marten J. Halma, Poughquag, NY (US); Jeffrey P. Kubala, Poughquag, NY (US); Hans-Helge Lehmann, Weil im Schoenbuch (DE); Tan Lu, Poughkeepsie, NY (US); Allan S. Meritt, Poughkeepsie, NY (US); Kenneth J. Oakes, Wappingers Falls, NY (US); Charles E. Shapley, Salt Point, NY (US); John S. Trotter, Pleasant Valley, NY (US); Leslie W. Wyman, Poughkeepsie, NY (US); Harry M. Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 624 days.

This patent is subject to a terminal disclaimer.

(21) Appl. No.: 10/436,021

(22) Filed: May 12, 2003

(65) Prior Publication Data

US 2004/0230721 A1 Nov. 18, 2004

(51) Int. Cl.
*G06F 3/00* (2006.01)
*G03F 13/00* (2006.01)

(52) U.S. Cl. .............................. 710/37; 710/8; 710/10; 710/36; 710/38

(58) Field of Classification Search .................... 713/1, 713/100; 710/10, 8, 36–38
See application file for complete search history.

(56) References Cited

U.S. PATENT DOCUMENTS

| 3,693,161 A | 9/1972 | Price et al. ............... 340/172.5 |
| 4,207,609 A | 6/1980 | Luiz et al. ................. 364/200 |

(Continued)

OTHER PUBLICATIONS

"Method And Apparatus For A Non-Disruptive Recovery Of A Single Partition In A Multipartitioned Data Processing System", U.S. Appl. No. 10/043,489, filed Jan. 11, 2002.

(Continued)

*Primary Examiner*—Kim Huynh
*Assistant Examiner*—Joshua D. Schneider
(74) *Attorney, Agent, or Firm*—John E. Campbell; Blanche E. Schiller, Esq.; Heslin Rothenberg Farley & Mesiti P.C.

(57) ABSTRACT

An input/output subsystem is configured as a plurality of input/output subsystem images, each of which appears to a program as an independent input/output subsystem. An input/output subsystem image is identified by an input/output subsystem image identifier, which is used by various programs to designate the particular input/output subsystem image for which an I/O operation is to be performed. An input/output subsystem image includes, for instance, one or more input/output paths. An input/output path of an input/output subsystem image is identified by an input/output path identifier, as well as a physical input/output path identifier.

46 Claims, 27 Drawing Sheets

U.S. PATENT DOCUMENTS

| | | | |
|---|---|---|---|
| 4,564,903 A | 1/1986 | Guyette et al. | 364/300 |
| 4,843,541 A | 6/1989 | Bean et al. | 364/200 |
| 5,170,472 A | 12/1992 | Cwiakala et al. | 395/275 |
| 5,185,736 A | 2/1993 | Tyrrell et al. | 370/55 |
| 5,297,262 A | 3/1994 | Cox et al. | 395/325 |
| 5,317,739 A | 5/1994 | Elko et al. | 395/650 |
| 5,414,851 A | 5/1995 | Brice, Jr. et al. | 395/650 |
| 5,452,455 A | 9/1995 | Brown et al. | 395/700 |
| 5,526,484 A | 6/1996 | Casper et al. | 395/200.14 |
| 5,537,574 A | 7/1996 | Elko et al. | 396/468 |
| 5,548,791 A | 8/1996 | Casper et al. | 395/858 |
| 5,564,040 A | 10/1996 | Kubala | 395/497.04 |
| 5,568,648 A | 10/1996 | Coscarella et al. | 395/862 |
| 5,584,039 A | 12/1996 | Johnson et al. | 395/826 |
| 5,600,805 A | 2/1997 | Fredericks et al. | 395/825 |
| 5,640,603 A | 6/1997 | Meritt et al. | 395/858 |
| 5,644,712 A | 7/1997 | Coscarella et al. | 395/200.01 |
| 5,680,580 A | 10/1997 | Beardsley et al. | 395/489 |
| 5,793,983 A | 8/1998 | Albert et al. | 395/200.69 |
| 5,845,146 A | 12/1998 | Onodera | 395/822 |
| 5,907,684 A | 5/1999 | Halma et al. | 395/200.67 |
| 5,996,026 A | 11/1999 | Onodera et al. | 710/3 |
| 6,125,411 A | 9/2000 | Sato | 710/38 |
| 6,195,330 B1 | 2/2001 | Sawey et al. | 370/220 |
| 6,240,467 B1 | 5/2001 | Beardsley et al. | 710/5 |
| 6,397,260 B1 | 5/2002 | Wils et al. | 709/238 |
| 6,996,638 B2 * | 2/2006 | Brice et al. | 710/36 |
| 2004/0083356 A1 | 4/2004 | Chatterjee et al. | 713/1 |
| 2004/0230783 A1 * | 11/2004 | Brice et al. | 713/1 |

OTHER PUBLICATIONS

"Method And Apparatus For Obtaining Multiple Port Addresses By A Fibre Channel From A Network Fabric", U.S. Appl. No. 10/006,948, filed Dec. 3, 2001.

"z/Architecture—Principles of Operation," SA22-7832-01, International Business Machines Corporation, Second Edition, Oct. 2001.

"z/Series—Input/Output Configuration Program User's Guide for IYP IOCP," SB10-7029-03, International Business Machines, Fourth Edition, Aug. 2002, Chapter 2.

* cited by examiner

WHEN OC=0 (ADD CHPID TO I/O-CONFIGURATION DEFINITION)
  CSSID SPECIFIES CSS IMAGE WHERE CHPID IS TO BE ADDED.
  IF CSSID IS NOT VALID,
    PROVIDE APPROPRIATE RESPONSE CODE.
  PCHID SPECIFIES PHYSICAL CHANNEL PATH TO WHICH CHPID
    WILL BIND.
  IF PCHID IS NOT VALID,
    PROVIDE APPROPRIATE RESPONSE CODE.
  IF PCHID IS ALREADY ADDED TO I/O-CONFIGURATION
    DEFINITION, PROVIDE APPROPRIATE RESPONSE CODE.
  CHECKING OK, ADD CHPID TO CSS IMAGE.
    SUCCESSFUL RESPONSE CODE INDICATED.

*fig. 5C*

WHEN OC=1 (MODIFY CHPID) AND OCQ=7 (ADD CSS-IMAGE ACCESS)
  CSSID SPECIFIES TARGET CSS IMAGE WHERE CHPID SHOULD
    NOT EXIST, AND IS TO BE ADDED.
  RCSSID SPECIFIES A REFERENCE CSS IMAGE WHERE A
    CHPID-TO-PCHID DEFINITION ALREADY EXISTS
  IF CSSID IS NOT VALID,
    PROVIDE APPROPRIATE RESPONSE CODE.
  IF RCSSID IS NOT VALID,
    PROVIDE APPROPRIATE RESPONSE CODE.
  IF CSSID=RCSSID,
    PROVIDE APPROPRIATE RESPONSE CODE.
  IF CHPID NOT IN CSS IMAGE SPECIFIED BY RCSSID,
    PROVIDE APPROPRIATE RESPONSE CODE.
  IF CHPID ALREADY IN CSS IMAGE SPECIFIED BY CSSID,
    PROVIDE APPROPRIATE RESPONSE CODE.
  IF CHPID IN RCSSID IS NOT SPANNABLE CHANNEL-PATH TYPE,
    PROVIDE APPROPRIATE RESPONSE CODE.
  IF CHPID IN RCSSID IS SPANNABLE BUT NOT DEFINED AS
    SHARED, PROVIDE APPROPRIATE RESPONSE CODE.
  CHECKING OK, ADD CHPID TO CSS IMAGE(CSSID) AND BIND TO
    PCHID ALREADY BOUND TO CHPID IN REFERENCE CSS IMAGE
    (RCSSID). SUCCESSFUL RESPONSE CODE INDICATED.

*fig. 5D*

```
WHEN OC=1 (MODIFY CHPID) AND OCQ=8 (DELETE CSS-IMAGE ACCESS)
   CSSID SPECIFIES TARGET CSS IMAGE WHERE CHPID SHOULD
      EXIST, AND IS TO BE DELETED.
   IF CSSID IS NOT VALID,
      PROVIDE APPROPRIATE RESPONSE CODE.
   IF CHPID NOT IN CSS IMAGE SPECIFIED BY CSSID,
      PROVIDE APPROPRIATE RESPONSE CODE.
   IF CHPID IN CSS IMAGE SPECIFIED BY CSSID IS NOT
      DECONFIGURED, PROVIDE APPROPRIATE RESPONSE CODE.
   IF CHPID IN CSS IMAGE SPECIFIED BY CSSID IS LAST
      CHPID.PCHID BIND, PROVIDE APPROPRIATE RESPONSE CODE.
   CHECKING OK, DELETE CHPID FROM CSS IMAGE (CSSID).
      SUCCESSFUL RESPONSE CODE INDICATED.
```

*fig. 5E*

```
WHEN OC=2 (DELETE CHPID FROM I/O-CONFIGURATION DEFINITION)
   IF CSSID IS NOT VALID,
      PROVIDE APPROPRIATE RESPONSE CODE.
   IF CHPID NOT IN CSS IMAGE SPECIFIED BY CSSID,
      PROVIDE APPROPRIATE RESPONSE CODE
   IF CHPID IN CSS IMAGE SPECIFIED BY CSSID IS NOT
      DECONFIGURED, PROVIDE APPROPRIATE RESPONSE CODE.
   IF CHPID IN CSS IMAGE SPECIFIED BY CSSID IS NOT LAST
      CHPID.PCHID BIND, PROVIDE APPROPRIATE RESPONSE CODE.
   CHECKING OK, DELETE CHPID FROM CSS IMAGE (CSSID).
      SUCCESSFUL RESPONSE CODE INDICATED.
```

*fig. 5F*

WHEN OC=0 (ADD CU TO I/O-CONFIGURATION DEFINITION, INITIAL ADD
   OF CU TO IOCD)
   CSSID SPECIFIES CSS IMAGE OF CHPID(S) TO ATTACH TO CU
   IF CSSID IS NOT VALID,
      PROVIDE APPROPRIATE RESPONSE CODE.
   IF CHPID NOT DEFINED IN CSS IMAGE (CSSID),
      PROVIDE APPROPRIATE RESPONSE CODE.
   CHECKING OK, LINK SPECIFIED CHPID(s) TO CU.
      SUCCESSFUL RESPONSE CODE INDICATED.

fig. 6E

WHEN OC=1 (MODIFY CU) AND OCQ=6 (ADD CU-IMAGE TO CSS IMAGE)
   CSSID SPECIFIES CSS IMAGE OF CHPID(s) TO ASSOCIATE
      WITH CU
   IF CSSID IS NOT VALID,
      PROVIDE APPROPRIATE RESPONSE CODE.
   IF CHPID NOT DEFINED IN CSS IMAGE (CSSID),
      PROVIDE APPROPRIATE RESPONSE CODE.
   IF CU ALREADY DEFINED IN CSS IMAGE (CSSID),
      PROVIDE APPROPRIATE RESPONSE CODE.
   CHECKING OK, LINK SPECIFIED CHPID(s) TO CU.
      SUCCESSFUL RESPONSE CODE INDICATED.

fig. 6F

```
WHEN OC=1 (MODIFY CU) AND OCQ=7 (DELETE CU-IMAGE FROM
    CSS IMAGE)
    IF CSSID IS NOT VALID,
        PROVIDE APPROPRIATE RESPONSE CODE.
    IF CU NOT DEFINED IN CSS IMAGE (CSSID),
        PROVIDE APPROPRIATE RESPONSE CODE.
    IF CU DEFINED ONLY IN CSS IMAGE (CSSID),
        PROVIDE APPROPRIATE RESPONSE CODE
    CHECKING OK, BREAK LINK BETWEEN CU AND CHPID(s) IN
        CSS IMAGE. SUCCESSFUL RESPONSE CODE INDICATED.
``` fig. 6G

```
WHEN OC=2 (DELETE CU)
    IF CSSID IS NOT VALID,
        PROVIDE APPROPRIATE RESPONSE CODE.
    IF CU NOT DEFINED IN CSS IMAGE (CSSID),
        PROVIDE APPROPRIATE RESPONSE CODE.
    IF CU LINKED IN OTHER CSS IMAGES,
        PROVIDE APPROPRIATE RESPONSE CODE.
    CHECKING OK, BREAK LINK BETWEEN CU AND CHPID(s) IN
        CSS IMAGE. SUCCESSFUL RESPONSE CODE INDICATED.
``` fig. 6H

```
WHEN OC=0 (ADD I/O DEVICE)
   SUBCHANNELS ARE ADDED TO THE TARGET CSS IMAGE (CSSID).
   IF CSSID IS NOT VALID,
      PROVIDE APPROPRIATE RESPONSE CODE.
   IF A CU SPECIFIED IS NOT ACCESSIBLE FROM CSS IMAGE (CSSID),
      PROVIDE APPROPRIATE RESPONSE CODE.
   IF A SPECIFIED I/O DEVICE IS ALREADY ATTACHED TO THE
      CSS IMAGE (CSSID),
      PROVIDE APPROPRIATE RESPONSE CODE.
   MCSS CHECKING OK, ADD DEVICE.
      SUCCESSFUL RESPONSE CODE INDICATED.
```

*fig. 7E*

```
WHEN OC=1 (MODIFY I/O DEVICE) AND OCQ=6 (ADD SCH-IMAGE TO CSS IMAGE)
   SUBCHANNELS ARE ADDED TO THE TARGET CSS IMAGE (CSSID) AND
      I/O-DEVICE CHARACTERISTICS REPLICATED FROM REFERENCED CSS IMAGE
      (RCSSID).
   IF CSSID IS NOT VALID,
      PROVIDE APPROPRIATE RESPONSE CODE.
   IF RCSSID IS NOT VALID,
      PROVIDE APPROPRIATE RESPONSE CODE.
   IF RCSSID=CSSID,
      PROVIDE APPROPRIATE RESPONSE CODE.
   IF CU SPECIFIED IS NOT ACCESSIBLE FROM CSS IMAGE (CSSID),
      PROVIDE APPROPRIATE RESPONSE CODE.
   IF A SPECIFIED I/O DEVICE IS ALREADY ATTACHED TO THE CSS IMAGE (CSSID),
      PROVIDE APPROPRIATE RESPONSE CODE.
   MCSS CHECKING OK, ADD DEVICE.
      SUCCESSFUL RESPONSE CODE INDICATED.
```

*fig. 7F*

```
WHEN OC=1 (MODIFY I/O DEVICE) AND OCQ=7 (DELETE SCH-IMAGE FROM CSS IMAGE)
  SUBCHANNELS ARE DELETED FROM THE TARGET CSS IMAGE (CSSID)
  IF CSSID IS NOT VALID,
      PROVIDE APPROPRIATE RESPONSE CODE.
  I/O DEVICE NOT DEFINED IN OTHER CSS IMAGES,
      PROVIDE APPROPRIATE RESPONSE CODE.
  MCSS CHECKING OK, DELETE DEVICE.
      SUCCESSFUL RESPONSE CODE INDICATED.
```

*fig. 7G*

```
WHEN OC=2 (MODIFY I/O DEVICE)
  SUBCHANNELS ARE DELETED FROM THE TARGET CSS IMAGE (CSSID)
  IF CSSID IS NOT VALID,
      PROVIDE APPROPRIATE RESPONSE CODE.
  I/O DEVICE DEFINED IN OTHER CSS IMAGES,
      PROVIDE APPROPRIATE RESPONSE CODE.
  MCSS CHECKING OK, DELETE DEVICE.
      SUCCESSFUL RESPONSE CODE INDICATED.
```

*fig. 7H*

REQUEST BLOCK FOR SET DOMAIN ATTRIBUTES

MULTIPLE LOGICAL INPUT/OUTPUT SUBSYSTEM FACILITY

CROSS-REFERENCE TO RELATED APPLICATIONS

This application contains subject matter which is related to the subject matter of the following applications, each of which is assigned to the same assignee as this application. Each of the below listed applications is hereby incorporated herein by reference in its entirety:

"MANAGING INPUT/OUTPUT SUBSYSTEM IMAGES OF AN INPUT/OUTPUT SUBSYSTEM," Brice et al., Ser. No. 10/435773, filed herewith;

"METHOD, SYSTEM AND PROGRAM PRODUCTS FOR ENHANCING INPUT/OUTPUT PROCESSING FOR OPERATING SYSTEM IMAGES OF A COMPUTING ENVIRONMENT," Brice et al., Ser. No. 10/435975, filed herewith;

"METHOD, SYSTEM AND PROGRAM PRODUCTS FOR IDENTIFYING COMMUNICATIONS ADAPTERS OF A COMPUTING ENVIRONMENT," Brice et al., Ser. No. 10/436385, filed herewith;

"MANAGING ACCESS, BY OPERATING SYSTEM IMAGES OF A COMPUTING ENVIRONMENT, OF INPUT/OUTPUT RESOURCES OF THE COMPUTING ENVIRONMENT," Brice et al., Ser. No. 10/436240, filed herewith; and "SHARING COMMUNICATIONS ADAPTERS ACROSS A PLURALITY OF INPUT/OUTPUT SUBSYSTEM IMAGES," Brice et al. Ser. No. 10/435955, filed herewith.

TECHNICAL FIELD

This invention relates, in general, to input/output (I/O) processing, and in particular, to extending the functionality of input/output subsystems used in I/O processing.

BACKGROUND OF THE INVENTION

In various computing systems, such as the eServer zSeries, S/370-XA, ESA/370 and ESA/390 systems, offered by International Business Machines Corporation, Armonk, N.Y., each system footprint, referred to as a central processing complex (CPC), is limited to a maximum configuration of 256 I/O paths, such as, for example, 256 channel paths. One of the reasons for the constraint is that the unique identifier for each channel path configured to the CPC, referred to as the Channel Path Identifier (CHPID), is defined as an 8-bit binary number, which provides 256 unique CHPID values from zero to 255. Since this value is only 8-bits, only 256 paths with unique identifications are possible. One solution is to increase the size of the CHPID; however, this has serious consequences for the many programs that use the CHPID.

This 256-channel path limitation has restricted the ability to provide significant increases in the overall CPC in terms of the maximum processing capacity of the central processors provided by the CPC. Further, computing systems are being created in which the total computing capacity of the systems is increasing past the point where 256 channel paths are sufficient in order to provide adequate I/O bandwidth and I/O configuration flexibility necessary to fully utilize the increased numbers of central processors.

Thus, a need exists for a capability to extend the functionality of an input/output subsystem. In one example, a need exists for a facility that can provide more than 256 I/O paths in a manner that is minimally disruptive to the programs using the paths.

SUMMARY OF THE INVENTION

The shortcomings of the prior art are overcome and additional advantages are provided through the provision of a method of extending the functionality of input/output subsystems. The method includes, for instance, configuring an input/output subsystem as a plurality of input/output subsystem images, wherein an input/output subsystem image appears to a program as an independent input/output subsystem.

In one embodiment, the input/output subsystem includes a plurality of input/output paths, and wherein an input/output subsystem image of the plurality of input/output subsystem images includes a unique subset of the plurality of input/output paths of the input/output subsystem.

In a further embodiment, a program to configure the input/output subsystem is aware of the plurality of input/output subsystem images, while one or more other programs have no knowledge of the plurality of input/output subsystem images, but still exploit one or more input/output subsystem images.

System and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIGS. 5c-5f depict various checks that are performed during execution of the change channel path configuration command, in accordance with an aspect of the present invention;

FIGS. 6e-6h illustrate various checks that are performed during execution of the change control unit configuration command, in accordance with an aspect of the present invention;

FIGS. 7e-7h depict various checks that are performed during execution of the change I/O device configuration command, in accordance with an aspect of the present invention;

BEST MODE FOR CARRYING OUT THE INVENTION

In accordance with an aspect of the present invention, a multiple logical input/output (I/O) subsystem facility is provided in which a physical input/output subsystem is configured as a plurality of input/output subsystem images in order to logically expand the functionality of the input/output subsystem. A configured I/O subsystem image appears to a program (e.g., an operating system) as an independent input/output subsystem.

Figure 1A:
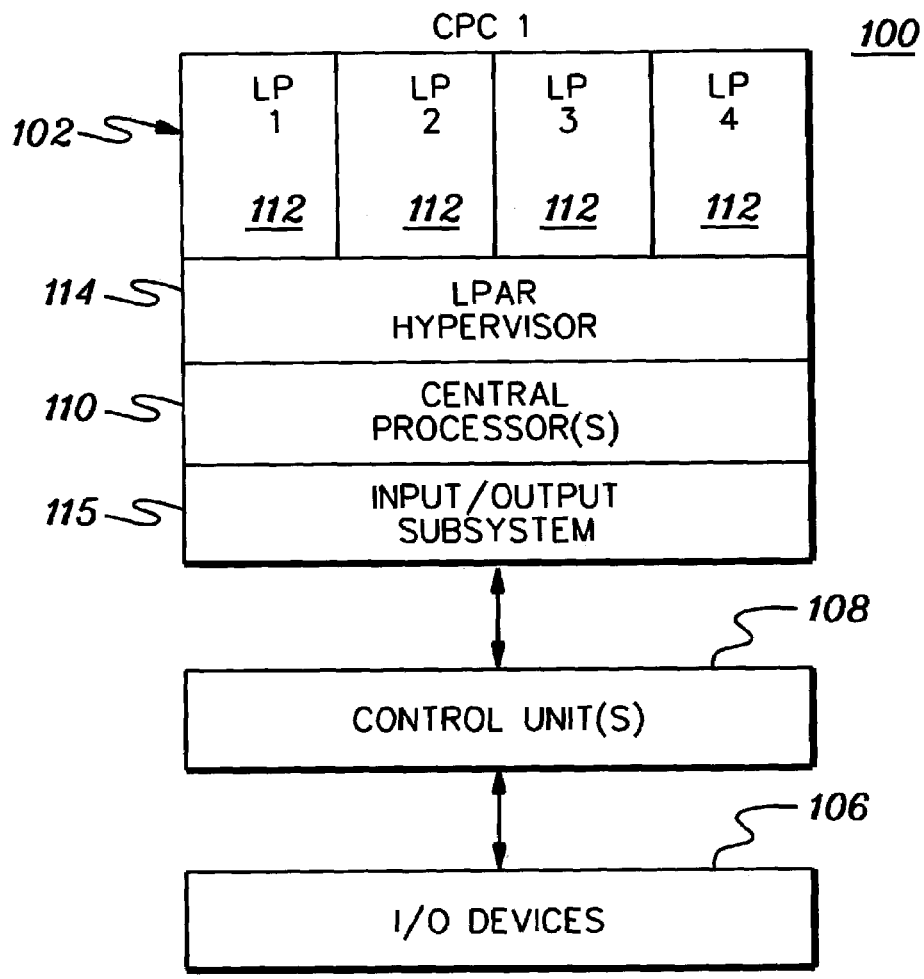
FIG. 1a depicts one embodiment of a computing environment to incorporate and use one or more aspects of the present invention.

One embodiment of a computing environment to incorporate and use one or more aspects of the present invention is described with reference to FIG. 1a. In one example, computing environment 100 is based on the z/Architecture, offered by International Business Machines Corporation, Armonk, N.Y. The z/Architecture is described in an IBM Publication entitled "z/Architecture Principles of Operation," Publication No. SA22-7832-01, October 2001, which is hereby incorporated herein by reference in its entirety.

As one example, computing environment 100 includes a central processor complex (CPC) 102 coupled to one or more input/output (I/O) devices 106 via one or more control units 108. Central processor complex 102 includes, for instance, one or more central processors 110, one or more partitions 112 (e.g., logical partitions (LP)), a logical partition hypervisor 114, and an input/output subsystem 115, each of which is described below.

Central processors 110 are physical processor resources allocated to the logical partition. In particular, each logical partition 112 has one or more logical processors, each of which represents all or a share of a physical processor 110 allocated to the partition. The logical processors of a particular partition 112 may be either dedicated to the partition, so that the underlying processor resource 110 is reserved for that partition; or shared with another partition, so that the underlying processor resource is potentially available to another partition.

A logical partition functions as a separate system and has one or more applications and a resident operating system therein, which may differ for each logical partition. In one embodiment, the operating system is the z/OS operating system, the z/VM operating system, the z/Linux operating system or the TPF operating system, offered by International Business Machines Corporation, Armonk, N.Y.

Logical partitions 112 are managed by a logical partition hypervisor 114, which is implemented by Licensed Internal Code running on processors 110. The logical partitions and logical partition hypervisor each comprise one or more programs residing in respective partitions of central storage associated with the central processors. One example of logical partition hypervisor 114 is the Processor Resource/System Manager (PR/SM), offered by International Business Machines Corporation, Armonk, N.Y. Further details regarding logical partitions are described in, for instance, Guyette et al., U.S. Pat. No. 4,564,903, entitled "Partitioned Multiprocessor Programming System," issued on Jan. 14, 1986; Bean et al., U.S. Pat. No. 4,843,541, entitled "Logical Resource Partitioning Of A Data Processing System," issued on Jun. 27, 1989; and Kubala, U.S. Pat. No. 5,564,040, entitled "Method And Apparatus For Providing A Server Function In A Logically Partitioned Hardware Machine," issued on Oct. 8, 1996, each of which is hereby incorporated herein by reference in its entirety.

Input/output subsystem 115 directs the flow of information between input/output devices 106 and main storage. It is coupled to the central processing complex, in that it can be a part of the central processing complex or separate therefrom. The I/O subsystem relieves the central processors of the task of communicating directly with the input/output devices and permits data processing to proceed concurrently with input/output processing. To provide communications, the I/O subsystem employs I/O communications adapters. There are various types of communications adapters including, for instance, channels, I/O adapters, PCI cards, Ethernet cards, Small Computer Storage Interface (SCSI) cards, etc. In the particular example described herein, the I/O communications adapters are channels, and therefore, the I/O subsystem is referred to herein as a channel subsystem. However, this is only one example. Other types of I/O subsystems can incorporate and use one or more aspects of the present invention.

Figure 1B:
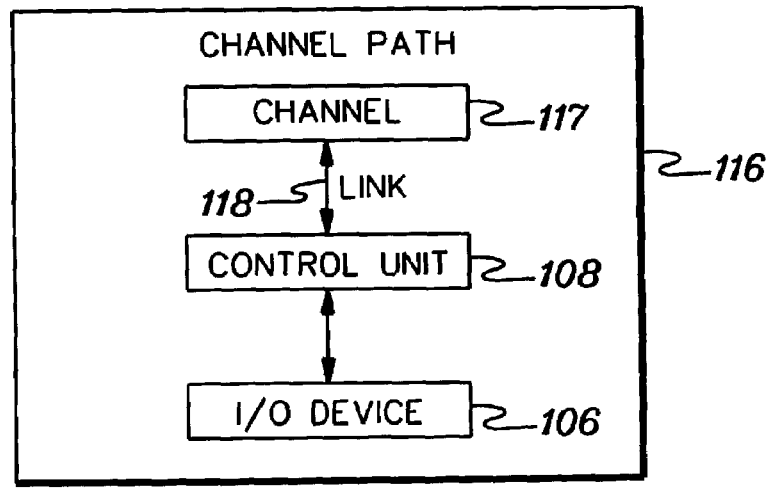
FIG. 1b depicts one example of an I/O path (e.g., a channel path) used for communications in the computing environment of FIG. 1a, in accordance with an aspect of the present invention.

The I/O subsystem uses one or more input/output paths as communication links in managing the flow of information to or from input/output devices 106. In this particular example, these paths are called channel paths, since the communications adapters are channels. Each channel path 116 (FIG. 1b) includes a channel 117 of channel subsystem 115, a control unit 108, a link 118 (e.g., serial or parallel) between the channel and control unit, and one or more I/O devices 106 coupled to the control unit. In other embodiments, channel paths may have multiple control units and/or other components. Further, in another example, it is also possible to have one or more dynamic switches as part of the channel path. A dynamic switch is coupled to a channel and a control unit and provides the capability of physically interconnecting any two links that are attached to the switch. Further details regarding channel subsystems are described in Casper et al., U.S. Pat. No. 5,526,484, entitled, "Method And System For Pipelining The Processing Of Channel Command Words," issued on Jun. 11, 1996, which is hereby incorporated herein by reference in its entirety.

A control unit may be accessible by the channel subsystem by more than one channel path. Similarly, an I/O device may be accessible by the channel subsystem through more than one control unit, each having one or more channel paths to the channel subsystem. The control unit accepts control signals from the channel subsystem, controls the timing of data transfer over the channel path, and provides indications concerning the status of the device. The control unit may be housed separately or it may be physically and logically integrated with the I/O device, the channel subsystem, or a central processor.

The I/O device attached to the control unit may be designed to perform certain limited operations, or it may perform many different operations. To accomplish its operations, the device uses detailed signal sequences peculiar to its type of device. The control unit decodes the commands received from the channel subsystem, interprets them for the particular type of device, and provides the signal sequence required for the performance of the operation.

In addition to one or more channels, a channel subsystem includes one or more subchannels. Each subchannel is provided for and dedicated to an I/O device, or group of I/O devices, coupled to the program through the channel subsystem. Each subchannel provides information concerning the associated I/O device, or group of I/O devices, and its attachment to the channel subsystem. The subchannel also provides information concerning I/O operations and functions involving the associated I/O device, or group of I/O devices. The subchannel provides a logical appearance of a device or group of devices to the program and is the means by which the channel subsystem provides information about associated I/O devices to the central processors, which obtain this information by executing I/O instructions. The subchannel has internal storage that includes information in the form of a channel command word (CCW) address, a channel path identifier, device number, count, status indication and I/O interruption subclass code, as well as information on path availability and functions pending or being performed. I/O operations are initiated with a device by the execution of I/O instructions that designate the subchannel associated with the device or devices.

Figure 1C:
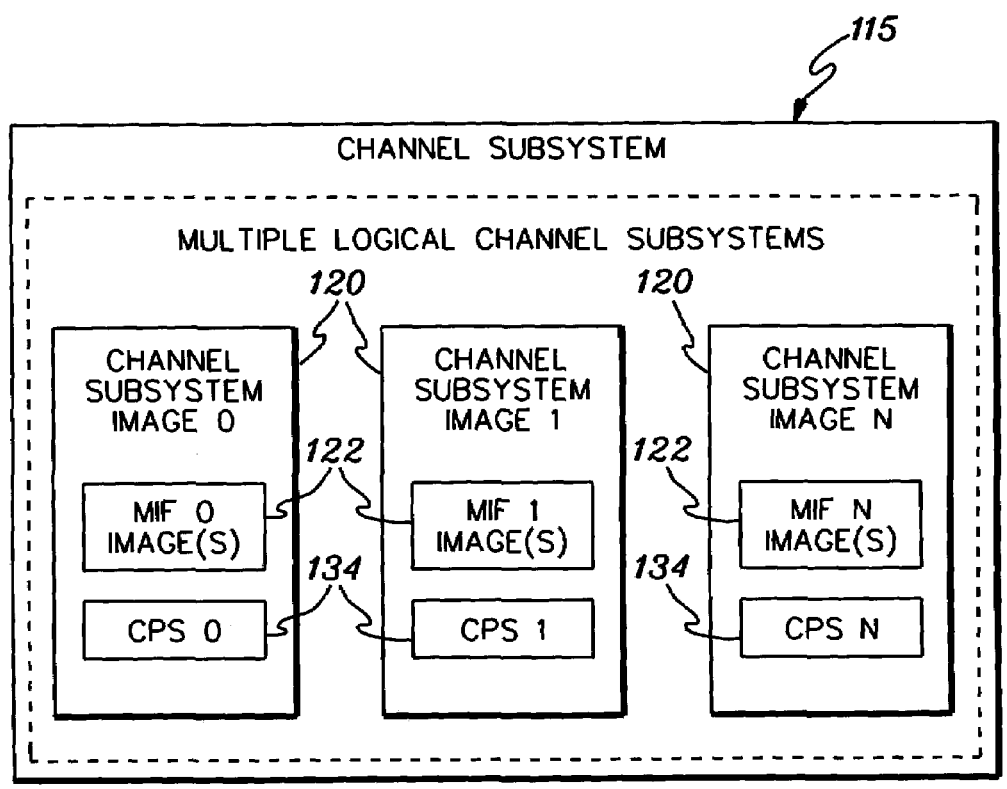
FIG. 1c depicts one embodiment of an example of an I/O subsystem (e.g., a channel subsystem) of FIG. 1a being configured as a plurality of I/O subsystem (e.g., channel subsystem) images, in accordance with an aspect of the present invention.

Further details regarding a channel subsystem are described with reference to FIG. 1c. In accordance with an aspect of the present invention, channel subsystem 115 (or other I/O subsystem) is configured as a plurality of channel subsystem images 120 (or other I/O subsystem images), each identified by a channel subsystem image identifier (CSSID) (or other I/O subsystem identifier). In one example, the channel subsystem is configured, either by model dependent means, in which configuration controls are used during initialization, or by use of appropriate dynamic I/O configuration commands, as one to 256 channel subsystem images, as described in further detail below. Each channel subsystem image appears to a program as a complete channel subsystem. Each channel subsystem image may have from 1 to 256 unique channel paths, thereby increasing the maximum number of channel paths that may be configured to the channel subsystem from 256 to 65,536.

A channel subsystem image 120 includes, for instance, a multiple image facility (MIF) 122, which includes one or more (e.g., up to 16) MIF images, each identified by a MIF image identifier (IID). The multiple image facility allows each logical partition to achieve independent access to the channel paths, control units and I/O devices that are configured to and dynamically shared by multiple logical partitions.

Figure 2:
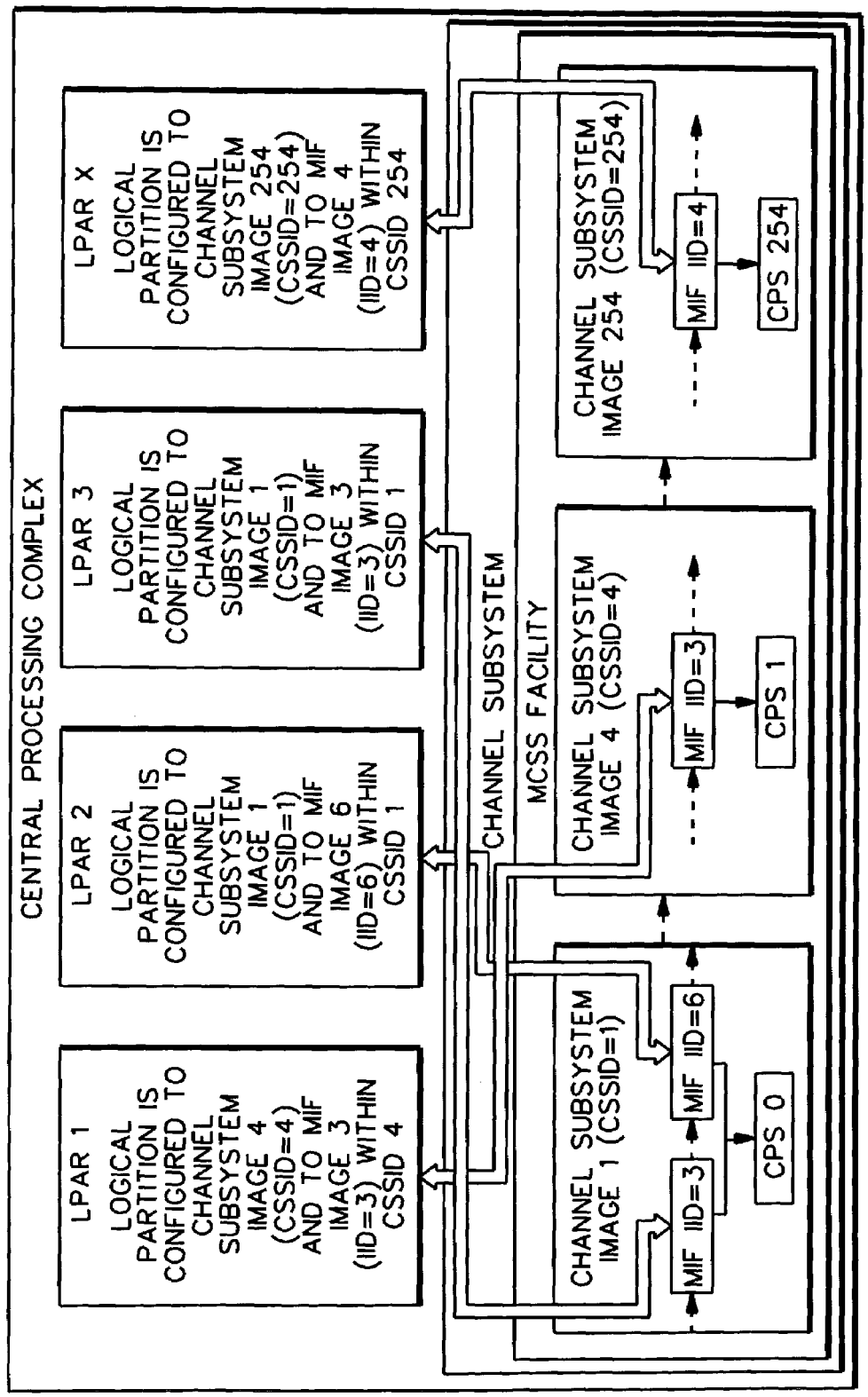
FIG. 2 depicts one embodiment of a plurality of logical partitions coupled to a plurality of channel subsystem images, in accordance with an aspect of the present invention.

As one example, each logical partition is configured to a different MIF image (see FIG. 2) in order to provide the logical partition with an independent set of controls for channel paths, control units and devices that are shared by other logical partitions. Various details regarding the multiple image facility are described in Brice, Jr. et al., U.S. Pat. No. 5,414,851, entitled "Method And Means For Sharing I/O Resources By A Plurality Of Operating Systems," issued on May 9, 1995, which is hereby incorporated herein by reference in its entirety.

Figure 1D:
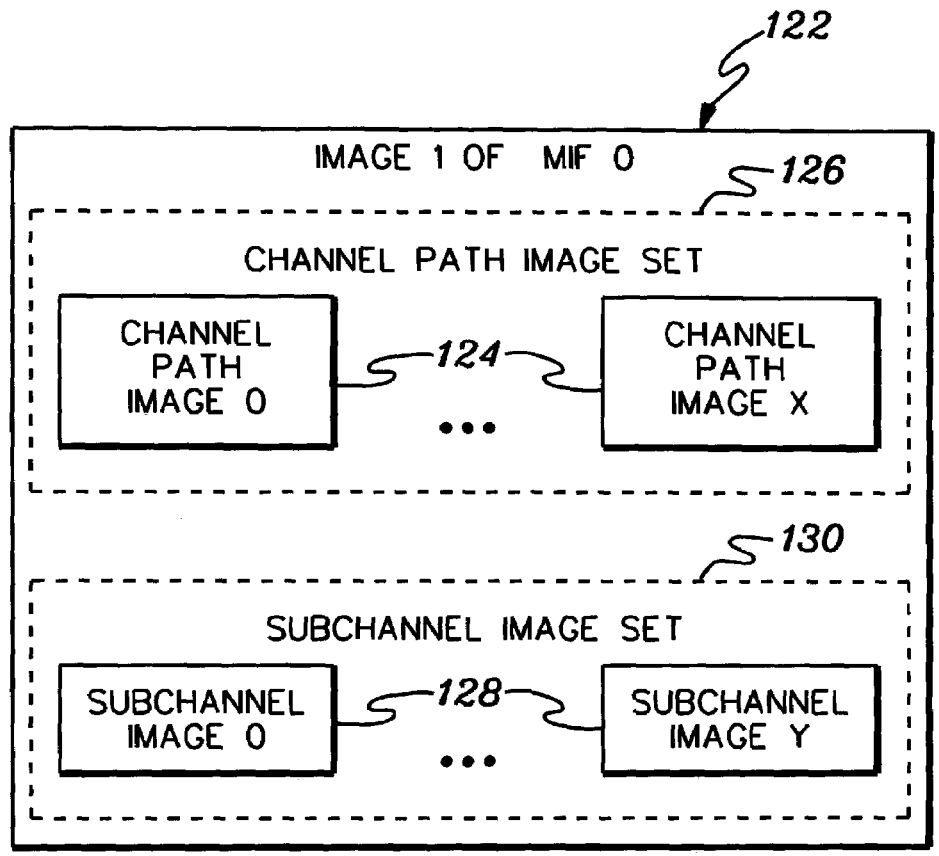
FIG. 1d depicts further details of a multiple image facility (MIF) image of a channel subsystem image of FIG. 1c, in accordance with an aspect of the present invention.

As shown in FIG. 1d, for each MIF image, a separate set of channel path controls and a separate set of subchannel controls are provided by the channel subsystem. For each MIF image, each set of channel path controls for each configured channel path is called a channel path image 124. The collection of one or more channel path images associated with the channel paths that are configured to a MIF image is called a channel path image set 126. Further, for each MIF image, a separate subchannel, called a subchannel image 128, is provided for each I/O device or group of devices that is configured to the MIF image. A collection of one or more subchannel images that are configured to a MIF image is called a subchannel image set 130.

Figure 1E:
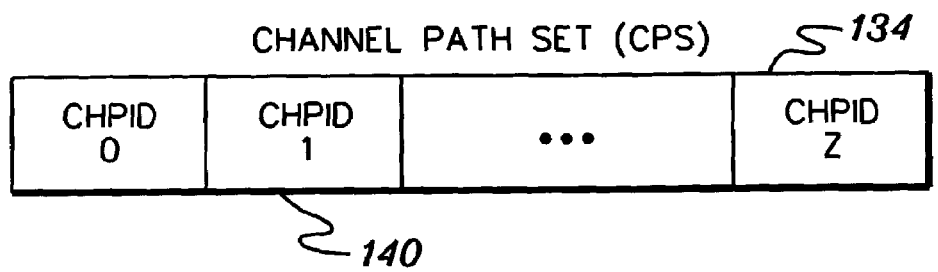
FIG. 1e depicts further details of a channel path set (CPS) of a channel subsystem image of FIG. 1c, in accordance with an aspect of the present invention.

Referring back to FIG. 1c, in addition to a MIF, a channel subsystem image 120 also includes a channel path set (CPS) 134. Channel path set 134 includes, for instance, one to 256 channel paths 140 (FIG. 1e) configured to one or more channel path images in the associated MIF. Each channel path is identified by a channel path identifier (CHPID). Each channel path configured to a channel path set may be unique from other channel paths configured to other provided channel subsystem images. However, because as many as 256 channel subsystem images may be provided, the CHPID values assigned to channel paths in each of the channel path sets may not be unique. Therefore, each channel path is specified by a unique address formed by, for instance, a concatenation of CSSID with the channel path identifier assigned to the channel path. The image ID (IID) further identifies a channel path image for each configured channel path.

With the exception of certain channel subsystem interfaces used to control the resetting and configuration of channel paths, both the CSSID and IID values may be implicitly specified for the programs operating in the logical partitions, and are therefore, transparent to the programs. For instance, instead of programs that are operating in the logical partitions specifying the CSSID, the LPAR hypervisor implicitly specifies the CSSID configured to each LPAR. This is accomplished by using a Start Interpretative Execution (SIE) facility, as described in "IBM System/370 Extended Architecture Interpretative Execution," Publication No. SA22-7095, September 1985, which is hereby incorporated herein by reference in its entirety.

In one example, for I/O instructions that execute in Start Interpretive Execution (SIE) I/O-passthru mode, the LPAR hypervisor places the CSSID value into a SIE state description, used by the hypervisor and the SIE facility, to dispatch and control the programs operating in the logical partitions. The SIE state description is, for instance, an operand to a Start Interpretative Execution (SIE) instruction that includes various fields subsequently used to interpretively start an I/O instruction, in a manner that causes the CSSID value and other associated parameters to be passed to the channel subsystem transparently to the program operating in the logical partition or virtual machine. These fields include, for instance, the following:

(a) CSS-Authorization-Vector Origin (CAVO): When the MCSS facility is installed, this field includes a host-absolute/real address that when not zero points to an authorization vector that serves the dual purpose of enabling access to channel subsystem images, and specifying the default MIF image identifier to be used in association with the CSS image. The initial state of CAVO is zero. When a Multiple Channel Subsystem Enhanced (MCSSE) facility (described below) is enabled via a Set Domain Attributes CHSC command (also described below), the CPC places a non-zero CAVO in the SIE state description. When the MCSSE facility is disabled, the CAVO is set to zero. Therefore, the enablement of the MCSSE facility may be determined from the value of the CAVO.

The CSS-authorization vector includes a model dependent number of entries, with each entry corresponding to one CSS image, where entry zero corresponds to CSS image zero, entry one corresponds to CSS image one, and so on. The number of entries is equal to one plus the value of the highest CSSID provided on the machine, with the latter provided in the response of a Store Channel Subsystem Characteristics command (described below), when the MCSS facility is provided by the CPC. When an entry contains the number zero, the CSS image corresponding to the entry is not accessible. However, when an entry contains a non-zero number, that number is used as the MIF-image identifier in association with the CSS image. When a CSS image is accessible, its CSSID and corresponding IID may be specified in certain I/O or CHSC instructions or for other uses, by or on behalf of the program operating in a logical partition or virtual machine. For I/O instructions, the CSSID and IID are specified in a subsystem identifier (SID) and other implied operands.

When the CAVO is zero, the program operating in the logical partition or virtual machine, can access only the default channel subsystem, and thus, specifies a CSSID of zero in the SID.

(b) Default Channel Subsystem Image Identifier (CSSID): This field includes the default channel subsystem image identifier associated with the program operating in the logical partition or virtual machine.

(c) MIF Image Identifier: This field includes the default MIF image identifier associated with the program operating in a logical partition or virtual machine.

During the execution of high frequency I/O instructions that have an I/O passthru facility, the SIE I/O instruction passthru interpretation extensions for MCSS implicitly transmit the CSSID from the active SIE state description to the channel subsystem just as if the CSSID was specified in general register one, which is an implied operand for some I/O instructions. This implicit specification is also provided for the IID value.

For infrequently executed I/O instructions, execution of the instruction by the program operating in the logical partition causes the LPAR hypervisor to gain control, which stores the proper CSSID value (as well as the proper MIF IID value) into general register 1, and re-executes the I/O instruction on behalf of the program operating in the logical partition in a manner that is transparent to the program.

One type of instruction that uses general register 1 as an implied operand includes those instructions that reference a subchannel. For those I/O instructions, general register 1 includes a subsystem identification word (SID). In accordance with an aspect of the present invention, the subsystem identification word includes, for instance, the following fields:

(1) Channel Subsystem Id (CSSID), which specifies a binary number of the channel subsystem image containing the referenced subchannel;

(2) MIF IID, which specifies a binary number of the MIF image within the channel subsystem image containing the referenced subchannel. I/O instructions that expect an IID in the subsystem identification word (SID) are extended to expect a specification of the CSSID value of the associated channel subsystem image;

(3) Subchannel Number, which specifies a binary number of the subchannel within the specified channel subsystem image to be used for the function specified by the I/O instruction; and (4) Multiple Channel Subsystem Bit (M), which indicates whether the CSSID is checked for validity. When M is one, the CSSID field is checked for a valid CSSID. If valid, the value in the CSSID field becomes the effective CSSID. If not valid, an appropriate response code may be stored. When M is zero, the default CSSID is the effective CSSID and the CSSID field is zero. In one example, this field is only used when MCSSE is enabled As described above, in one example, the channel subsystem id specified in the subsystem identification word (and other request blocks) is checked for validity before it becomes an effective CSSID. When a valid CSSID is specified, the specified CSSID is the effective CSSID. When a CSSID is not specified, a default CSSID is used as the effective CSSID.

In one example, to check for validity, a CSSID of a SID is subject to range, existence and authorization checking. (A CSSID elsewhere in a program request block may or may not be subject to authorization checking.)

Range checking includes, for instance, verifying that the CSSID value is between a range of zero and h, where h is the highest CSSID provided on the model (e.g., 255).

Existence checking, in one example, verifies that a valid CSSID is defined in the I/O configuration definition, and thus, is in the configuration of the CPC. In one example, a Store Configuration Component List command (described below) is used to obtain the list of CSSID values provided on the CPC.

Authorization checking includes, for instance, verifying that a MIF-image combination (a channel subsystem image that has an associated MIF image), as identified by its CSSID, is authorized for use by a program in a logical partition. To successfully pass the authorization check, the CSSID-authorization vector of the logical partition is to have a CAV entry that represents the MIF-image combination.

There are various subchannel related I/O instructions, which use a SID and which the LPAR hypervisor and SIE MCSS extensions apply. These include, for instance, Cancel Subchannel, Clear Subchannel, Diagnose-CSI, Halt Subchannel, Modify Subchannel, Resume Subchannel, Signal Adapter, Start Subchannel, Store Subchannel, and Test Subchannel.

Other non-subchannel related I/O instructions are similarly enhanced to allow the CSSID for the target channel subsystem image to be specified in a manner that is transparent to the programs operating in the logical partitions. They include, for instance:

(a) Store Channel Report Word—With this instruction, general register 1 includes a CSSID identifying the channel subsystem image from which a channel report is to be retrieved. In one example, when a condition affecting multiple channel subsystem images is recognized, multiple channel report words (CRWs) may be made pending, one CRW for each of the affected channel subsystem images. In this case, multiple store channel report word instructions are issued to retrieve the CRWs.

(b) Reset Channel Path—The channel path reset facility is signaled to perform the channel path reset function on the channel path image designated by the contents of general register 1. In one example, general register 1 includes the channel subsystem image id identifying the channel subsystem image containing the designated channel path. In addition, general register 1, as observed by the LPAR hypervisor, when the CPC is operating in LPAR mode, includes a MIF image identifier designating the MIF image of the channel path to be reset. Additionally, a channel path identifier is specified designating the channel path image on which the channel path reset function is to be performed.

The LPAR hypervisor is responsible for ensuring that a valid CSSID is specified and to simulate an operand exception if the CSSID is not valid.

As described above, MCSS enables a channel subsystem to provide more than 256 channel paths. However, the software (e.g., operating systems and associated applications) using the channel subsystem only support up to 256 channel paths. This is due to the fact that the software is designed to support I/O path identifiers (e.g., CHPID values) that are 8-bit binary numbers, thereby providing 256 unique values from zero to 255.

Changing the size of the CHPID value would have serious consequences on the many programs using the CHPID. Thus, in accordance with an aspect of the present invention, a capability is provided that allows the hardware to have more than 256 channel paths, but does not require the software to support more than 256 CHPID numbers. In particular, a capability is provided that enables the hardware to identify a specific channel that is independent of the way the software identifies the same channel. In order to accomplish this, a capability is provided for identifying physical channels and for assigning logic CHPID numbers to those same physical channels.

To identify a physical channel, a physical channel identifier (PCHID) is assigned by the computer system to each possible location that can support a channel card or that can provide I/O or a logical interface. As examples, I/O connectivity includes S/390 I/O (e.g., ESCON or FICON, networking, and coupling interfaces); and logical interfaces, which include cryptographic attachments.

In one embodiment, a 16 bit value is used for the PCHID; however, many other values may be used. To assign the PCHID values to physical channels, a technique is used that employs the actual physical properties of the machine. For instance, sixteen PCHID values are assigned for each I/O slot because the most dense I/O card, in this example, provides sixteen interfaces. However, the technique is versatile in that new values can be added to the original sixteen per slot, if a more dense I/O card is provided.

Although one assignment technique is described herein, any assignment technique can be used to assign the PCHID values, as long as the technique is predictable and repeatable, so that other applications that support the machine can duplicate the assignments. One such application is an Order Process. For instance, when a new machine is ordered or a new I/O feature is ordered for an existing machine, an Order Process tool, referred to as a configurator, uses the repeatable technique to predict the PCHID values for the new I/O cards. The user then uses these predicted values to provide a configuration definition, prior to the actual install of the new machine or features.

Figure 3:
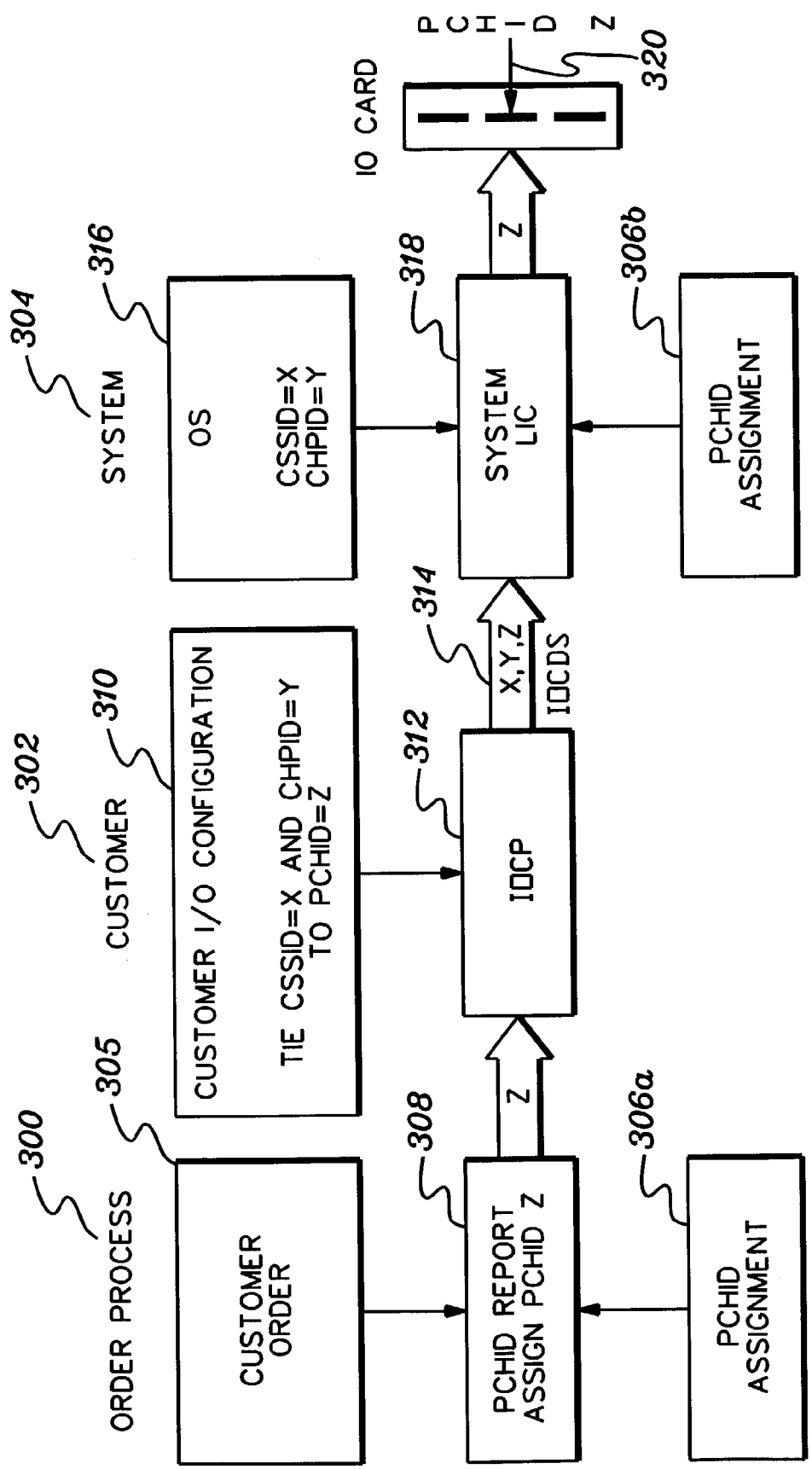
FIG. 3 depicts one embodiment of associating physical channel numbers with logical channel numbers and channel subsystem images, in accordance with an aspect of the present invention.

Further details of how the PCHID assignment technique is used are described with reference to FIG. 3. As shown, there are three cooperating entities, an Order Process 300, a Customer 302 and a System 304. Order Process 300 is used by a Customer 302 to place an order 305 for a new machine or one or more new channels. The Order Process uses a PCHID assignment technique 306a to produce a report 308 showing the PCHID assignments of the physical channels of the machine. In this particular example, PCHID Z is shown. The customer uses this report and his unique configuration requirements 310, including, for instance, logical CSS (i.e., CSSID) and CHPID number to tie the physical PCHID to the logical CSS/CHPID using IOCP 312. In this particular example, CSS X and CHPID Y are associated with PCHID Z. This association is provided to the system in the form of an IOCDS 314 from IOCP, as described in further detail below. System 304 then uses the same PCHID assignment technique 306b used by the Order Process to locate the physical channel with the PCHID value Z. So, when an operating system 316 using Logical Channel Subsystem X (i.e., Channel Subsystem Image X) wants information or to do I/O operations on CHPID Y, the system Licensed Internal Code (LIC) 318 uses the physical channel 320 located at PCHID location Z 320 to satisfy that request.

In the embodiment described herein, when a PCHID value is assigned to a location, it is fixed and only changes by controlled service functions. One example of a controlled service function is a sparing action. A sparing action is when one port or interface on an I/O card fails and as a repair, the interface is moved to another port that was previously unused. In this case, the PCHID assigned to the failing port is reassigned to the spare port and vice versa. This automatic reassignment is performed to eliminate the need to change the I/O definition.

By having a unique PCHID value for each physical channel, the software can use instructions to both define the logical associations for specific physical resources and to query the machine using logical constructs (i.e., CHPID numbers) to determine the extent of the exploitation of the physical resource. For instance, the program can determine that the same physical channel is being used by several logical channel subsystems, as illustrated in FIG. 4a.

Figure 4A:
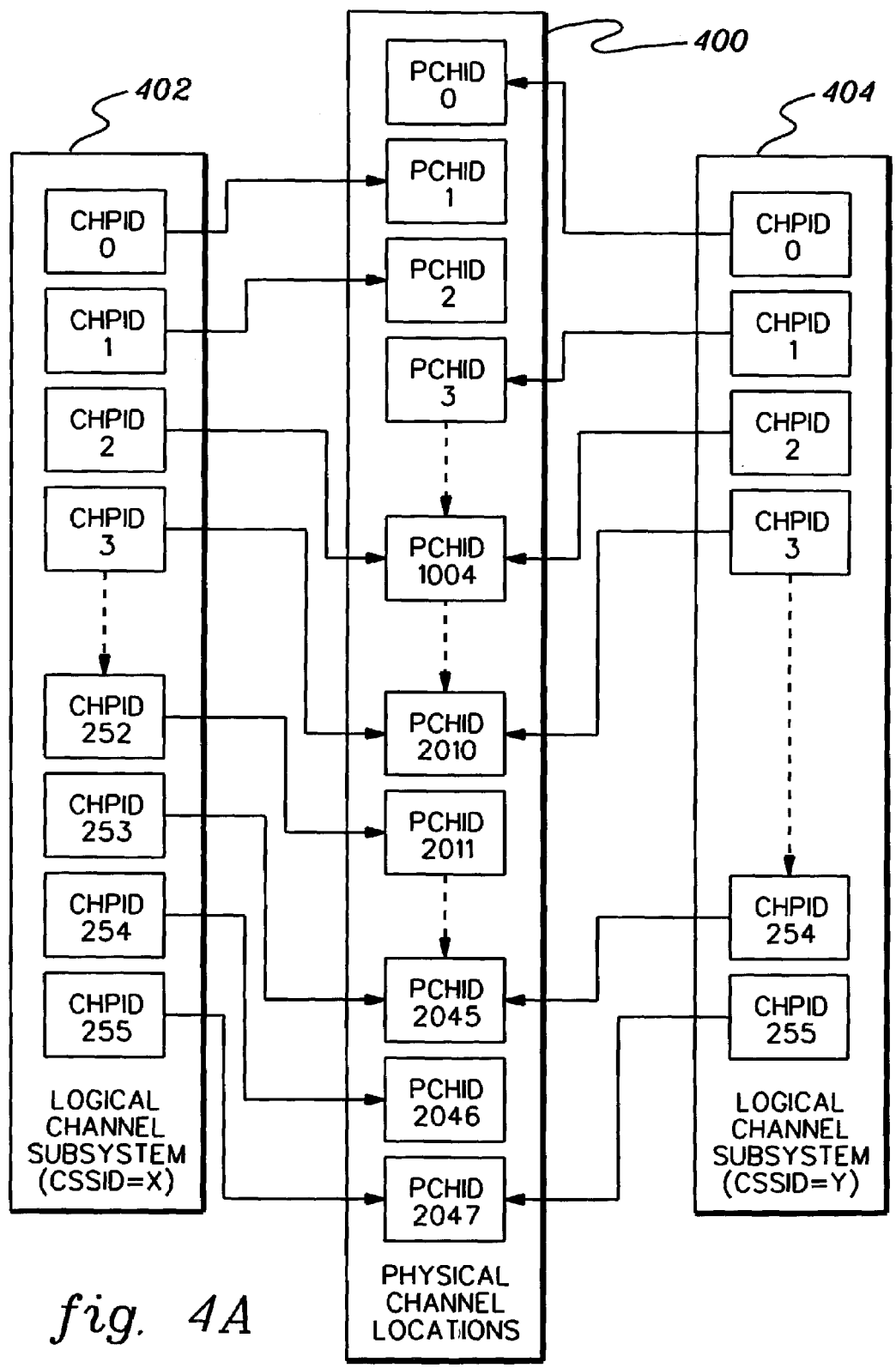
FIG. 4a illustrates one example of the same physical channel being used by two channel subsystem images, as well as different channel subsystem images having the same channel numbers (CHPIDs) that refer to different physical channels, in accordance with an aspect of the present invention.

In FIG. 4a, the center column 400 illustrates an example of a plurality of physical channels in a machine, while the left and right columns 402 and 404, respectively, show different channel subsystem images (a.k.a., logical channel subsystems). It is shown that in the case of a physical channel being used by multiple channel subsystems (i.e., spanning), the same or different logical CHPID numbers refer to the same physical channel. Further, it is shown that different logical channel subsystems may have the same CHPID numbers that refer to different physical channels.

To define the I/O configuration, a program is used, in one example, to translate human generated syntax into binary data that can be used by the machine, when it is powered on, before there is a program to exploit dynamic I/O interfaces. (Dynamic I/O is another way to define I/O, as described below.) This program is referred to as an I/O configuration program (IOCP). Various details regarding the IOCP are described in "zSeries Input/Output Configuration Program User's Guide for IYP IOCP," IBM Publication No. SB10-7029-03b, Fourth Edition, Level 03b, December 2002, which is hereby incorporated herein by reference in its entirety. The I/O configuration program builds a configuration definition from input data statements and stores the definition in an I/O configuration data set (IOCDS), which is used by the channel subsystem. In one example, the input statements include the following:

1. An ID statement, which is an optional statement that defines a heading data for I/O configuration reports;
2. A RESOURCE statement, which specifies the channel subsystem images (CSS's) and CSSIDs to be configured, and the logical partitions to be defined within each of those CSSs;
3. One or more CHPID statements used to specify channel paths;
4. One or more control unit statements (CNTLUNIT) used to specify one or more control units attached to the channel paths;
5. One or more I/O device statements (IODEVICE) used to specify one or more I/O devices assigned to the control units. In one example, up to 256 I/O devices can be defined in an I/O device statement.

In accordance with an aspect of the present invention, one or more input statements of the IOCP have been enhanced to provide for the assignment of a PCHID to a logical channel subsystem and to a logical CHPID number. For example, the CHPID statement has been enhanced by adding a subkeyword to the PATH keyword of the CHPID statement to allow the assignment of a logical CHPID number to a logical channel subsystem. Further, a new keyword, referred to as PCHID, is added to the CHPID statement, which specifies the PCHID number of the physical channel being defined. As an example, with the following statement: CHPID PATH=(CSS(1), 22), PCHID=101, the user has assigned the logical CHPID number of 22 and the Logical Channel Subsystem 1 to the physical channel located at PCHID 101.

As a further example, the CNTLUNIT statement has been enhanced to allow the definition of a single control unit to multiple logical channel subsystems. This is shown in the following statement: CNTLUNIT CUNUMBR=230, PATH=((CSS(1), 20), (CSS(2), 40)), in which control unit 230 is assigned to be accessed by CHPID 20 in CSS 1 and CHPID 40 in CSS 2.

The IOCP takes these human generated input statements (e.g., CHPID, Control Unit and I/O Device) that represent the actual channels, control units and devices that make up a given I/O configuration and generates a file, referred to as an IOCDS, which is made up of different kinds of data structures for a machine to read when it initializes. For MCSS, multiple channel subsystems are represented and the physical resources are represented in such a way that they have the ability to be either dedicated or spanned shared between channel subsystems.

One physical resource affected by MCSS is the channel. With MCSS, there are thousands of physical channels, but there are only 256 CHPIDs maintained per channel subsystem. Thus, a new data structure is created, called the PCHID member, to represent the physical channels. This structure includes the relevant physical information about the channel including, for instance: the PCHID number, the CHPID number assigned to this PCHID; the channel subsystem or systems for which PCHID is defined to have access; and for some channel types, the switch number to which this channel is connected. Because CHPID numbers may be repeated in each channel subsystem, there is a CHPID data structure for each channel subsystem. This data structure has an array of 256 entries, each entry indexed by the CHPID number. This structure also includes logical information that can vary based on the channel subsystem. This information includes, for instance: an indication that this CHPID is defined; a pointer back to the PCHID this CHPID is associated with; and a list of logical partitions that may access this CHPID. The combination of these two structures (i.e., the PCHID member and CHPID member) allows a physical channel to be dedicated or shared between logical partitions, as well as dedicated or spanned between channel subsystem images.

Figure 4B:
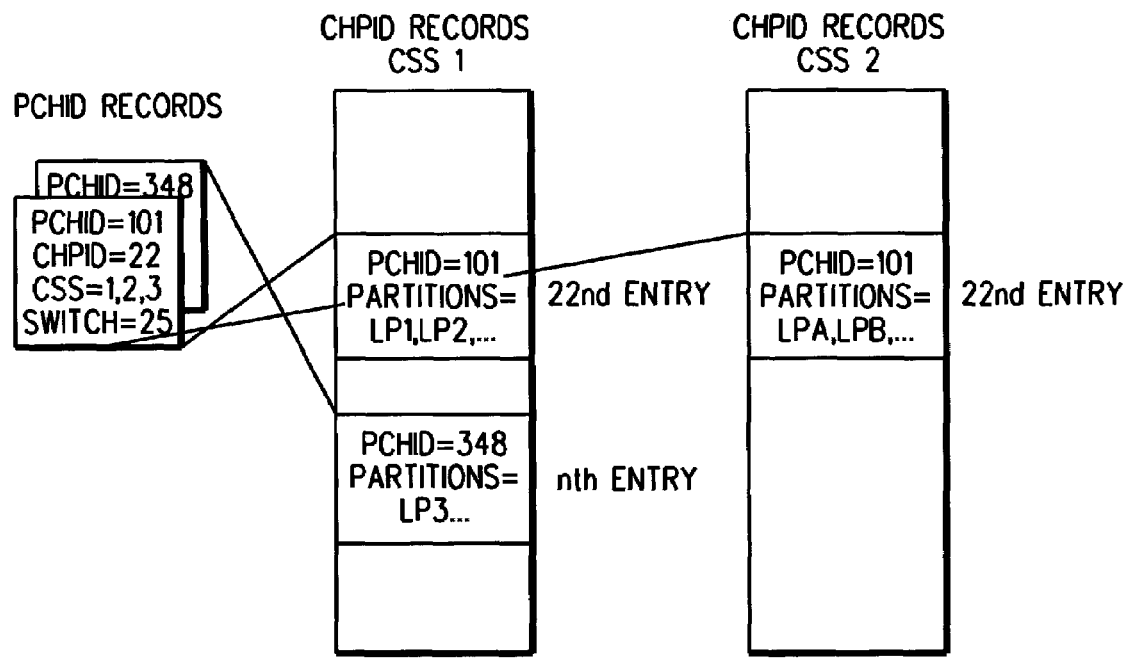
FIG. 4b is an illustration of a CHPID statement generating data structures in an I/O configuration data set (IOCDS), in accordance with an aspect of the present invention.

One example of an illustration of how a typical CHPID statement generates data structures in the IOCDS is shown in FIG. 4b. In this example, it is a spanning CHPID, or a single physical channel that is available to more than one channel subsystem image. The CHPID statement used is, for instance, CHPID PATH=(CSS(1,2,3), 22), PCHID=101, SWITCH=25. Although three channel subsystem images are referenced, only two are shown in FIG. 4b for clarity. Note that the PCHID entry of physical channel 101 points to the entry of CHPID number 22 in CSS 1, CSS 2 and CSS 3. Also, each CHPID entry points back to the physical information in the PCHID data structure.

Another resource that is affected by MCSS is the physical control unit. For this, the data structure that represents the physical control unit is expanded to include connections for multiple channel subsystems. In one example, the additional fields in the data structure are dependent on the number of channel subsystems being defined with this configuration. Thus, if one configuration has one channel subsystem, then space for eight CHPIDs and eight Link Addresses are used. But, if another configuration has four channel subsystems, then space for 32 CHPIDs and 32 Link Addresses is used.

Figure 4C:
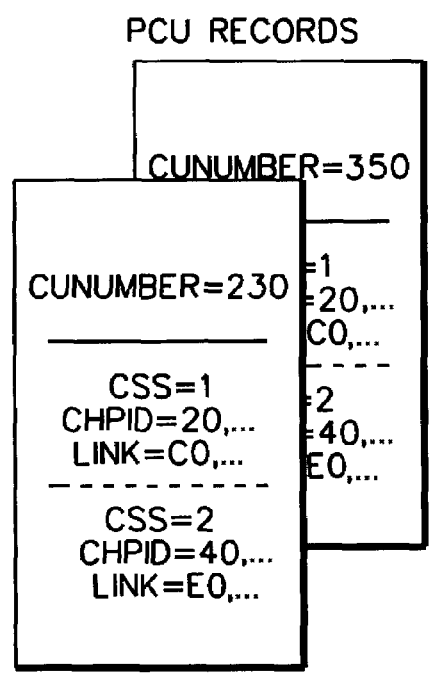
FIG. 4c illustrates the adding of additional information for channel subsystem images to a physical control unit data structure of the IOCDS, in accordance with an aspect of the present invention.

FIG. 4c illustrates one example of how additional information for each CSS is added to the physical control unit data structure. In one example, the control unit input statement is as follows: CNTLUNIT CUNUMBR=230, PATH= ((CSS(1), 20), (CSS(2), 40)), . . . . Note that the PCU data structure has entries for CSS 1 and CSS 2, but no entry for CSS 3. This is because CSS 3 does not have access to control unit 230.

Yet another resource that is represented in the IOCDS is the I/O device. Each device or group of devices is represented by a data structure called a subchannel. Since each channel subsystem has its own set of subchannels, the data structures for devices are created on a channel subsystem basis. Thus, a single device that can be accessed from three channel subsystems has at least three subchannel entries in the IOCDS, one in each of those three channel subsystems, which allow the device to be independently accessed by the programs configured to each of the channel subsystems.

Figure 4D:
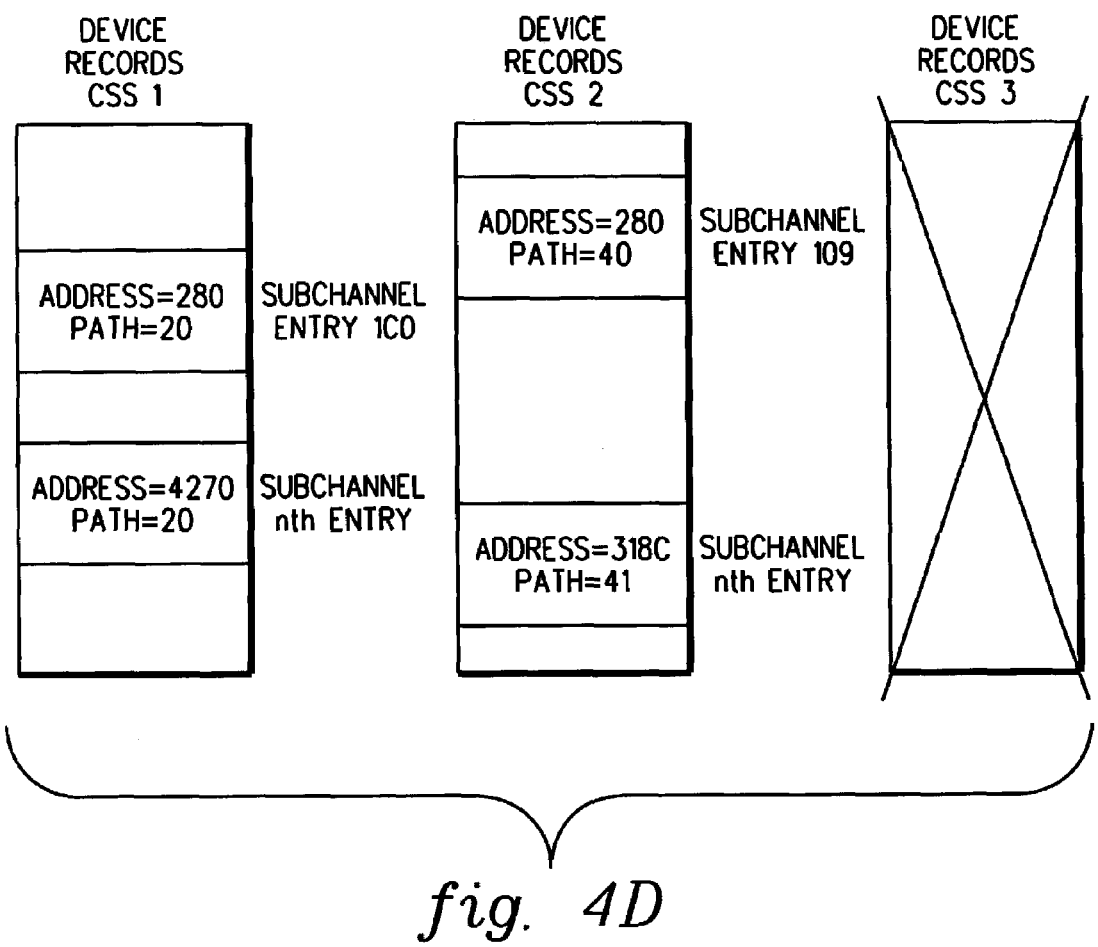
FIG. 4d illustrates that a device that is accessible by multiple channel subsystem images is represented in a subchannel data structure for each channel subsystem image, in accordance with an aspect of the present invention.

FIG. 4d illustrates that a device that is accessible for multiple channel subsystems is represented in the subchannel data structure for each channel subsystem, but that the subchannel number (index) can be different for each channel subsystem. One example of the input statement used for the I/O device is as follows: IODEVICE ADDRESS=280, CUNUMBR=230. This device is defined on a control unit with access to CSS 1 and CSS 2, but not CSS 3. Thus, there are entries in the CSS 1 and CSS 2 data structures, but no entry in the CSS 3 data structure.

Data structures for channel subsystems not defined in the configuration are not created. This keeps the space used for a given configuration to a minimum.

The I/O configuration definition process is performed for each I/O resource (e.g., channels, control units and/or devices) within a channel subsystem and that collection of input definitions is called Channel Subsystem X (a.k.a., Channel Subsystem Image X). Then, if the customer wants multiple channel subsystems, the customer would repeat the process one or more times for a collection of I/O resources and each collection is called a new channel subsystem.

The LPAR hypervisor (or the I/O configuration process) then assigns one or more channel subsystem images to each configured logical partition. In order to assign channel subsystem images to logical partitions, the SIE state description is used by the hypervisor to configure channel subsystem resources to each of the logical processors associated with each logical partition. In one example, the LPAR hypervisor assigns a default channel subsystem image to each configured logical partition. As one example, the assignment is performed via the RESOURCE statement of IOCP.

The concept of assigning a logical CHPID and CSS to a physical channel allows for the definition of several hundred or thousands of physical channels to a maximum of 256 logical CHPIDs in several logical channel subsystems. This avoids system changes that would otherwise force the operating system to support greater than 256 CHPIDs and allows machines to be built with several hundred or even thousands of physical channels.

Management of an I/O configuration definition with multiple logical channel subsystems is, in one example, accomplished from a single, authorized logical partition. Thus, at least one program in an arbitrarily specified logical partition has an awareness of the overall MCSS extensions; however, other programs are protected from being impacted by the new capabilities. This enhanced management capability does not place additional operational requirements on programs in other logical partitions, nor even on other programs in the same logical partition. Thus, the management extensions employed to support a central processing complex that has MCSS can be localized to a single program in a single logical partition; no other programs need be made aware of MCSS.

In one example, the management is performed by a manager, which is a program that is authorized to perform the commands that provide the management functions. The commands used by the manager fall, for instance, into two categories: 1) Channel Subsystem Call (CHSC) commands, and 2) Service Call Logical Processor (SCLP) commands. Within the CHSC category, a subset of commands are also known as dynamic I/O (DIO) commands in that they have the ability to change the active I/O configuration definition without requiring a restart of the CPC or channel subsystem (e.g., re-IML or a re-IPL) to make the change become effective. The DIO CHSC commands remain oriented on I/O devices, control units and channel paths; however, with MCSS there are more places where these commands can have their particular effect. Management of the extension from a single channel subsystem to multiple channel subsystem images involves, for instance:

1) Modifying the set of applicable CHSC commands to be capable of operating on a specified channel subsystem image or a group of channel subsystem images, as called for according to the particular function of each command. Prior to MCSS, such a designation was unnecessary as there was only one, implicit channel subsystem on which to operate. With MCSS, a CHSC command that specifies an I/O device, a subchannel or a channel path is subject to having a qualifying CSSID parameter added in the request or in the response, if any, of the three are reported.

2) Modifying applicable channel path reconfiguration SCLP commands and LPAR hypervisor PCCALL functions to be capable of operating on a specified channel subsystem image;

3) Creating a new authorization scheme that is used to determine which logical partition has use and/or access to which channel subsystem image. In one example, an authorization vector (e.g., CAV, described herein) is used in the authorization scheme, when MCSSE (described below) is enabled.

Various CHSC commands that are extended for MCSS are described below. Examples of these CHSC commands, without the extensions, are described in Cwiakala et al., U.S. Pat. No. 5,170,472, entitled "Dynamically Changing A System I/O Configuration Definition," issued Dec. 8, 1992, which is hereby incorporated herein by reference in its entirety. In one example, the dynamic I/O commands that are enhanced include, for instance, a Change Channel Path Configuration command, a Change Control Unit Configuration Command and a Change I/O Device Configuration command, each of which is described in detail below.

The Change Channel Path Configuration command is used to add, modify or delete the description of a channel path in the I/O configuration definition. The change channel path configuration command can be executed asynchronously and is not interpretively executed. Specification of the operation to be performed and the information used to change the I/O configuration definition that is used by the channel subsystem to control I/O or message operations are provided in a command request block.

Figure 5A:
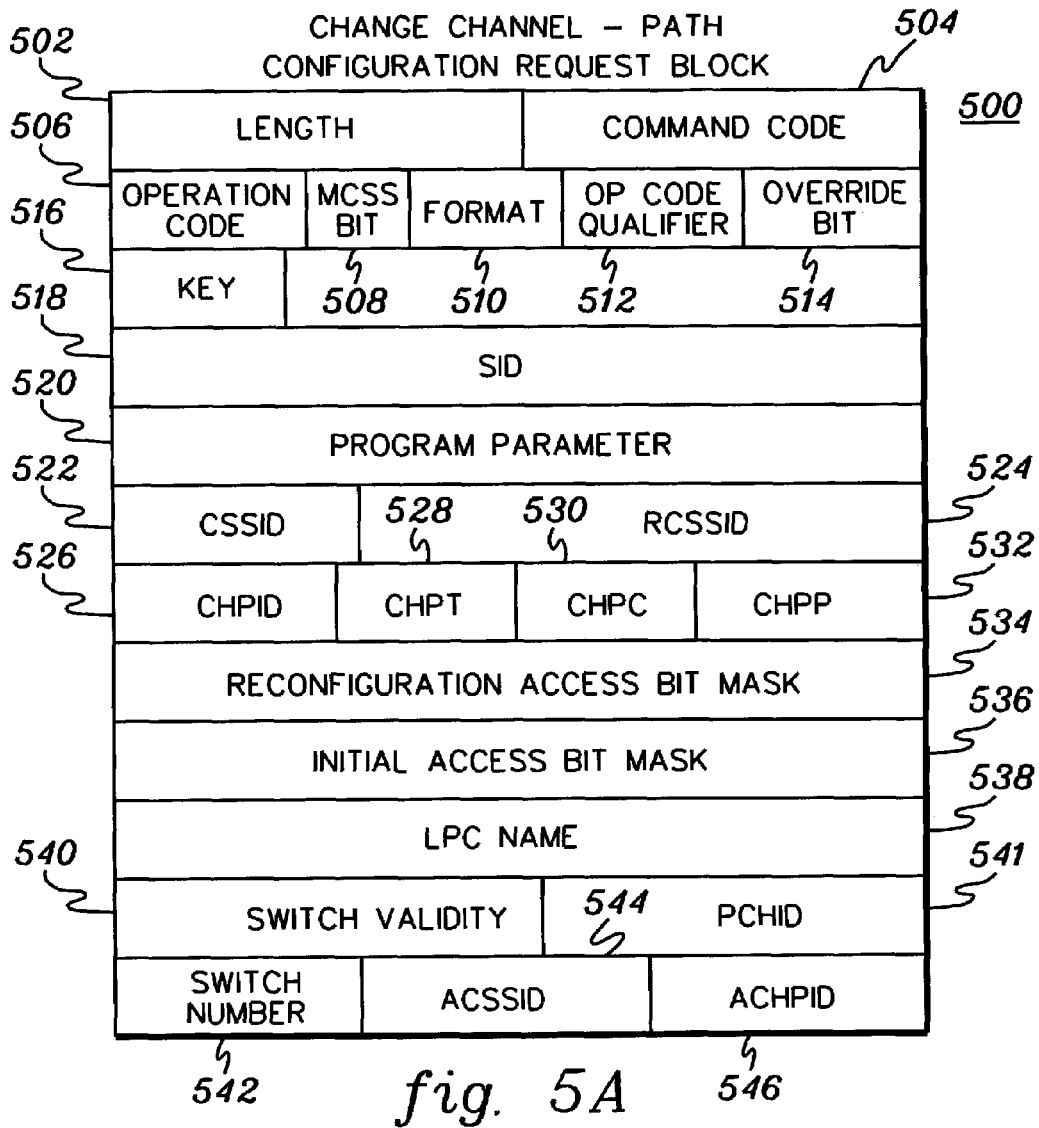
FIG. 5a depicts one embodiment of a request block for a change channel path configuration command, in accordance with an aspect of the present invention.

One example of a command request block for a change channel path configuration command is described with reference to FIG. 5a. In one example, the change channel path configuration request block includes the following fields:

(a) Length Field 502: This field indicates the length of this request block;

(b) Command Code 504: This field specifies the change channel path configuration command;

(c) Operation Code 506: The operation code indicates the type of channel path configuration operation that is to be performed. The fields of the request data area of the command request block that are used are dependent upon the operation to be performed. The contents of the request data area fields that are not specified as being examined for possible use in performing the requested operation are ignored. Examples of various operation codes are as follows:

| | |
|---|---|
| 0 | Add the description of the specified channel path to the I/O configuration definition. When the MCSS facility is provided by the CPC, the location of the physical channel path designated by the PCHID field is specified for an add operation. When the channel path type field (CHPT), described below, specifies an internal channel path type, the PCHID field is ignored. The PCHID field is not examined for any other operation.<br>All of the fields except RCSSID are examined for use in performing the add operation.<br>Upon exit from configuration mode, given that this change remains intact, an I/O-resource-accessibility-information event is made pending for the MIF image affected by this operation, and thus, the affected channel subsystem and corresponding logical partition, to signal the added accessibility of the specified channel path. |

-continued

| | |
|---|---|
| 1 | Modify the description of the specified channel path in the I/O configuration definition. The type of modification is specified by the operation code qualifier (OCQ). This operation code is specified when the CPC is operating in LPAR mode.<br>The CHPID, OCQ, and CSSID fields are examined for use in performing a modify operation. Additional fields may be specified depending on the contents of the OCQ field. The fields that are used are identified in the description of the OCQ values. |
| 2 | Delete the description of the specified channel path from the I/O configuration definition.<br>The CHPID and CSSID fields are examined for use in performing the delete operation. |

When the multiple channel subsystem facility is provided by the CPC, the delete operation is used to delete the last channel path from a channel subsystem image provided that the channel path is not present in any other channel subsystem image.

Successful add, modify, and delete operations cause the I/O-configuration-changed condition to be set in the channel subsystem. Successful add, modify, and delete operations cause the channel subsystem to retain the specified program parameter, replacing the current program parameter, if any, in the channel subsystem.

(d) Multiple Channel subsystem Bit (M) 508: When the multiple channel subsystem facility is provided by the CPC, and the M bit is one, the CSSID field is checked for a valid CSSID. If valid, the value in the CSSID field becomes the effective CSSID. If not valid, then a response code may be stored. When M is zero, the default CSSID is the effective CSSID, and the CSSID field is zero; otherwise a response code may be stored.

(e) Format (FMT) 510: The command-request-format field includes an unsigned integer whose value specifies the layout of the command-request block. In one example, this value is 0.

(f) Operation-Code Qualifier (OCQ) 512: This field includes a value that qualifies the operation specified by the OC field. The meaning of each value of the OCQ field is for instance, as follows:

| | |
|---|---|
| 0 | No qualification: The operation specified by the OC field is not qualified by the OCQ field. When the CPC is operating in LPAR mode, the OC field is qualified by the OCQ. |
| 1 | Unshared reconfigurable: The specified channel path is added to the I/O-configuration definition as an unshared channel path. The channel path can be configured to one MIF image within a channel subsystem image at a time. The channel path can be reconfigured to any other MIF image of the channel subsystem image for which reconfiguration access has been established.<br>The channel path can be configured to any one of the MIF images provided in the I/O-configuration definition that are specified in the reconfiguration-access bit mask.<br>One MIF image of the channel subsystem image is defined to have initial access to the channel path, when the MIF image is subsequently activated. The MIF image for which initial access is to be established is specified by the initial-access bit mask.<br>On some models, the OCQ value is not specified when the channel-path-type field indicates an internal-system-device channel.<br>This OCQ value may be specified when the OC field specifies an add operation (OC = 0) and the CPC is operating in LPAR mode. When an add operation that specifies this operation-code qualifier adds a channel path, the channel path cannot subsequently be spanned, in this example, even if it otherwise might have been had it been added using the shared (OCQ = 3) operation-code qualifier. |

-continued

| | |
|---|---|
| 2 | Unshared non-reconfigurable: The specified channel path is added to the I/O-configuration definition as an unshared channel path. The channel path is configured to one MIF image of the channel subsystem image and can be subsequently deconfigured or configured to that MIF image. The channel path cannot be subsequently reconfigured to other MIF images, in one embodiment. The single MIF image to which the channel path can be configured is specified in the reconfiguration-access bit mask. The same MIF image may also be given access to the channel path, when the logical partition associated with the MIF image is activated.<br>The initial-access bit mask is used to specify the same MIF image as the reconfiguration-access bit mask, when initial access to the channel path is to be established.<br>This OCQ value may be specified, when the OC field specifies an add operation and the CPC is operating in LPAR mode.<br>When an add operation (OC = 0) that specifies this operation-code qualifier adds a channel path, the channel path cannot subsequently be spanned, in this example, even if it otherwise might have been had it been added using the shared (OCQ = 3) operation-code qualifier. |
| 3 | Shared: The channel path is added as a shared channel path provided that the CHPT field specifies an allowed channel type, such as, for instance, a serial channel, cluster-bus-peer channel, an emulated-I/O channel, a fibre-channel channel, as just some examples.<br>The channel path can be concurrently configured to multiple MIF images (as specified in the reconfiguration-access bit mask) and used to concurrently execute I/O-operations or message operations for all configured MIF images.<br>One channel-path image is added to the I/O-configuration definition for each MIF image specified in the reconfiguration-access bit mask.<br>The channel path is initially configured to each MIF image specified in the initial-access bit mask, when a logical partition that is associated with the MIF image is activated.<br>This OCQ value may be specified when the OC field specifies an add operation and the CPC is operating in LPAR mode. |
| 4 | Add access: The I/O configuration definition is modified by adding one or more MIF images to the current set of MIF-images that can be used to access the specified channel path. The specified channel path and MIF images are to be currently defined in the I/O-configuration definition of the specified channel subsystem image. MIF images can be added to the set of MIF-images to which the channel path may be subsequently reconfigured. Reconfiguration access may be added for both unshared reconfigurable channel paths and for shared channel paths.<br>The reconfiguration-access bit mask specifies the MIF images of the specified channel subsystem image for which reconfiguration access is to be added.<br>For each MIF image in the modified set of MIF-images that has reconfiguration access, the channel path may subsequently be configured as follows:<br><br>Unshared Image-Reconfigurable Channel Path: The channel path can be configured to any one MIF image in the modified reconfiguration-access set of MIF-images at a time.<br>Shared Channel Path: The channel path may be concurrently configured to any of the MIF images in the modified reconfiguration-access set.<br>The OCQ value may be specified when the CPC is operating in LPAR mode and the OC field specifies the modify operation.<br>The OCQ, CHPID, RABM, and CSSID fields are examined for use in performing this type of operation.<br>Upon exit from configuration mode, given that this change remains intact, an I/O-resource-accessibility-information event is made pending for the MIF image affected by this operation, and thus, the affected channel subsystem image and corresponding logical partition, to signal the added accessibility of the specified channel path. |
| 5 | Unconditional delete access: The I/O configuration definition is modified by deleting one or more MIF images from the current set of MIF-images of the specified channel subsystem image that can be used to access the specified channel path. The specified channel path and MIF images are to be currently defined in the I/O configuration definition. Reconfiguration access may be deleted for both unshared reconfigurable channel paths and for shared channel paths.<br>The reconfiguration access bit mask specifies the MIF images of the channel subsystem image for which reconfiguration access is to be deleted.<br>For each MIF image deleted from the set of MIF images that has reconfiguration access to the channel path, the channel path is deconfigured, if the MIF image currently has access to the channel path and cannot be subsequently configured to that MIF image.<br>When the specified channel path is a shared channel path, the corresponding channel path images are deleted. The channel path definition is not deleted from the current I/O configuration definition for either a shared or unshared channel path even when all MIF images have been deleted from the set of MIF-images that have reconfiguration access to the channel path.<br>This OCQ value may be specified when the CPC is operating in LPAR mode and the OC field specifies the modify operation.<br>The OCQ, CHPID, RABM and CSSID fields are examined for use in performing this type of operation. |
| 6 | Conditional delete access (Conditional): The I/O configuration definition is modified by deleting one or more MIF images from the current set of MIF images of the specified channel subsystem image that can be used to access the specified channel path, when none of the specified MIF images are currently configured to the channel path.<br>When none of the specified MIF images are configured to the specified channel path, reconfiguration access to the specified channel path for the specified MIF images is deleted just as when OCQ 5 is specified.<br>When one or more of the specified MIF images are configured to the specified channel path, reconfiguration access for the specified channel path is not modified. A response code and response code qualifier are stored in the command response block indicating that the requested change was not made.<br>The command request block specification conditions and requirements that are described for OCQ 5 apply equally to this OCQ value.<br>The OCQ value may be specified when the CPC is operating in LPAR mode and the OC field specifies the modify operation. |
| 7 | Add-CSS-image access: When the multiple channel subsystem facility is provided by the CPC, the I/O configuration definition is modified by adding a channel path to the target CSS image where the latter is specified by the CSSID. The object channel path being added by this operation is a shared channel path. The CHPID value assigned to the object channel path is the same as the CHPID value of the referenced channel path specified by RCSSID.CHPID. The characteristics of the object channel path are determined from the referenced channel path. These characteristic include, for instance, the following:<br><br>The channel-path type is to be a type that is supported as a spanned channel path by the CPC model.<br>The referenced channel path is to be located in a channel subsystem image other than the target channel subsystem image.<br>The referenced channel path identified by RCSSID.CHPID is to be already described in the I/O-configuration definition for the channel subsystem image.<br>The referenced channel path identified by RCSSID.CHPID is not a managed channel path.<br>The characteristics of the referenced channel path are inherited, except the reconfiguration-access and initial-access bit masks, which are determined from the command for a given target channel subsystem image.<br>The CHPID, CSSID, RABM, IABM and RCSSID fields are examined for use in performing this type of modify operation.<br>Upon exit from configuration mode, given that this change remains intact, an I/O-resource-accessibility-information event is made pending for the MIF image affected by this operation, and thus, the affected channel subsystem image and corresponding logical partition, to signal the added accessibility of the specified channel path. |
| 8 | Delete-CSS-image access: When the multiple channel subsystem facility is provided by the CPC, the I/O-configuration definition is modified by deleting a channel path from the target channel subsystem image, where the latter is specified by the CSSID. The object channel path being deleted by this operation is not to be only available to one channel subsystem image.<br>The CHPID and CSSID are examined for use in performing this |

-continued type of modify operation.
This OCQ value may be specified when the CPC is operating in LPAR mode and the OC field specifies the modify operation.

(g) Override Bit (O) 514: The override bit allows the program to request a configuration change of an unusual nature that would normally be disallowed by the channel subsystem. The channel subsystem may nevertheless disallow the override request.

(h) Key 516: This field includes the storage-access key used by the channel subsystem to access the command-request block and the command-response block for asynchronous operations that are initiated by the command.

(i) Subsystem-Identification (SID)) 518: This field specifies the CHSC subchannel that is used to perform operations that are asynchronous to CHSC execution.

(j) Program Parameter 520: This field includes a value that the program associates with this change-channel-path-configuration command.

(k) Channel Subsystem Image ID (CSSID) 522: When the multiple channel subsystem facility is provided by the CPC, this field indicates the CSSID of the target channel subsystem image with which the designated channel path specified in the CHPID field will be associated. The CSSID value is subject to range and existence checking.

(l) Reference Channel Subsystem Image ID (RCSSID) 524: When the multiple channel subsystem facility is provided by the CPC, this field includes the reference CSSID of a channel subsystem image from which the channel-path characteristics are copied for an add-CSS-image access modify operation (OCQ=7). The RCSSID value is subject to range and existence checking.

(m) Channel-Path Identifier (CHPID) 526: This field specifies the CHPID of the channel path that is the object of the change-channel-path-configuration command.

(n) Channel-Path Type (CHPT) 528: This field specifies the type of the specified channel path.

(o) Channel-Path Characteristics (CHPC) 530: This field specifies characteristics of the specified channel path. When one, the meaning of bits 0-7 is as follows, in one example:

| Bits | Meaning |
| --- | --- |
| 0 | CTCA: Providing that the CHPT field specifies a serial-I/O channel path, the specified channel path can be used to provide access to a channel-to-channel adapter in the CPC that contains the specified channel path. |
| 1 | When the dynamic-CHPID management facility is provided by the CPC or the channel path identified in the CHPID field is an internal-queued-direct-communication channel (as indicated by the contents of the CHPT field), the OC field specifies the add operation, and this bit is one, the CHPP field includes a parameter that is associated with the specified CHPID.<br>When the dynamic-CHPID management facility is provided by the CPC or when the channel identified in the CHPID field is an internal-queued-direct-communication channel (as indicated by the contents of the CHPT field), and the OC field specifies the modify or delete operation, this bit and the contents of the CHPP and LPC name fields are ignored.<br>When the dynamic-CHPID-management facility is not provided by the CPC and when the channel identified in the CHPID field is not an internal-queued-direct-communication channel (as indicated by the contents of the CHPT field), this bit is reserved and set to zero. |

-continued

| Bits | Meaning |
| --- | --- |
| 2 | When the channel path identified in the CHPID field is an internal-coupling-peer channel (as indicated by the contents of the CHPT field), the OC field specifies the add operation, and this bit is one, the channel path identified in the ACSSID.ACHPID field (another internal-coupling-peer channel) is to be associated with the channel path identified in the CHPID field.<br>When the channel path identified in the CHPID field is an internal-coupling-peer channel (as indicated by the contents of the CHPT field), the OC field specifies the add operation, and this bit is zero, no channel path is to be associated with the channel path identified in the CHPID field and the content of the ACHPID and ACSSID fields are ignored.<br>When the channel path identified in the CHPID field is an internal-coupling peer channel (as indicated by the contents of the CHPT field), and the OC field specifies the modify or delete operation, this bit of the CHPC field and the content of the ACHPID and ACSSID fields are ignored.<br>When the channel path identified in the CHPID field is other than an internal-coupling-peer channel (as indicated by the contents of the CHPT field), this bit, the ACHPID and ACSSID fields are reserved and set to zeros. |

(p) Channel Path Parameter (CHPP) 532: When bit 1 of the CHPC field is one, this field includes a parameter that is associated with the channel path identified in the CHPID field.

When the channel identified in the CHPID field is an internal-queued-direct-communication channel (as indicated by the contents of the CHPT field), bits 0-1, as one example, include a value that specifies the maximum frame size (MFS) to be used by the internal-queued-direct-communication channel.

Bits 2-7, as examples, also specify a parameter that the program associates with the channel path identified in the CHPID field. The contents of these bits have meaning to the program, except that when bit 7 of the CHPP field is one, it means that:

the specified CHPID is a managed CHPID,
when the CPC is operating in LPAR mode, a logical-partition-cluster name is provided,
when the CPC is operating in LPAR mode, the OCQ field includes the value 3, indicating that the specified CHPID is shared, and
a defined bit of the SWTV field is one, indicating that a switch is attached to the specified CHPID.

(q) Reconfiguration-Access Bit Mask (RABM) 534: When the CPC is operating in LPAR mode, this bit mask is used to indicate which MIF images are to be added or deleted from the set of MIF-images that have reconfiguration access to the specified channel path. For each MIF image that has reconfiguration access to the specified channel path, the channel path can be configured to the MIF image by use of the appropriate reconfiguration commands.

In one example, each bit in the reconfiguration-access bit mask represents a one-to-one correspondence with a MIF image of the channel subsystem image that is specified by the CSSID field.

When the OC field specifies the add operation or the OCQ field specifies add-CSS-image access operation or the add-access operation, a one in a bit position of this mask indicates that the correspondingly numbered MIF image is to be added to the set of MIF-images that have reconfiguration access to the specified channel path. When the correspondingly numbered bit is zero, the MIF image is not to be added to the set of MIF-images that have reconfiguration access to the specified channel path.

When the OC field specifies the modify operation and the OCQ field specifies a conditional delete-access operation, a one in a bit position of this mask indicates that the correspondingly numbered MIF image is to be deleted from the set of MIF-images that have reconfiguration access. The channel path is deconfigured, if the MIF image is not currently configured to the channel path. If the OCQ field specifies an unconditional delete-access operation, a one in a bit position of this mask indicates that the correspondingly number MIF image is to be deleted from the current set of MIF-images that have reconfiguration access. The channel path is deconfigured, if the MIF image currently has access to the channel path. Additionally, if the correspondingly number MIF image is currently in the set of MIF-images that have initial access to the channel path, then initial access for the MIF image is also deleted. When the correspondingly numbered bit is zero, the MIF image is not to be deleted from the set of MIF-images that have reconfiguration access to the specified channel path.

When the OC field specifies an add operation and the OCQ field specifies an unshared not-reconfigurable channel path, only one bit in this mask is set to one.

When the OC field specifies an add operation and the OCQ field specifies either an unshared reconfigurable or shared channel path, any bits that correspond to provided MIF images can be set to one. At least one bit that corresponds to a provided MIF image is to be set to one.

When the OC field specifies a modify operation, this mask is not to contain all zeros.

This bit mask is ignored when any of the following conditions exists: the OC field specifies a delete operation; the CPC is operating in BASIC mode; or the OCQ field specifies a delete-CSS-image access operation.

(r) Initial-Access Bit Mask (IABM) 536: When the CPC is operating in LPAR mode, this bit mask is used to indicate which MIF images are to be placed into the set of MIF-images that have initial access to the specified channel path. The initial-access bit mask may specify all zeros.

When the OC field specifies an add operation or add CSS-image access, a one in a bit position of this mask indicates that the correspondingly numbered MIF image is to be added to the set of MIF-images that have initial access to the specified channel path. When the correspondingly numbered bit is zero, the MIF image is not to be added to the set of MIF-images that have initial access to the specified channel path.

When the OC field specifies an add operation and the OCQ field specifies an unshared reconfigurable or an unshared not-reconfigurable channel path, only one bit in this mask may be one and the correspondingly bit in the reconfiguration-access bit mask is also one.

When the OC field specifies an add operation and the OCQ field specifies shared, any bits for provided MIF images within the channel subsystem image may be set to one, when the correspondingly bit in the reconfiguration-access bit mask is also set to one.

When the dynamic-CHPID-management facility is provided by the CPC, and the OC field specifies the add operation, bit 1 of the CHPC field is one, and this is a managed CHPID as designated by the CHPP field, the initial access bit mask that corresponds to provided MIF images is set to zero.

For each MIF image that has initial-access to the specified channel path, the channel path is configured to the MIF image, when it is subsequently activated as part of a partition activation process. When the specified MIF image is currently active, the channel path is not configured to the MIF image unless the program operating in the logical partition executes an appropriate SCLP reconfiguration command.

This bit mask is ignored when the OC field specifies a modify, except OCQ=7, or delete operation, or the CPC is operating in BASIC mode.

(s) Logical Partition Cluster (LPC) Name 538: A logical-partition cluster is the collection of the logical partitions within a CPC that are associated with the same logical-partition-cluster name for a given type of logical-partition-cluster. The program declares a logical-partition-cluster name for a logical partition by means of a Diagnose instruction.

When the following conditions exist, this field includes the logical-partition-cluster name of the logical-partition cluster with which the specified channel path is to be associated: the dynamic CHPID management facility is provided by the CPC; the CPC is operating in LPAR mode; the OC field specifies the add operation; bit 1 of the CHPC field is one; bit 7 of the CHPP filed is one.

The contents and format of the logical-partition-cluster name are determined by the program.

(t) Switch Validity (SWTV) 540: When one, this field specifies that the SWTN field contains valid information.

(u) Physical Channel Identifier (PCHID) 541: When the multiple channel subsystem facility is provided by the CPC, this field includes an unsigned integer that represents a model-dependent identification of the physical location of a channel. PCHID is used for an initial add operation, except for the addition of an internal channel, such as an internal-queued-direct-communication channel and internal-coupling-peer channel. The PCHID field is ignored, when the CHPT field indicates any of the internal channel-path types. If a PCHID value is not recognized, a response-code may be stored.

(v) Switch Number (SWTN) 542: When a predefined bit of the SWTV field is one, this field includes a unique identifier of a switch on the specified channel path. When the CHPT field specifies a fibre-channel channel, the switch number (SWTN) designates the entry switch to a fibre-channel fabric.

(w) Associated Channel Subsystem ID (ACSSID) 544: When the multiple channel subsystem facility is provided by the CPC, this field includes the CSSID of a channel subsystem image that is associated with the CHPID of an internal-coupling-peer channel specified by the ACHPID field. The ACSSID is subject to range and existence checking.

(x) Associated Channel Path (ACHPID) 546: When the channel identified in the CHPID field is an internal-coupling-peer channel (as indicated by the contents of the CHPT field), the OC field specifies the add operation, conditions allow the addition, and bit 2 of the CHPC field is one, this field includes the CHPID of an internal-coupling-peer channel with which the channel specified in the CHPID field is to be associated.

When two internal-coupling-peer channels are associated in this way, it means that messages that are sent on either one of the channels are received on the other associated channel.

When the channel identified in the CHPID field is an internal-coupling-peer channel, the OC field specifies the delete operation, and conditions allow the deletion, the specified channel is deleted from the I/O-configuration definition. If another internal-coupling-peer channel is associated with the specified channel, when the specified channel is deleted, the status of the associated channel is affected as follows: If the associated channel path is configured to one or more MIF images, the associated channel path is deconfigured from those MIF images; the associated channel path enters a state where it is no longer associated with an internal coupling-peer-channel.

The ACSSID and ACHPID fields, taken together, reference a channel path in a channel subsystem image that may itself be a spanned channel path (call this spanning-group A). When such is the case, the ACSSID field may specify any of the CSSIDs that have the channel path specified by the ACHPID field defined. After the add of the channel path that references spanning-group A, the following requests are supported:

- A modify add-CSS-image-access operation may be requested that specifies RCSSID as the previous ACSSID value, and CHPID as the previous ACHPID value, thus increasing the number of channel subsystem images where the ACHPID is spanned (i.e., increasing the size of spanning-group A).
- A modify add-CSS-image-access operation may be requested that specifies RCSSID as the previous CSSID value, and CHPID as the previous CHPID value, thus increasing the number of channel subsystem images where the CHPID is spanned (call this spanning-group C).

Spanning-group C is not established until after the linkage is established between the first channel path of spanning-group C and the channel path of one of the channel subsystem images of spanning-group A.

The connectivity between spanning-group C and A is any-to-any. This connectivity remains intact as long as each spanning-group has at least one channel path defined.

Figure 5B:
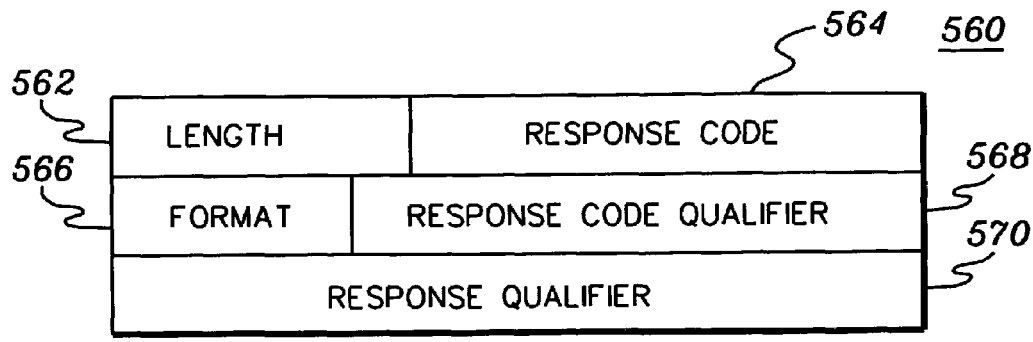
FIG. 5b depicts one embodiment of a response block for the change channel path configuration command, in accordance with an aspect of the present invention.

One embodiment of a command-response block for the Change Channel Path Configuration command is described with reference to FIG. 5b. In one example, a command response block 560 includes the following fields:

(a) Length Field 562: This field specifies the length of the command-response block. The length depends on the response code that is stored as a result of the attempt to execute the change channel path configuration command.

(b) Response Code 564: This field includes an unsigned binary integer that describes the results of the attempt to execute the change channel path configuration command. When the response-code field indicates an unsuccessful attempt, no change is made to the I/O-configuration definition, the I/O-configuration-changed condition in the channel subsystem is not affected, and the contents of the program-parameter field are ignored.

When execution of the change channel path configuration command results in a predefined condition code being set, the channel subsystem has been given the initiative to asynchronously attempt to perform the requested change to the I/O-configuration definition. The completion of that attempt is indicated by means of a CHSC-subchannel I/O interruption with the results of the attempt specified by the response code in the command-response block.

(c) Format (FMT) 566: The command-response-format field includes an unsigned integer whose value specifies the layout of the command-response block.

(d) Response-Code Qualifier (RCQ) 568: When a response code other than a code indicating success is stored in the response-code field, this field includes either an architected value or a model dependent value that further describes the condition specified by the response code.

(e) Response Qualifier (RQ) 570: When the response-code field indicates that the requested configuration change has occurred, the response-qualifier field includes a value that provides information about conditions associated with that change. The meaning of each value is, for example, as follows:

| | |
|---|---|
| 0 | There are no special conditions associated with the configuration change. |
| 1 | The information provided by the program for the configuration change does not match the physical configuration. This value may occur when the associated command request specifies an add (OC = 0) operation. |
| 2 | The specified physical channel path (PCHID) is not installed. This value may occur when the associated command request specifies an add (OC = 0) operation. |

When the CPC is operating in LPAR mode, there are three cases when the execution of the change channel path configuration command can include an attempt to deconfigure a channel path from one or more MIF images.

1. The delete operation is requested, or delete-CSS-image access (OCQ=8) is specified, conditions allow the specified channel to be deleted, and the specified channel path is configured to one or more MIF images within a channel subsystem image. The machine attempts to deconfigure the specified channel path from those MIF images.
2. The delete operation is requested, conditions allow the specified channel path to be deleted, the specified channel path is an internal-coupling-peer channel, and an internal-coupling-peer channel that is associated with the specified channel path is configured to one or more MIF images in any one or more channel subsystem images. The machine attempts to deconfigure the associated channel path from those MIF images.
3. The modify-unconditional-delete access operation is requested, conditions allow reconfiguration access to the specified channel path to be removed from the specified MIF images, and the specified channel path is configured to one or more of the specified MIF images. The machine attempts to deconfigure the specified channel path from those MIF images.

In the above cases, when a channel path is deconfigured from a MIF image, a channel-path-permanent-error-with-facility-initialized channel report is made pending for that MIF image and the channel path is no longer available for use by the program operating in the logical partition with which the MIF image is associated.

In cases 2 and 3 above, when a channel path is deconfigured from a MIF image and it is the last available channel path associated with a subchannel, the subchannel is also made not available to the MIF image. A subchannel-installed-parameters-initialized channel report is made pending for each such subchannel for each affected logical partition.

Described in detail above is processing associated with a Change Channel Path Configuration Request command. As part of the processing to support MCSS, various error checking procedures are performed, as indicated in FIGS. 5c–5f and described below.

As shown in FIG. 5c, when the operation code is zero indicating the adding of a CHPID to the I/O configuration definition, checks are made related to the CSSID and PCHID. If the specified checking is successful, then the CHPID is added to the channel subsystem image.

Similarly, when the operation code equals one and the operation code qualifier is set to 7 (FIG. 5d), then various tests are performed on the CSSID, RCSSID, and CHPID. If the checking is unsuccessful, then appropriate response codes are provided. However, when the checking is successful, then the CHPID is added to the channel subsystem image and bound to the PCHID, which is already bound to the CHPID in the referenced channel subsystem image.

With reference to FIG. 5e, it is shown that when the operation code is equal to one and the operation code qualifier is set to 8, then testing of the CSSID and CHPID are performed. When those tests are successful, then the CHPID is deleted from the channel subsystem image identified by the CSSID.

Similarly, in FIG. 5f, it is indicated that when the operation code is equal to 2, then testing is performed on the CSSID and the CHPID specified by the CSSID. When that checking is successful, then the CHPID is deleted from the channel subsystem image identified by the CSSID and the entire configuration.

As indicated above, another command enhanced by MCSS is a Change Control Unit Configuration command. This command is used to add, modify, or delete the description of a control unit in the I/O-configuration definition. The change control unit configuration command can be executed asynchronously and is not interpretively executed, in one example. Specification of the operation to be performed and the information required to change the I/O-configuration definition are provided in a command-request block.

Figure 6A:
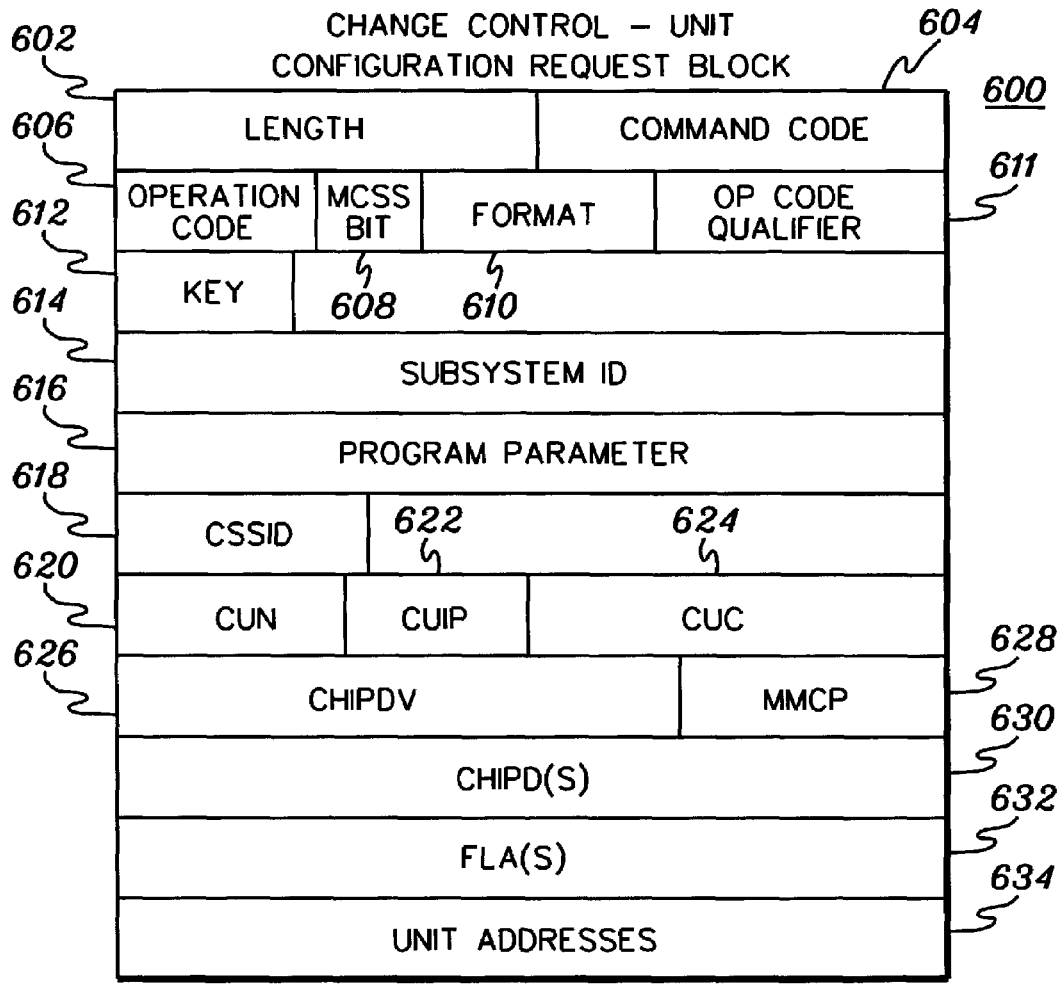
FIG. 6a depicts one embodiment of a request block for a change control unit configuration command, in accordance with an aspect of the present invention.

One embodiment of a request block for a change control unit configuration command is described with reference to FIG. 6a. In one example, a request block 600 includes, for instance:

(a) Length Field 602: This field specifies the length of the block.

(b) Command Code 604: This field specifies the change-control-unit-configuration command.

(c) Operation Code (OC) 606: This field includes a value that specifies the type of control unit configuration operation that is to be performed. The fields of the request-data area of the command request block that are used are dependent upon the operation to be performed. The meaning of each value is, for example, as follows:

| | |
|---|---|
| 0 | Add the description of the specified control unit to the I/O-configuration definition. |
| 1 | Modify the description of the specified control unit in the I/O-configuration definition. The type of modification is specified by the operation-code qualifier (OCQ). The CUN field is used to identify the control unit for which the description is to be modified. Additional fields may be used, depending on the contents of the OCQ field. Additional fields that are used are identified in the descriptions of the OCQ values. |
| 2 | Delete the description of the specified control-unit image from the I/O-configuration definition. The effective CSSID is to specify the remaining channel subsystem image that contains the control-unit image. The CUN field is examined for use in performing the delete operation. |
| 3 | Store additional information: One or more subchannel blocks that could not be contained in the command response block for a previous change-control-unit-configuration command are requested. |

Successful add, modify, and delete operations cause the I/O-configuration-charged condition to be set in the channel subsystem. Successful add, modify, and delete operations cause the channel subsystem to retain the specified program parameter, replacing the current program parameter, if any, in the channel subsystem.

(d) Multiple Channel Subsystem Bit (M) 608: When the multiple channel subsystem facility is provided by the CPC, then when M is one, the CSSID field is checked for a valid CSSID. If valid, the value in the CSSID field becomes the effective CSSID. When M is zero, the default CSSID is the effective CSSID.

(e) Format (FMT) 610: The command-request-format field includes an unsigned integer whose value specifies the layout of the command-request block. The request block described herein is format zero, as one example.

(f) Operation-Code Qualifier (OCQ) 611: This field includes a value that qualifies the operation specified by the OC field. The meaning of each value of the OCQ field is, for instance, as follows:

| | |
|---|---|
| 1 | Add channel-path access: The I/O-configuration definition is modified by adding one or more channel paths to the current list of channel paths that can be used to access the specified control unit. When the multiple channel subsystem facility is provided by the CPC, this form of modification applies, when the specified control-unit image is defined to the channel subsystem image specified by the CSSID field.<br>Subchannels that are added as a result of the modify (add channel-path access) operation are in the initialized state and are not enabled.<br>When one or more channel paths that are in the configured state are placed on the list of channel paths that can be used to access the specified control unit, the corresponding bits of the path-installed mask (PIM) and the path-available mask (PAM) for subchannels associated with I/O-devices that are described as being attached to the specified control unit are set to ones. If the channel paths are in the not-configured state, the appropriate PM bits are set to ones.<br>This OCQ value may be specified, when the OC field specifies the modify operation.<br>The M-bit, CSSID field, CHPIDV, and CHPID fields are used for this modify operation. The FLA fields are used when the corresponding channel paths are channel-path types that adhere to the serial-I/O architectures, and the link-address portions of the FLA fields may be used (depending on the model), when the corresponding channel paths are fiber-extended channel paths, or fibre-channel channel paths. |
| 2 | Delete channel-path access: The I/O-configuration definition is modified by deleting one or more channel paths from the current list of channel paths that can be used to access the specified control unit.<br>Subchannels that are deleted as a result of the modify (delete channel-path access) operation have the device-number-valid bit set to zero.<br>When one or more channel paths are deleted from the list of channel paths that can be used to access the specified control unit, the corresponding bits of the path-installed mask (PIM) and the path-available mask (PAM) for subchannels associated with I/O-devices that are described as being attached to the specified control unit are set to zeros.<br>This OCQ value may be specified, when the OC field specifies the modify operation.<br>The M-bit, CSSID field, CHPIDV, and CHPID fields are used for this modify operation. The CHPIDV field is to contain at least one bit that is one. Each valid CHPID field specifies a channel path that is to be deleted from the list of channel paths for the specified control unit. |
| 3 | Add unit address: The I/O-configuration definition is modified by adding one or more unit addresses to the current list of unit addresses that are recognized by the specified control unit. Each added unit address becomes available to any logical partition that has channel-path accessibility to the control unit.<br>This OCQ value may be specified, when the OC field specifies the modify operation.<br>The unit-address field is used for this modify operation. |
| 4 | Delete unit address: The I/O configuration definition is modified by deleting one or more unit addresses from the current list of unit addresses that are recognized by the specified control unit. Each deleted unit address becomes unavailable to any logical partition that has channel-path accessibility to the control unit.<br>This OCQ value may be specified, when the OC field specifies the modify operation.<br>The unit-address field is used for this modify operation. |

-continued

| | |
|---|---|
| 5 | Modify the maximum-managed-channel-path (MMCP) value: The maximum number of managed channel paths to which the specified control unit can be attached is changed to the value specified in the MMCP field, provided that certain conditions are satisfied.<br>When the multiple channel subsystem (MCSS) facility is provided by the CPC, the effective CSSID associated with such a request may be used to determine the channel subsystem image to which the change is confined. Thus, the effective scope of a successful modification of the maximum-managed-channel-path of the specified control unit may be limited to the channel subsystem image specified on the request to change the MMCP value. Any other access of the control unit via a different channel subsystem image continues to observe the MMCP value that existed prior to the change. Another request via a different channel subsystem image may make its own, independent MMCP-change request. This OCQ value may be specified, when the dynamic-CHPID management facility is provided by the CPC and the OC field specifies the modify operation. When the dynamic-CHPID-management facility is not provided by the CPC, the OCQ value of 5 is reserved.<br>The MMCP count, the M-bit and CSSID fields are used for this modify operation. |
| 6 | Add CU-image to CSS image: This operation-code qualifier applies when the multiple channel subsystem facility is provided by the CPC. The control unit is to already be in the I/O-configuration definition, and thus, at least one control-unit image is established, although not from the channel subsystem image specified by the effective CSSID. The I/O-configuration definition is modified by adding a control-unit image to the channel subsystem image specified by the effective CSSID, and thus, introducing access to the control unit from the channel subsystem image via one or more specified channel paths.<br>The M-bit, CSSID field, CHPIDV, CHPID, and MMCP fields are used for this modify operation. The FLA fields are used, when the corresponding channel paths are channel-path types that adhere to the serial-I/O architectures, and the link-address portions of the FLA fields may be used (depending on the model and presence of one or more switches, when applicable), when the corresponding channel paths are fiber-extended channel paths, or fibre-channel channel paths. |
| 7 | Delete CU-image from CSS image: This operation-code qualifier applies when the multiple channel subsystem facility is provided by the CPC. The I/O-configuration definition is modified by deleting a specified control-unit image from the channel subsystem image. If the specified control-unit image is not defined in the channel subsystem image, a response-code may be stored.<br>The M-bit and CSSID fields are used for this modify operation. |

(g) Key 612: This field includes a storage access key used by the channel subsystem to access the command-request block and the command-response block for asynchronous operations that are initiated by the command.

(h) Subsystem ID (SID) 614: The SID field specifies the CHSC subchannel that is used to perform operations that are asynchronous to CHSC execution.

(i) Program Parameter 616: This field includes a value that the program associates with this change control unit configuration command.

(j) CSSID 618: When the multiple channel subsystem facility is provided by the CPC, this field may specify the CSSID used to locate the target channel subsystem image, and thus, locate the channel paths whose CHPIDs are specified. The CSSID value is subject to range and existence checking.

(k) Control-Unit Number (CUN) 620: This field specifies a number that is used to identify the control unit that is the object of the change control unit configuration command.

(l) Control-Unit-Interface Protocol (CUIP) 622: This field specifies the type of protocol used by the specified control unit to communicate on the attaching I/O-interfaces. The meaning of each value is, for instance, as follows:

| | |
|---|---|
| 0 | Direct-Current (DC) interlocked (applies to parallel channels). |
| 1 | 3-megabyte-per second data streaming (applies to parallel channels). |
| 2 | 4.5 megabyte-per-second data streaming (applies to parallel channels). |
| 3 | Serial-I/O protocols. |
| 4 | Open System Adapter (OSA) protocols. |

When the operation-code field specifies the add operation and one or more of the specified channel paths are an internal-system-device channel or fibre-channel-converted-channel-path type, serial-I/O protocols are to be specified in the CUIP field.

In one example, the contents of the CUIP field have no meaning for certain channel-path types (e.g., those that are not parallel, serial-I/O, OSA, internal-system-device, or fibre-channel-converted channels).

(m) Control-Unit Characteristics (CUC) 624: This field specifies characteristics of the specified control unit. The meaning of bits 0-7 is, for instance, as follows:

| Bits | Meaning |
|---|---|
| 0 | Concurrency level of I/O requests: When zero, this bit specifies that the control unit supports only one I/O request at a time. When one, this bit specifies that the control unit supports multiple I/O requests concurrently.<br>The concurrency-level bit has meaning, when the channel paths to which the control unit is attached are parallel channels or fiber-extended channels (byte or block). Otherwise, the concurrency-level bit is ignored. |
| 1 | CTC-control-unit-type specification: When zero, bit 1 indicates that the specified control unit is not a FICON CTC control unit. When one, bit 1 indicates that the specified control unit is a FICON CTC control unit. This bit is meaningful, when the OC field specifies the add operation. Otherwise this bit is ignored. When the specified control unit is a FICON CTC control unit the following conditions apply. |
| | The MMCP field is ignored.<br>When the OC field specifies the modify operation, and the OCQ field specifies the modify-the-MMCP-value function, a response-code is stored in the response block.<br>One CHPID field and its corresponding FLA field is specified as containing valid information.<br>The channel-path type to which the specified control unit is attached is a fibre-channel path. |

(n) Channel-Path-Identifier Validity (CHPIDV) 626: This field specifies which of the CHPID and FLA fields (if applicable) contain valid information. Bits 0-7 of the CHPIDV field correspond, from left to right, to each of the eight CHPID fields. When one, a CHPIDV bit specifies that the corresponding CHPID field contains a valid channel-path identifier.

When the OC field specifies the add operation, or the OC field specifies the modify operation and the OCQ field specifies add or delete channel-path access, the CHPIDV field is not to contain all zeros and the corresponding CHPID fields contain valid information; otherwise, the contents of the CHPID fields are ignored.

When the CHPID fields contain valid information and the corresponding channel paths are serial-I/O type, fibre-channel, fibre-channel-converted, internal-queued, direct-communication channels, or fiber-extended channels, the corresponding FLA fields contain valid information; otherwise, the contents of the FLA fields are ignored.

(o) Maximum Managed Channel Paths (MMCP) 628: When the dynamic-CHPID-management facility is provided by the CPC, this field includes an unsigned binary integer that is a count of the maximum number of managed channel paths to which the specified control unit can be attached.

(p) Channel-Path Identifier (CHPID) 630: This field includes up to eight channel-path identifiers. Each CHPID field that is specified as being valid by the contents of the CHPIDV field contains a unique channel-path identifier of a channel path that can be used to access the specified control unit. The effective CSSID specifies the channel subsystem image in which each valid channel path is located.

The order in which channel paths (other than preferred channel paths) are selected by the channel subsystem to access I/O-devices that are attached to the specified control unit is model dependent.

When the CPC is operating in LPAR mode, for a given I/O-configuration definition, the channel paths to which a control unit is attached are to be sharable, or all of the channel paths are not to be sharable.

(q) Full Link Address (FLA) 632: This field includes up to eight full link addresses for the specified control unit. Each address corresponds, one-for-one, with the CHPID field that is in the same relative position in the command-request block. The FLA fields have meaning when the control-unit is attached to a type of channel path that uses an interface protocol that requires use of a link address, a logical address, or both.

A full link address is the information that is contained in the destination-address field of frames that are received by the specified control unit, and in the source-address field of frames that are sent by the specified control unit.

Each address includes, for instance, a link address that is established based upon the channel-path type of the specified channel path and a logical address of the specified control unit on the specified channel path.

(r) Unit Addresses 634: This field describes the I/O-device unit addresses that are recognized by the control unit. A unit address includes, for instance, an Entry Type (ET) that includes a code that specifies the contents of the unit address. For example, when the entry type is equal to 1, the unit address field defines a single unit address, included in the field, that is recognized by the control unit.

As a further example, when the entry type is equal to 2, the unit address defines a range of unit addresses that are recognized by the control unit. The unit address field includes a unit address, which determines the beginning of the range, and a count parameter of the unit address field specifies one less than the number of consecutive unit addresses that make up the range.

Managed Channel-Path Specification Rules: The following rules apply when the requested I/O-configuration change affects the managed-path attributes of the specified control unit:

1. When the add operation is specified in the OC field and a non-zero MMCP value is specified:
   a. The specified MMCP value is to be seven or less.
   b. The number of bits that are one in the CHPIDV field which designate managed channel paths is to be equal to, or less than, the specified MMCP value.
   c. The sum of the number of bits that are one in the CHPIDV field which designate non-managed channel paths and the specified MMCP value is to be eight or less.
   d. When the CPC is operating in LPAR mode, every channel path designated by a bit that is one in the CHPIDV field is to be a shared channel path.
   e. Every channel path designated by a bit that is one in the CHPIDV field is to be one of the types that are allowed for the specified control unit when it is attached to managed channel paths.
2. When the modify operation is specified in the OC field, the modify MMCP operation is specified in the OCQ field, and the specified MMCP value is the same as the MMCP value that is currently in effect for the specified control unit, no operations are performed regarding managed channel paths and the command completes normally.
3. When the modify operation is specified in the OC field, the modify MMCP operation is specified in the OCQ field, and the specified MMCP value is different from the MMCP value that is currently in effect for the specified control unit:
   a. The specified MMCP value is to be seven or less.
   b. The sum of the number of non-managed channel paths currently configured to the specified control unit and the specified MMCP value is to be eight or less.
   c. When the CPC is operating in LPAR mode, every channel path that is currently configured to the specified control unit is to be a shared channel path. (This rule is enforced, when the MMCP value that is in effect for the specified control unit would change from zero to non-zero as a result of executing the command.)
   d. Every channel path currently configured to the specified control unit is to be one of the types that are allowed for the specified control unit when it is attached to managed channel paths. (This rule is enforced, when the MMCP value that is in effect for the specified control unit would change from zero to non-zero as a result of executing the command.)
   e. The sum of the number of non-managed channel paths currently configured to all of the control units of a shared device cluster that includes the specified control unit, and the MMCP values that are in effect for all of those control units except the specified control unit, and the specified MMCP value is to be eight or less.
   f. Every channel path currently configured to the control units of a shared device cluster that contains the specified control unit is to be one of the types that are allowed for the specified control unit when it is attached to managed channel paths. (This rule is enforced, when the sum of the MMCP values that are in effect for the control units of the shared device cluster would change from zero to non-zero as a result of executing the command.)
4. When the modify operation is specified in the OC field, the add-channel-path-access operation is specified in the OCQ field, and an MMCP value is in effect for either the specified control unit or one or more of the other control units of a shared device cluster that contains the specified control unit:
   a. The sum of the number of non-managed channel paths that are currently configured to the specified control unit, and the number of bits that are one in the CHPIDV field which designate non-managed channel paths, and the MMCP value that is in effect for the specified control unit is to be eight or less.

b. The sum of the number of non-managed channel paths that are currently configured to all of the control units of a shared device cluster that includes the specified control unit, and the number of bits that are one in the CHPIDV field which designate non-managed channel paths, and the sum of all of the MMCP values that are in effect for all of the control units of the shared device cluster is to be eight or less.

c. Every channel path designated by a bit that is one in the CHPIDV field is to be one of the types that are allowed for the specified control unit when it is attached to managed channel paths.

Figure 6B:
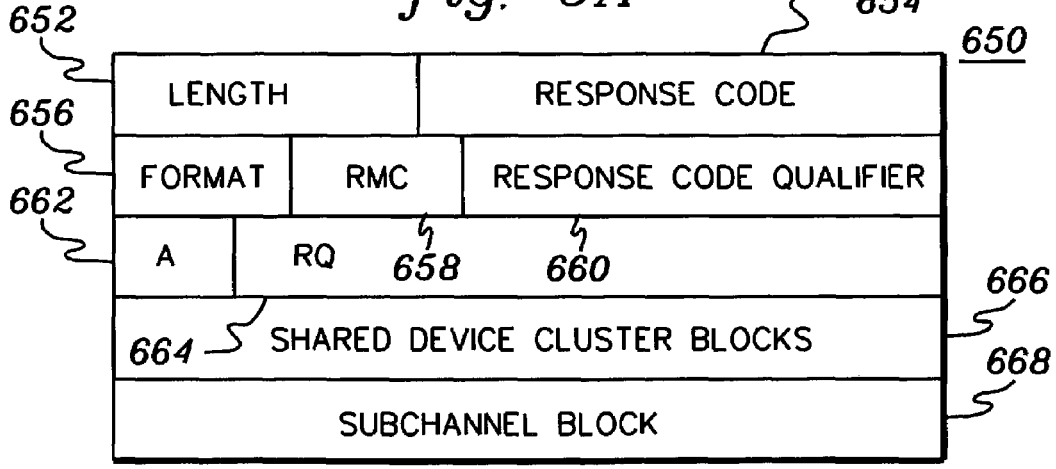
FIG. 6b depicts one embodiment of a response block for the change control unit configuration command, in accordance with an aspect of the present invention.

In one embodiment, a command-response block 650 (FIG. 6*b*) for a Change Control Unit Configuration command includes, for instance, the following:

(a) Length Field 652: This field specifies the length of the command-response block. The length depends on the response code that is stored in the response-code field as a result of the attempt to execute the change control unit configuration command.

(b) Response Code 654: This field includes an unsigned binary integer that describes the results of the attempt to execute the change control unit configuration command.

(c) Format (FMT) 656: The command-response-format field includes an unsigned integer whose value specifies the layout of the command-response block.

(d) Response-Modifier Code (RMC) 658: This field includes an unsigned integer that may provide additional information when the response code is other than an indication of success. The content of the RMC field is distinctive to each response code value. Not all response codes use the RMC field.

(e) Response-Code Qualifier (RCQ) 660: This field may contain a model dependent value that can be used to further describe the condition specified by the response code.

(f) Additional Information (A) 662: When one, this field specifies that the channel subsystem has additional subchannel blocks that cannot be contained in this command-response block. When zero, it specifies that the channel subsystem has no subchannel blocks in addition to those, if any, that are contained in this command-response block.

(g) Response Qualifier (RQ) 664: When the response-code field indicates that the requested configuration change has occurred, the response-qualifier field contains a value that provides information about conditions associated with that change. The meaning of each value is, for instance, as follows:

| | |
|---|---|
| 0 | There are no special conditions associated with the configuration change. |
| 1 | The information provided by the program for the configuration change does not match the physical configuration. |

(h) Shared-Device-Cluster (SDC) Blocks 666: This field includes one or more shared-device-cluster (SDC) blocks. Each SDC block that is specified as being valid describes a shared device cluster that contains one or more I/O-devices that are described as being attached to the control unit specified in the command-request block of the change-control-unit-configuration command that caused the SDC block to be created.

A shared device cluster is either a single control unit that can provide access to at least one I/O device, but does not share access to I/O devices with any other control unit, or it can be a collection of control units and I/O devices that are connected in such a way that for any division of the total collection of control units into two subsets, at least one I/O device is shared by at least one control unit from each subset.

Figure 6C:
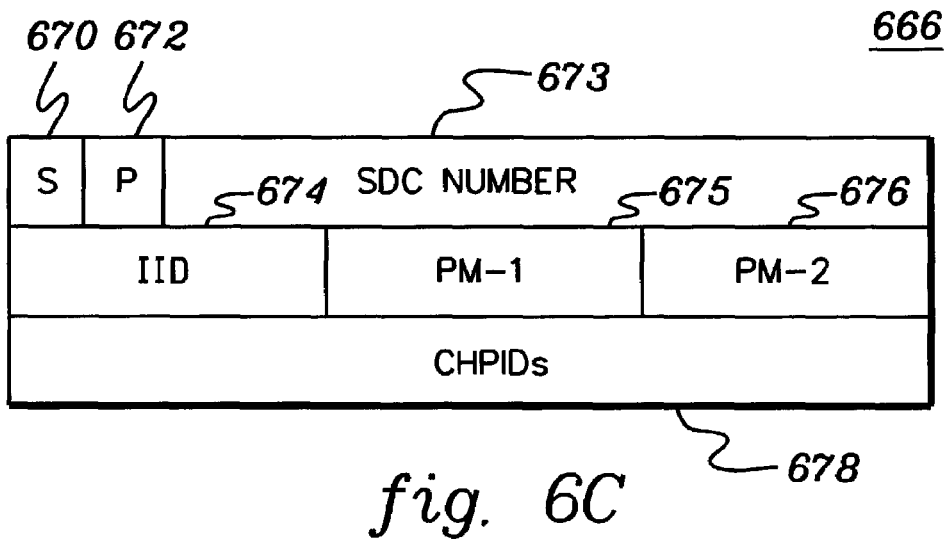
FIG. 6c depicts further details regarding a shared device cluster block of the response block of FIG. 6b, in accordance with an aspect of the present invention.

One example of an SDC block is described with reference to FIG. 6*c*. An SDC block 666 includes, for instance, the following:

(aa) SDC Validity Bit (S) 670: When one, this bit specifies that the associated SDC block is valid. When zero, this bit specifies that the associated SDC block is not valid and there are no subsequent SDC blocks in the command response block that are valid.

(bb) Image ID Validity Bit (P) 672: When one, this bit specifies that the image ID field contains a valid MIF image identification code. When zero, this bit specifies that the contents of the image ID field are meaningless. The P bit can be one, when the CPC is operating in LPAR mode. When the SDC is associated with shared channel paths, this bit is set to zero.

(cc) Shared Device Cluster (SDC) Number 673: This field includes an SDC number that identifies the shared device cluster described by this SDC block. Within a channel subsystem image, every SDC has unique number.

(dd) MIF-Image ID (IID) 674: When the CPC is operating in LPAR mode and the P bit is one, this field includes the MIF-image identification (IID) code associated with the logical partition from which the specified SDC is recognized. The SDC blocks returned are from the same channel subsystem image that was specified in the corresponding command request.

(ee) Path Mask-1 (PM-1) 675: This field specifies the CHPID fields that identify the channel paths that are described in the I/O-configuration definition for the specified SDC. Each bit of the PM-1 field corresponds one-for-one, by relative position, with each of the CHPID fields. A PM-1 bit stored as one specifies that the contents of the corresponding CHPID field identifies a channel path for the specified SDC. A PM-1 bit stored as zero specifies that the contents of the corresponding CHPID field have no meaning.

(ff) Path Mask-2 (PM-2) 676: When the CPC is operating in LPAR mode, this field specifies the CHPID fields that identify the channel paths that are configured to the specified logical partition for the specified SDC. Each bit of the PM-2 field corresponds one-for-one, by relative position, with each of the CHPID fields. A PM-2 bit stored as one specifies that the contents of the corresponding CHPID field identifies a channel path for the specified SDC and the specified logical partition. A PM-2 bit stored as zero specifies that the contents of the corresponding CHPID field have no meaning.

A PM-2 bit can be one, if the corresponding bit of the PM-1 field is one. When the CPC is operating in LPAR mode and the specified channel paths are shared channel paths, the contents of the PM-2 field have no meaning. When the CPC is operating in BASIC mode, the contents of PM-2 field have no meaning.

(gg) Channel-Path Identifiers (CHPfDs) 678: This field includes, for instance, eight CHPID fields. The CHPID fields that correspond to the bits of the PM-1 field that are ones contain the CHPIDs of channel paths for the specified SDC. The contents of CHPID fields that correspond to the bits of the PM-1 field that are zero are meaningless.

(i) Subchannel Blocks 668 (FIG. 6*b*): When the length field contains a value greater than a predetermined value (e.g., 0090 hex), this field includes one or more subchannel blocks. Each subchannel block describes a subchannel that is affected by the requested change to the I/O configuration.

Figure 6D:
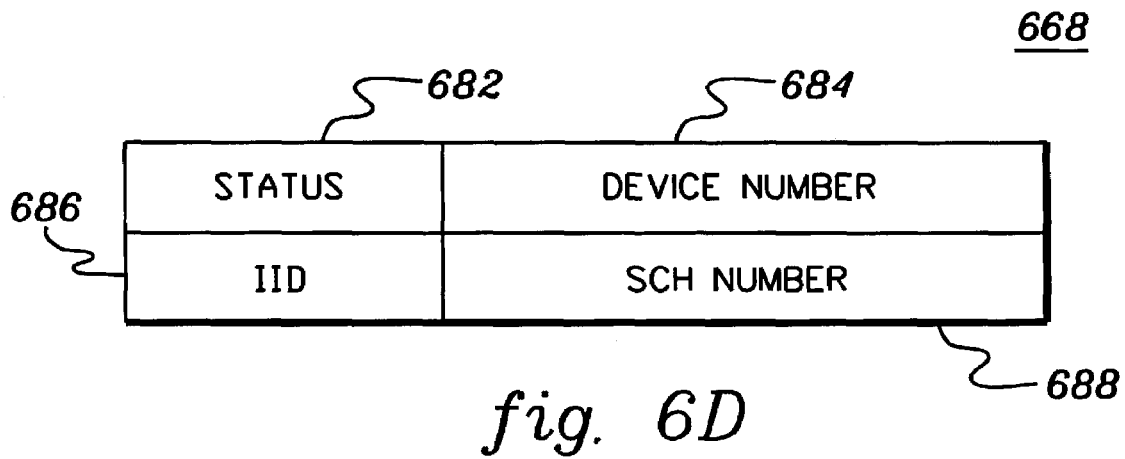
FIG. 6d depicts further details regarding a subchannel block of the response block of FIG. 6b, in accordance with an aspect of the present invention.

One example of a subchannel block is described with reference to FIG. 6d. A subchannel block 668 includes, for instance:

(aa) Status 682: This field includes information about the status of the corresponding I/O-device. The meanings of bits 0-7 are, for instance, as follows:

| Bits | Meaning |
| --- | --- |
| 0 | When one, bit 0 specifies that the installed parameters for the specified subchannel have been set to the initialized state. When zero, bit 0 specifies that the installed parameters for the specified subchannel have been modified, but they are not set to the initialized state. |
| 1 | When one, bit 1 specifies that the IID field contains a valid MIF image-identification code. When zero, bit 1 specifies that the contents of the Image-ID field are meaningless. This bit can be one, when the CPC is operating in LPAR mode. |
| 2 | When the OC field of the command-request block of the change control unit configuration command that caused this subchannel block to be created specifies the modify (delete channel-path access) operation, bit 2 specifies whether a dedicated-allegiance condition existed or whether the channel subsystem was in the process of accepting status that contains unit check, when the modify (delete channel-path access) operation was performed for the specified I/O device. When zero, bit 2 specifies that a dedicated-allegiance condition did not exist. When one, bit 2 specifies that a dedicated-allegiance condition did exist, and bit 3 of the status field specifies whether the channel subsystem was able to clear the associated contingent-allegiance condition at the device.<br>When the OC field of the command-request block of the change control unit configuration command that caused this subchannel block to be created does not specify the modify (delete channel-path-access) operation, bit 2 has no meaning. |
| 3 | When bit 2 of the status field has meaning and is one, bit 3 specifies whether the channel subsystem was able to clear the contingent-allegiance condition at the specified I/O-device. When zero, bit 3 specifies that the channel subsystem was able to clear the contingent-allegiance condition (which could result in zero sense data). When one, bit 3 specifies that the channel subsystem was unable to clear the contingent-allegiance condition.<br>When bit 2 of the status field has no meaning or has meaning and is zero, bit 3 has no meaning. |
| 4 | When the OC field of the command-request block of the change control unit configuration command that caused this subchannel block to be created specifies the modify (delete channel-path access) operation, bit 4 specifies whether an I/O-operation was in progress when the modify (delete channel-path access) operation was performed for the specified I/O-device. When zero, bit 4 specifies that an I/O-operation was not in progress. When one, bit 4 specifies that an I/O-operation was in progress, and bit 5 of the status field specifies whether the channel subsystem was able to terminate the I/O-operation at the specified I/O-device.<br>When the OC field of the command-request block of the change control unit configuration command that caused this subchannel block to be created does not specify the modify (delete channel-path-access) operation, bit 4 has no meaning. |
| 5 | When bit 4 of the status field has meaning and is one, bit 5 specifies whether the channel subsystem was able to terminate the I/O operation at the specified I/O-device. When zero, bit 5 specifies that the channel subsystem was able to terminate the I/O-operation at the I/O-device. When one, bit 5 specifies that the channel subsystem was unable to terminate the I/O operation at the I/O-device.<br>When bit 4 of the status field has no meaning or has meaning and is zero, bit 5 has no meaning. |
| 6 | When the OC field of the command-request block of the change control unit configuration command that caused this subchannel block to be created specifies the modify (delete channel-path access) operation, bit 6 specifies whether the enabled bit (of the PMCW) was one or zero for the specified subchannel, when the channel subsystem started to perform the requested operation. When zero, bit 6 specifies that the enabled bit was zero. When one, bit 6 specifies that the enabled bit was one.<br>When the OC field of the command-request block of the change control unit configuration command that caused this subchannel block to be created does not specify the modify (delete channel-path-access) operation, bit 6 has no meaning. |
| 7 | When the OC field of the command-request block for the change control unit configuration command that caused this subchannel block to be created specifies the modify (delete channel-path access) operation and the CPC is operating in LPAR mode, bit 7 specifies whether the interruption-interlock control bit (of the PMCW) was one or more for the specified subchannel, when the channel subsystem started to perform the requested operation. When zero, bit 7 specifies that the interruption-interlock bit was zero. When one, bit 7 specifies that the interruption-interlock bit was one.<br>When the OC field of the command-request block of the change control unit configuration command that caused this subchannel block to be created does not specify the modify (delete channel-path-access) operation, bit 7 has no meaning. |

(bb) Device Number 684: This field includes a binary representation of the device number for the I/O-device that is associated with the specified subchannel.

(cc) MIF-Image ID (IID) 686: When the CPC is operating in LPAR mode and bit 1 of the status field is one, this field includes the MIF image-identification (IID) code associated with the logical partition with which the specified subchannel is associated. Otherwise, the contents of the IID field have no meaning.

(dd) Subchannel Number 688: This field specifies the subchannel to which the information in this subchannel block applies.

In one example, the following statements apply, when the CPC is operating in LPAR mode, SIE is not active, and the logical-partition hypervisor causes the change control unit configuration command to be executed:

When the multiple channel subsystem facility is provided by the CPC, the effective-CSSID determination process is performed.

The channel subsystem performs the requested configuration change for the control unit specified in the logical-partition-hypervisor request block.

When the command is executed asynchronously, the channel subsystem uses the CHSC subchannel specified by the subsystem-ID word of the logical-partition-hypervisor request block.

If the IID in the subsystem-ID word of the logical-partition-hypervisor request block does not exist for the current configuration, the requested configuration change is not performed and an operand exception condition is recognized.

When an IID is to be stored, the channel subsystem stores it in the MIF-image ID field of the appropriate SDC or subchannel block contained in the logical-partition-hypervisor response block. This IID identifies the MIF image with which an SDC or subchannel is associated. The CSSID specified in the LPAR-hypervisor command-request block together with the IID corresponds to the logical partition on whose behalf the LPAR hypervisor executed the command request.

Described in detail above is processing associated with the Change Control Unit Configuration Request command. As part of the processing to support MCSS, certain error checks are performed, as indicated in FIGS. 6e-6h and described herein.

For example, as shown in FIG. 6e, when the operation code is equal to zero, checks are performed on the CSSID and on the CHPID of the CSSID. If that checking is satisfactory, then the link specified CHPIDs to the control unit and a successful response code is indicated.

Similarly, when an operation code of one is provided, as well as an operation code qualifier of 6 (FIG. 6f), then error checking is performed on the CSSID, CHPIDs of the CSSID and of the control unit. If these checks prove to be satisfactory, then the link specified CHPIDs to the control unit and a successful response code is indicated.

Further, when the operation code is equal to one and the operation code qualifier is set to 7, as shown in FIG. 6g, then checking is performed on the CSSID and control units of the CSSID. If this checking is successful, then the link between the control unit and CHPIDs in the CSS image is broken and a successful return code is indicated.

Lastly, when the operation code is equal to two (FIG. 6h), then checking is performed on the CSSID and the control unit of the CSSID. If the checking proves to be successful, then the link between the control unit and the CHPIDs in the CSS image is broken and a successful return code is indicated.

Another command that is enhanced for MCSS is the Change I/O Device Configuration command. The change I/O device configuration command is used to add, modify, or delete the description of one or more I/O devices in the I/O configuration definition. In one example, the change I/O device configuration command is executed asynchronously, and is not interpretively executed. Specification of the operation to be performed and the information used to change the I/O-configuration definition is provided in a command request block.

Figure 7A:
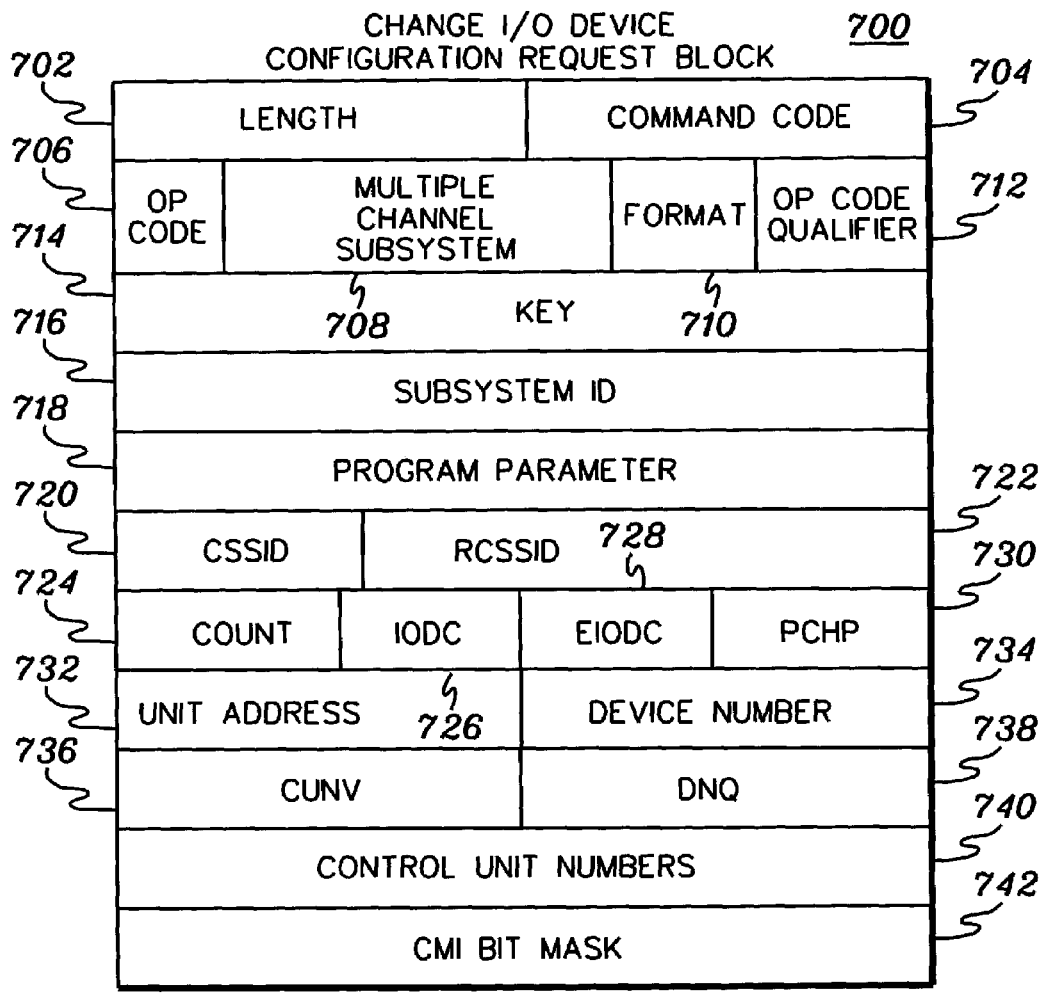
FIG. 7a depicts one embodiment of a request block for a change I/O device configuration command, in accordance with an aspect of the present invention.

One embodiment of a change I/O device configuration command request block is described with reference to FIG. 7a. Change I/O device configuration command request block 700 includes, for instance, the following:

(a) Length Field 702: This field specifies the length of the command-request-block.

(b) Command Code 704: This field specifies the change I/O device configuration command.

(c) Operation Code (OC) 706: This field includes a value that specifies the type of I/O-device configuration operation that is to be performed. The fields of the request-data area of the command-request block that are used are dependent upon the operation to be performed. The contents of request-data-area fields that are not specified as being examined for possible use in performing the requested operation are ignored. The meaning of each value is, for instance, as follows:

| | |
|---|---|
| 0 | Add the description of the specified I/O devices to the I/O configuration definition.<br>Subchannels that are added as a result of the add operation are in the initialized state.<br>When the multiple channel subsystem facility is provided, subchannels that are added are added to the target channel subsystem image specified by the CSSID field.<br>When one or more channel paths that are in the configured state are placed on the list of channel paths that can be used to access the specified I/O devices, the corresponding bits of the path-installed mask (PIM) and the path-available mask (PAM) for each subchannel associated with the specified I/O devices are set to ones. If the channel paths are in the not-configured state, the appropriate PIM bits are set to ones.<br>All of the fields except for the DNQ and RCSSID fields are examined for use in performing the add operation. |
| 1 | Modify the description of the specified I/O devices in the I/O-configuration definition. The type of modification is specified by the operation-code qualifier (OCQ).<br>The M-bit, CSSID, count, unit-address, device-number and DNQ fields are used to identify the I/O devices for which descriptions are to be modified. Additional fields may be used, depending on the contents of the OCQ field. Additional fields that are used are identified in the descriptions of the OCQ values. |
| 2 | Delete the description of the specified I/O devices from the I/O-configuration definition.<br>Subchannels that are deleted as a result of the delete operation have the device-number-valid bit set to zero.<br>When the multiple channel subsystem facility is provided, the effective CSSID is to specify the remaining channel subsystem image that contains subchannel images for the specified I/O devices.<br>The M-bit, CSSID, count, unit-address, device-number, and DNQ fields are the only fields that are examined for use in performing the delete operation. |
| 3 | Store additional information: One or more subchannel blocks that could not be contained in the command-response block for a previous change I/O device configuration command are requested. When the OC field contains a value of 3, no change is made to the I/O-configuration definition.<br>The contents of the OCQ field, the M-bit, the program parameter, CSSID, RCSSID, Count, IODC, EIODC, PCHP, Unit Address, Device Num, CUNV, DNQ, CUNs, and CMI Bit Mask of the request block are ignored. |

Successful add, modify, and delete operations cause the I/O-configuration-changed condition to be set in the channel subsystem.

Successful add, modify, and delete operations cause the channel subsystem to retain the specified program parameter, replacing the current program parameter, if any, in the channel subsystem.

An operation is considered to be successful when the channel subsystem attempts to store a successful response code, even if that attempt is unsuccessful.

(d) Multiple Channel subsystem Bit (M) 708: When the multiple channel subsystem facility is provided by the CPC and is one, the CSSID and RCSSID fields are checked for a valid CSSID. If valid, the values in the CSSID and RCSSID fields become their respective effective CSSIDs. When M is zero, the default CSSID is the effective CSSID and the CSSID and RCSSID fields are to be zero.

(e) Format (FMT) 710: The command-request-format field contains an unsigned integer whose value specifies the layout of the command-request block.

(f) Operation-Code Qualifier (OCQ) 712: This field includes a value that qualifies the operation specified by the OC field. The meaning of each value of the OCQ field is, for instance, as follows:

| | |
|---|---|
| 0 | The operation specified by the OC field is not qualified by the OCQ field. |
| 1 | Add control-unit access: The I/O-configuration definition is to be modified by adding one or more control units to the current list of control units that can be used to access the specified I/O devices. If the specified subchannel images or control-unit images are not |

|   |   |
|---|---|
|   | already defined in the specified channel subsystem image, a defined response code may be stored. |
|   | Subchannels that are added as a result of the modify (add control-unit access) operation are in the initialized state and are not enabled. |
|   | When one or more channel paths that are in the configured state are placed on the list of channel paths that can be used to access the specified I/O devices, the corresponding bits of the path-installed mask (PIM) and the path-available mask (PAM) for each subchannel associated with the specified I/O devices are set to ones. If the channel paths are in the not-configured state, the appropriate PIM bits are set to ones. |
|   | This OCQ value may be specified, when the OC field specifies the modify operation. |
|   | The CUNV and CUN fields are used for this modify operation. The CUNV field is to contain at least one bit that is one. Each valid CUN field specifies a control unit that is to be added to the list of control units for the specified I/O devices. |
| 2 | Delete control-unit access: The I/O-configuration definition is to be modified by deleting one or more control units from the current list of control units that can be used to access the specified I/O devices. |
|   | Subchannels that are deleted as a result of the modify (delete control-unit access) operation have the device-number-valid bit set to zero. |
|   | When one or more channel paths are deleted from the list of channel paths that can be used to access the specified I/O devices, the corresponding bits of the path-installed mask (PIM) and the path-available mask (PAM) for each subchannel associated with the specified I/O device are set to zeros. |
|   | This OCQ value may be specified, when the OC field specifies the modify operation. |
|   | The CUNV and CUN fields are used for this modify operation. The CUNV field is to contain at least one bit that is one. Each valid CUN field specifies a control unit that is to be deleted from the list of control units for the specified I/O devices. |
|   | If the removal of access for a control unit results in the removal of a preferred channel path for one or more I/O devices attached to the specified control unit, then it is as if no preferred path has been defined when those I/O devices were initially described in the I/O-configuration definition. If the affected I/O devices are to once again have preferred channel paths for I/O operations, the description of those I/O devices is to be changed. |
| 3 | Modify I/O-device characteristics: The characteristics of the specified I/O devices are to be replaced by the characteristics specified in the IODC field. CTCA mode specification (in the IODC field) is an exception to this rule because the ability to specify CTCA mode is not provided when the OC field specifies the modify operation. I/O-device-type specification (in the IODC field) is an exception to this rule because the device type being a direct-access-storage device or not being a direct-access-storage device is not applicable. |
|   | This OCQ value may be specified, when the OC field specifies the modify operation. |
|   | The IODC and PCHP fields are used for this modify operation. When the multiple channel subsystem facility is provided, modification of I/O-device characteristics is confined to the scope of the target channel subsystem image specified by the CSSID field. With the exception of the setting of the preferred-channel-path bit, it is the responsibility of the program to maintain a consistent setting of the device characteristics bits across channel subsystem images that contain subchannels for the specified devices. |
| 4 | Add MIF-images access: The I/O-configuration definition is to be modified by adding one or more MIF images to the list of MIF images within the specified channel subsystem image that provide shared access to the specified I/O device. The candidate-MIF-images bit mask specifies the additional MIF images through which shared access is to be provided. |
|   | In this embodiment, the MIF images within a channel subsystem image that provide shared access to the specified I/O device use the same subchannel number to do so. As viewed through the MIF image to which shared access has been added as a result of the modify operation, the associated subchannel is in the initialized state and is not enabled. |
|   | When the channel paths that attach the specified I/O device are in the configured state for a specified MIF image, the corresponding bits of the path-installed mask (PIM) and the path-available mask (PAM) for the associated subchannel are set to ones. When the channel paths are in the not-configured state, the appropriate PIM bits are set to ones. |
|   | This OCQ value can be specified, when the CPC is operating in LPAR mode, the OC field specifies the modify operation, and the specified I/O device is attached to shared channel paths. |
|   | The candidate-MIF-images bit mask is examined for use in performing this operation. |
| 5 | Delete MIF-image access: The I/O-configuration definition is modified by deleting one or more MIF images from the list of MIF images within the specified channel subsystem image that can provide shared access to the specified I/O device. The candidate-MIF-images bit mask specifies the MIF images from which shared access is to be deleted. |
|   | As viewed from the MIF image from which shared access has been deleted as a result of the modify operation, the associated subchannel has the device-number-valid bit set to zero. |
|   | When access by all provided MIF images has been deleted, the specified I/O-device descriptions are not deleted from the I/O-configuration definition. |
|   | This OCQ value can be specified, when the CPC is operating in LPAR mode, the OC field specifies the modify operation, and the specified I/O device is attached to shared channel paths. |
|   | The candidate-MIF-images bit mask is examined for use in performing this operation. |
| 6 | Add subchannel image to channel subsystem image: This OCQ value applies, when the multiple channel subsystem facility is provided by the CPC. |
|   | The I/O configuration definition is modified by adding subchannel images for the specified I/O devices to the target channel subsystem image specified by the CSSID field. This introduces access to the devices via one or more specified control units that are configured in the specified target channel subsystem image. Subchannels that are added as a result of this operation are in the initialized state and are not enabled. |
|   | When one or more channel paths that are in the configured state are placed on the list of channel paths that can be used to access the specified I/O devices, the corresponding bits of the path-installed mask (PIM) and the path-available mask (PAM) for each subchannel associated with the specified I/O devices are set to ones. If the channel paths are in the not-configured state, the appropriate PIM bits are set to ones. |
|   | Specified I/O devices are to already exist in the I/O configuration and have subchannel images in the reference channel subsystem image specified by the RCSSID field. Specified I/O devices are not to already have subchannel images in the target channel subsystem image specified by the CSSID field. The reference and target channel subsystem images are not to be the same (CSSID is not to equal RCSSID). |
|   | Each valid CUN field is to specify a control unit that already exists in the target channel subsystem image. |
|   | The RCSSID, IODC, PCHP, CUNV, CUN, and candidate-MIF-images bit mask fields are used for this modify operation. The CUNV field is to contain at least one bit that is one. Each valid CUN field specifies a control unit that is added to the list of control units that can be used to access the specified devices. |
| 7 | Delete subchannel image from channel subsystem image: This OCQ value applies, when the multiple channel subsystem facility is provided by the CPC. The I/O configuration definition is modified by deleting the subchannel images for the specified I/O devices from the target channel subsystem image specified by the CSSID field. |
|   | The subchannel images are effectively deleted from the MIF images within the target channel subsystem image. Subchannels that are deleted as a result of this modify operation have the device-number-valid bit set to zero. |
|   | The specified devices being deleted by this operation are to have subchannel images currently defined in more than one channel subsystem image. |

(g) Key 714: This field includes the storage-access key used by the channel subsystem to access the command-request block and the command-response block for asynchronous operations that are initiated by the command.

(h) Subsystem ID 716: This field specifies the CHSC subchannel that is used to perform operations that are asynchronous to CHSC execution.

(i) Program Parameter 718: This field includes a value that the program associates with this change I/O device configuration command.

(j) Channel subsystem-Image ID (CSSID) 720: When the multiple channel subsystem facility is provided by the CPC, this field may specify the CSSID of the target channel subsystem image that is used to locate the preferred channel path that is specified by the PCHP field, the I/O devices that are specified by the device-number and count fields, and any control units specified by the CUNV and CUN fields. The CSSID is subject to range and existence checking.

(k) Reference Channel subsystem-Image ID (RCSSID) 722: When the multiple channel subsystem facility is provided and the modify (add-subchannel-image-to-channel subsystem image) operation is specified, this field includes the CSSID of a reference channel subsystem image from which device attributes are inherited for the device specified by the device number and count fields. For all other operations, this field includes zero. The RCSSID value is subject to range and existence checking.

(l) Count 724: This field specifies one less than the number of I/O devices that are the object of the change I/O device configuration command. Device numbers for the specified I/O devices are determined by using consecutive device numbers beginning with the value contained in the device-number field. Similarly, unit addresses for the specified I/O devices are determined by using consecutive unit addresses beginning with the value contained in the unit-address field.

(m) I/O-Device Characteristics (IODC) 726: This field specifies characteristics of the specified I/O devices. The contents of the IODC field are meaningful, when the OC field specifies the add operation, or the OC field specifies the modify operation and the OCQ field specifies modify I/O-device characteristics. The preferred-channel-path bit of the IODC field is meaningful, when the OC field specifies the modify operation and the OCQ field specifies add subchannel image to channel subsystem image. The meanings of bits 0-7 are, for example, as follows:

| Bits | Meaning |
| --- | --- |
| 0 | Time Out: When zero, bit 0 specifies that the time-out function is not active for the specified I/O devices. When one, bit 0 specifies that the time-out function is active for the specified I/O devices.<br>Bit 0 is ignored and the time-out function is active for I/O devices that can be accessed by means of parallel-byte-multiplexer channels, serial-I/O channels, fibre-channel channels, and fibre-channel-converted channels, as examples.<br>Bit 0 is ignored and the time-out function does not apply for I/O devices that can be accessed by means of internal-system-device channels, direct-system-device channels, emulated-I/O channels, OSA-express channels, OSA-direct-express channels, open-fibre-channel-protocol-channel, and internal-queued-direct-communication channels, as examples. |
| 1 | Status Verification: When zero, bit 1 specifies that status verification will not be performed for status that is presented by the specified I/O devices. When one, bit 1 specifies that status verification will be performed for status that is presented by the specified I/O devices.<br>Bit 1 is ignored and the status-verification function does not apply for I/O devices that can be accessed by means of direct-system-device channels, emulated-I/O channels, OSA-express channels, OSA-direct-express-channels, open-fibre-channel-protocol channels, and internal-queued-direct-communication channels, as examples. |
| 2 | Preferred Channel Path: When zero, bit 2 specifies that there is no preferred channel path that is to be used when there are I/O requests for the specified I/O devices, and the contents of the PCHP field have no meaning. When one, bit 2 specifies that there |

-continued

| Bits | Meaning |
| --- | --- |
|  | is a preferred channel path that is to be used when there are I/O requests for the specified I/O devices, and the contents of the PCHP field identify that channel path. |
| 3 | I/O-device-type specification: When zero, bit 3 indicates that the specified I/O devices are not direct-access-storage devices. When one, bit 3 indicates that the specified I/O devices are direct-access-storage devices. |
| 4 | CTCA Mode Specification: When zero, bit 4 indicates that the specified I/O devices are CTCA-type I/O devices that provide extended-mode CTCA capabilities. When one, bit 4 indicates that the specified I/O devices are CTCA-type I/O devices that provide basic-mode CTCA capabilities.<br>Bit 4 has meaning under the following conditions:<br><br>The OC field specifies the add operation.<br>Only one CUN field is specified as containing valid information.<br>The channel path to which the specified control unit is attached is an ESCON serial-I/O channel path that can be used to provide access to a channel-to-channel adapter (CTCA) in the CPC that contains that channel path.<br>Otherwise, bit 4 has no meaning and is ignored. |
| 5–7 | Reserved. |

(n) Extended-I/O-Device Characteristics (EIODC) 728: This field specifies additional characteristics of the specified I/O devices. A bit of the EIODC field is meaningful independent of the values specified in the OC and OCQ fields, unless specified otherwise in the description of the bit. The meanings of bits 0-7 are as follows:

| Bits | Meanings |
| --- | --- |
| 0 | Conflict-Response-Code Control: Bit 0 of the EIODC field determines which response code should be stored in the response block, if the channel subsystem detects a conflict while attempting to make a requested change to the list of candidate-MIF images that can share the specified I/O device.<br>When bit 0 of the EIODC field is zero and the following conditions, as one example, apply, the channel subsystem stores an appropriate response-code in the response block:<br><br>The CPC is operating in LPAR mode.<br>Bit 30 of the general-characteristics field in a response block for a Store Channel Subsystem Characteristics command is one, indicating that the fibre-channel (FC) facilities are provided.<br>The OC field specifies the modify operation.<br>The specified I/O devices are attached to one or more shared channel paths.<br>One or more of the MIF images specified in the candidate-MIF-images bit mask already has access to the specified device (in the case of addition), or one or more of the MIF images specified in the candidate-MIF-images bit mask does not have access to the specified device (in the case of deletion).<br>When bit 0 of the EIODC field is one and the above conditions apply, the channel subsystem stores an appropriate response-code in the response block.<br>Otherwise, bit 0 has no meaning and is ignored. |
| 1–7 | Reserved |

(o) Preferred Channel Path (PCHP) 730: When the contents of the IODC field apply and bit 2 is one, this field specifies the channel-path identifier (CHPID) of the first channel path that the channel subsystem is to attempt to use when there are I/O requests for the specified I/O devices. When the multiple channel subsystem facility is provided, the effective CSSID specifies the channel subsystem image in which the devices and preferred channel path are located.

(p) Unit Address 732: When the count field contains a value of zero, this field includes the unit address for the specified I/O device. When the count field contains a value that is greater than zero, this field includes a unit address that is the first of a range of unit addresses for the specified I/O devices.

(q) Device Number 734: When the count field contains a value of zero, this field includes the binary representation of the device number for the specified I/O device. When the count field contains a value that is greater than zero, this field includes a device number that is the first of a range of device numbers for the specified I/O devices. When the multiple channel subsystem facility is provided, the effective CSSID specifies the channel subsystem image in which the devices are located.

The same number space is used for both I/O-device number and message-device number values.

(r) Control-Unit Validity (CUNV) 736: This field specifies which of the control-unit-number (CUN) fields contain valid information.

Bits 0-7 of the CUNV field correspond, from left to right, with each of the eight CUN fields. When one, a CUNV bit specifies that the corresponding CUN field contains a valid control-unit number. When zero, a CUNV bit specifies that the corresponding CUN field does not contain a valid control-unit number and is ignored.

When the OC field specifies the add operation, the CUNV field is not to contain all zeros. The contents of the valid CUN fields identify the control units that can be used to access the specified I/O devices.

When the OC field specifies the modify operation and the OCQ field specifies add or delete control-unit access or add subchannel image to channel subsystem image, the CUNV field is not to contain all zeros. The contents of the valid CUN fields identify control units that are to be added to or deleted from the list of control units that can be used to access the specified I/O devices.

When the multiple channel subsystem facility is provided, the OC field specifies modify, and the OCQ field specifies add subchannel image to channel subsystem image, the specified control units are to have access to the target channel subsystem image specified by the CSSID field.

(s) Device-Number Qualifier (DNQ) 738: The device-number qualifier can be used to distinguish I/O devices that are attached to the specified control unit from I/O devices that have the same device number and are attached to other control units.

I/O devices that are attached to the same control unit and have the same device number can be distinguished by the unit address associated with each I/O device.

I/O devices that are attached to different control units and have the same device number can be distinguished by placing the control-unit number of the control unit to which the I/O devices are attached in the DNQ field.

(t) Control-Unit Number (CUN) 740: When bits 0-7 of the CUNV field are not all zeros, this field includes up to, for instance, eight control-unit numbers. Each CUN field that is specified as being valid by the contents of the CUNV field contains a unique identifier of a control unit that can be used to access the specified I/O devices.

Control-unit numbers and message-processor numbers share the same number space.

(u) Candidate-MIF-Images Bit Mask 742: When the CPC is operating in LPAR mode and the specified device is attached to one or more shared channel paths, this mask is used to specify which MIF images are to provide shared access to the specified I/O device.

This mask is ignored when the specified I/O device is attached to unshared channel paths, the OC field specifies the delete or modify (delete subchannel image from channel subsystem image) operation, or the CPC is operating in BASIC mode.

A MIF image can be a candidate, even if it does not have access to any of the channel paths to which the device is attached.

A candidate MIF image can provide access to the specified device concurrently with other candidate MIF images, provided that it has access to one or more of the shared channel paths to which the device is attached.

There is a one-to-one numerical correspondence between MIF-image IDs (IIDs) and the bit position numbers in this mask. A one in a particular bit position of this mask specifies an IID that has a value equal to the corresponding bit number.

When the OC field specifies the add or modify (add subchannel image to channel subsystem image) operation, a one in a bit position of this bit mask indicates that the corresponding MIF image within the target channel subsystem image is a candidate for providing access to the specified I/O devices. A zero in a bit position of this mask indicates that the corresponding MIF image is not a candidate for providing access to the specified I/O device. At least one bit (of this bit mask) is to be one and correspond to a MIF image that is provided.

When the OC field specifies the modify operation and the OCQ field specifies the added-MIF-image-access operation, a one in a bit position of this bit mask indicates that the corresponding MIF image is to be added as a candidate within the specified target channel subsystem image for providing access to the specified I/O devices. A zero in a bit position of this mask indicates that the corresponding MIF image is not to be added as a candidate for providing access to the specified I/O devices, although it may already be a candidate. At least one bit (of this bit mask) is to be one and correspond to a MIF image that is provided, and no bits can be one that correspond to MIF images that already are candidate-MIF images for the specified I/O devices within the specified target channel subsystem image.

When the OC field specifies the modify operation and the OCQ field specifies the delete-MIF-image-access operation, a one in a bit position of this bit mask indicates that the corresponding MIF image is to be deleted as a candidate within the specified target channel subsystem image for providing access to the specified I/O devices. A zero in a bit position of this mask indicates that the correspondingly numbered MIF image is not to be deleted as a candidate for providing access to the specified I/O devices. At least one bit (of this bit mask) is to be one and correspond to a MIF image that is provided, and all bits that are one are to correspond to MIF images that are candidate-MIF images for providing access to the specified I/O devices.

Figure 7B:
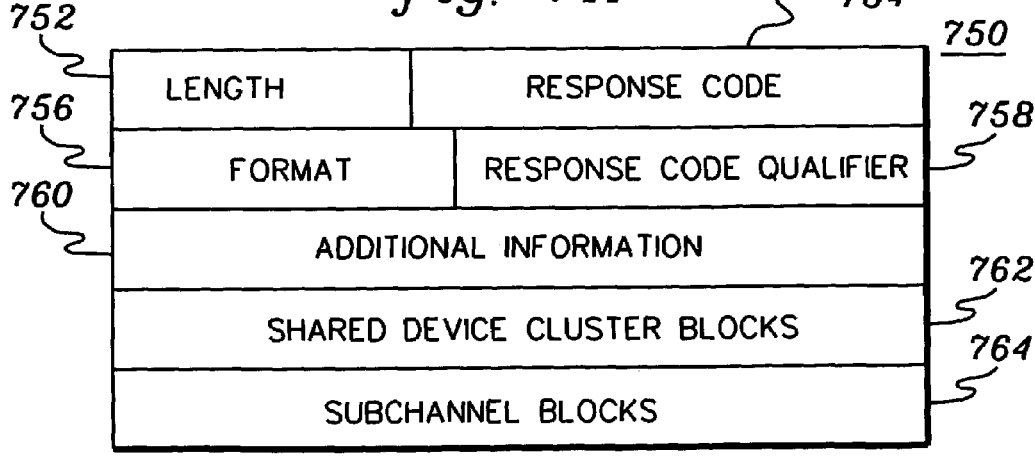
FIG. 7b depicts one embodiment of a response block for the change I/O device configuration command, in accordance with an aspect of the present invention.

One embodiment of a command-response block for a Change I/O Device Configuration command is described with reference to FIG. 7b. In one example, a command response block 750 includes, for instance, the following:

(a) Length Field 752: This field specifies the length of the command-response block. The length depends on the response code that is stored in the response-code field as a result of the attempt to execute the change I/O device configuration command, and on the type and amount of information to be stored.

(b) Response Code 754: This field includes an unsigned binary integer that describes the results of the attempt to execute the change I/O device configuration command.

(c) Format (FMT) 756: The command-response-format field includes an unsigned integer whose value specifies the layout of the command response block.

(d) Response-Code Qualifier (RCQ) 758: When a response code other than a code indicating success is stored in the response-code field, this field may include a model dependent value that can be used to further describe the condition specified by the response code.

(e) Additional Information (A) 760: When one, this field specifies that the channel subsystem has additional subchannel blocks that cannot be contained in this command-response block. When zero, this field specifies that the channel subsystem has no subchannel blocks in addition to those (if any) that are contained in this command-response block.

The execution of a change-I/O-device configuration command that specifies the add, modify (add or delete control-unit access or add subchannel image to channel subsystem image or delete subchannel image from channel subsystem image) or delete operation can result in the creation of more subchannel blocks than can be contained in the command response block. In this case, the channel subsystem creates a set of command response blocks.

A first of the set of command response blocks is provided as part of the execution of the change-I/O-device-configuration command that caused the set of command response blocks to be created. The program can obtain the remaining command response blocks by repeatedly executing the change I/O device configuration command with the store-additional-information operation specified. Each remaining response block contains one or more consecutive subchannel blocks. The last command-response block of the set has an A bit that is zero.

(f) Shared-Device-Cluster (SDC) Blocks 762: This field includes, as one example, eight shared-device-cluster (SDC) blocks. Each SDC block that is specified as being valid describes a shared device cluster that contains one or more of the I/O devices that are specified in the command request block of the change I/O device configuration command that caused the SDC block to be created.

A shared device cluster is either a single control unit that can provide access to at least one I/O device, but does not share access to I/O devices with any other control unit, or it can be a collection of control units and I/O devices that are connected in such a way that for any division of the total collection of control units into two subsets, at least one control unit in each subset shares access to at least one I/O device.

Figure 7C:
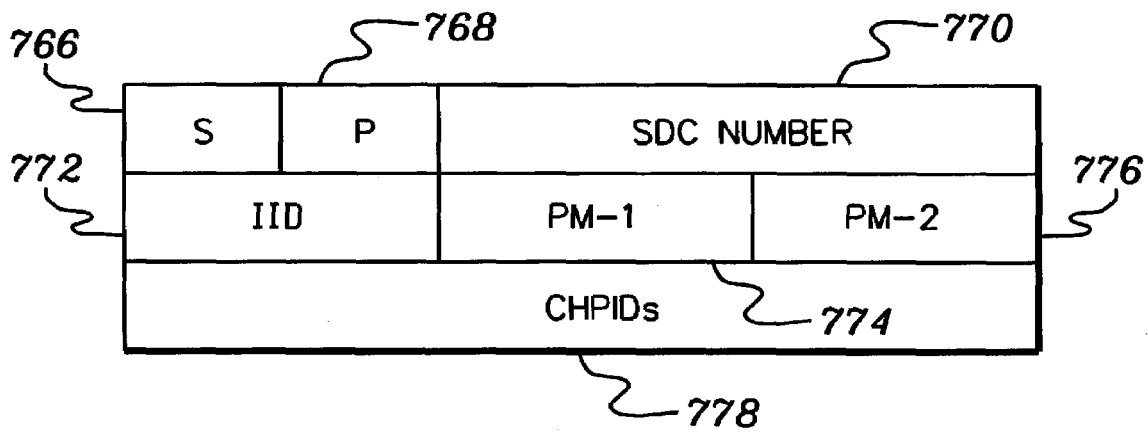
FIG. 7c depicts one embodiment of further details regarding a shared device cluster block of the response block of FIG. 7b, in accordance with an aspect of the present invention.

One example of an SDC block is described with reference to FIG. 7c. SDC block 762 includes, for instance, the following:

(aa) SDC Validity Bit (S) 766: When one, this field specifies that the associated SDC block is valid. When zero, this field specifies that the associated SDC block is not valid and there are no subsequent SDC blocks in the command response block that are valid.

(bb) Image-ID Validity Bit (P) 768: When one, this field specifies that the IID field contains a valid MIF-image ID. When zero, this field specifies that the contents of the IID field are meaningless. The P bit can be one, when the CPC is operating in LPAR mode. When the SDC is associated with shared channel paths, it is set to zero.

(cc) Shared-Device-Cluster (SDC) Number 770: This field includes an SDC number that identifies the shared device cluster described by this SDC block. Within a channel subsystem image, every SDC has a unique number.

(dd) MIF-Image ID (IID) 772: When the CPC is operating in LPAR mode and the P bit is one, this field includes the image-identification code (IID) of the MIF image in which the specified SDC is recognized.

(ee) Path Mask-1 (PM-1) 774: This field specifies the CHPID fields that identify the channel paths that are described in the I/O-configuration definition for the specified SDC. (The PM-1 field corresponds to a path-installed mask (PIM).) Each bit of the PM-1 field corresponds one-for-one, by relative position, with each of the CHPID fields. A PM-1 bit stored as one specifies that the contents of the corresponding CHPID field identify a channel path for the specified SDC. A PM-1 bit stored as zero specifies that the contents of the corresponding CHPID field have no meaning.

(ff) Path Mask-2 (PM-2) 776: When the CPC is operating in LPAR mode, this field specifies the CHPID fields that identify the channel paths for the specified SDC that are configured to the specified MIF image. (For unshared channel paths, the PM-2 field corresponds to a path-available mask (PAM).) Each bit of the PM-2 field corresponds one-for-one, by relative position, with each of the CHPID fields. A PM-2 bit stored as one specifies that the contents of the corresponding CHPID field identify a channel path for the specified SDC and the specified MIF image. A PM-2 bit stored as zero specifies that the contents of the corresponding CHPID field have no meaning.

A PM-2 bit may be one, if the corresponding bit of the PM-1 field is one. When the CPC is operating in LPAR mode and the specified channel paths are shared channel paths, the contents of the PM-2 field have no meaning. When the CPC is operating in BASIC mode, the PM-2 field has no meaning.

(gg) Channel-Path Identifiers (CHPIDs) 778: This field includes, for example, eight CHPID fields. The CHPID fields that correspond to the bits of the PM-1 field that are ones contain the CHPIDs of channel paths for the specified SDC. The contents of CHPID fields that correspond to the bits of the PM-1 field that are zeros are meaningless.

(g) Subchannel Blocks 764 (FIG. 7b): When the length field contains a value greater than a predetermined number (e.g., 90 hex), this field includes one or more subchannel blocks. Each subchannel block describes a subchannel that is affected by the requested change to the I/O configuration.

Figure 7D:
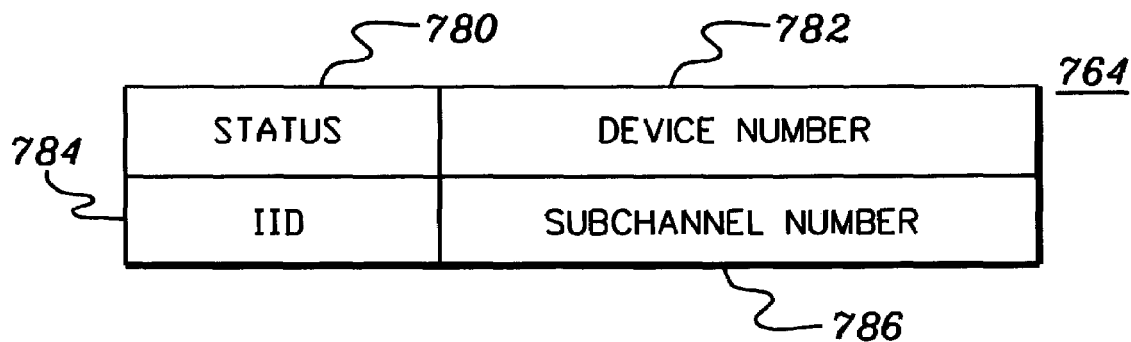
FIG. 7d depicts one example of further details of a subchannel block of the response block of FIG. 7b, in accordance with an aspect of the present invention.

One example of a subchannel block is described with reference to FIG. 7d. Subchannel Block 764 includes, for instance, the following:

(aa) Status 780 (FIG. 7d): This field includes information regarding the status of the corresponding I/O device. The meanings of bits 0-7 are, for instance, as follows:

| Bits | Meanings |
|---|---|
| 0 | When one, bit 0 specifies that the installed parameters for the specified subchannel have been set to the initialized state. When zero, bit 0 specifies that the installed parameters for the specified subchannel have been modified, but they are not set to the initialized state. |

-continued

| Bits | Meanings |
|---|---|
| 1 | When one, bit 1 specifies that the IID field contains a valid MIF-image ID. When zero, bit 1 specifies that the contents of the IID field are meaningless. This bit can be one, when the CPC is operating in LPAR mode. |
| 2 | When the OC field of the command-request block of the change I/O device configuration command that caused this subchannel block to be created specifies the modify (delete control-unit access or delete MIF-image access or delete subchannel image from channel subsystem image) or delete operation, bit 2 specifies whether a dedicated-allegiance condition existed or whether the channel subsystem was in the process of accepting status that contained unit check, when the change I/O device configuration command was performed for the specified I/O device. When zero, bit 2 specifies that a dedicated-allegiance condition did not exist. When one, bit 2 specifies that a dedicated-allegiance condition did exist, and bit 3 of the status field specifies whether the channel subsystem was able to clear the associated contingent-allegiance condition at the device.<br>When the OC field of the command-request block of the change I/O device configuration command that caused this subchannel block to be created does not specify the modify (delete control-unit access or delete MIF-image access or delete subchannel image from channel subsystem image) or delete operation, bit 2 has no meaning. |
| 3 | When bit 2 of the status field has meaning and is one, bit 3 specifies whether the channel subsystem was able to clear the contingent-allegiance condition at the specified I/O device. When zero, bit 3 specifies that the channel subsystem was able to clear the contingent-allegiance condition (which could result in zero sense date). When one, bit 3 specifies that the channel subsystem was unable to clear the contingent-allegiance condition.<br>When bit 2 of the status field has no meaning or has meaning and is zero, bit 3 has no meaning. |
| 4 | When the OC field of the command-request block of the change I/O device configuration command that caused this subchannel block to be created specifies the modify (delete control-unit access or delete MIF-image access or delete subchannel image from channel subsystem image) or delete operation, bit 4 specifies whether an I/O operation was in progress when the change I/O device configuration command was performed for the specified I/O device. When zero, bit 4 specifies that an I/O operation was not in progress. When one, bit 4 specifies that an I/O operation was in progress, and bit 5 of the status field specifies whether the channel subsystem was able to terminate the I/O operation at the specified I/O device.<br>When the OC field of the command-request block of the change I/O device configuration command that caused this subchannel block to be created does not specify the modify (delete control-unit access or delete MIF-image access or delete subchannel image from channel subsystem image) or delete operation, bit 4 has no meaning. |
| 5 | When bit 4 of the status field has meaning and is one, bit 5 specifies whether the channel subsystem was able to terminate the I/O operation at the specified I/O device. When zero, bit 5 specifies that the channel subsystem was able to terminate the I/O operation at the I/O device. When one, bit 5 specifies that the channel subsystem was unable to terminate the I/O operation at the I/O device.<br>When bit 4 of the status field has no meaning or has meaning and is zero, bit 5 has no meaning. |
| 6 | When the OC field of the command-request block of the change I/O device configuration command that caused this subchannel block to be created specifies the modify (delete control-unit access or delete MIF-image access or delete subchannel image from channel subsystem image) or delete operation, bit 6 specifies whether the enabled bit (of the PMCW) was one or zero for the specified subchannel, when the channel subsystem started to perform the requested operation. When zero, bit 6 specifies that the enabled bit was zero. When one, bit 6 specifies that the enabled bit was one.<br>When the OC field of the command-request block of the change I/O device configuration command that caused this subchannel block to be created does not specify the modify (delete control-unit access or delete MIF-image access or delete subchannel image from channel subsystem image) or delete operation, bit 6 has no meaning. |
| 7 | When the OC field of the command-request block for the change I/O device configuration command that caused this subchannel block to be created specifies the modify (delete control-unit access or delete MIF-image access or delete subchannel image from channel subsystem image) or delete operation and the CPC is operating in LPAR mode, bit 7 specifies whether the interruption-interlock control bit (of the PMCW) was one or zero for the specified subchannel, when the channel subsystem started to perform the requested operation. When zero, bit 7 specifies that the interruption-interlock bit was zero. When one, bit 7 specifies that the interruption-interlock bit was one.<br>When the OC field of the command-request block of the change I/O device configuration command that caused this subchannel block to be created does not specify the modify (delete control-unit access or delete MIF-image access or delete subchannel image from channel subsystem image) or delete operation, bit 7 has no meaning. |

(bb) Device Number 782: This field includes a binary representation of the device number for the I/O device that is associated with the specified subchannel.

(cc) MIF-Image ID (IID) 784: When the CPC is operating in LPAR mode and bit 1 of the status field is one, this field includes the image-identification code (IID) of the MIF image with which the specified subchannel is associated. Otherwise, the contents of the IID field have no meaning.

(dd) Subchannel Number 786: This field specifies the subchannel to which the information in this subchannel block applies.

In one example, when the CPC is operating in LPAR mode, the following statements apply:

When the OC field specifies the add operation or modify (add MIF-image access) operation, one subchannel image is added for each MIF image specified in the candidate-MIF-images bit mask, independently of whether the corresponding MIF image has access to any of the channel paths to which the device is attached. Each added subchannel image within the specified channel subsystem image is configured with the same subchannel number and each MIF image can be used to concurrently access the specified device provided that the MIF image has access to one or more of the shared channel paths to which the device is attached.

When the OC field specifies the delete or modify (delete subchannel image from channel subsystem image) operation, the subchannel images for provided MIF images within the specified channel subsystem image are deleted from the I/O-configuration definition.

When the OC field specifies the modify (delete MIF-image access) operation, the subchannel images for each MIF image specified in the candidate-MIF-images bit mask for the specified channel subsystem-image are deleted from the I/O-configuration definition.

When the CPC is operating in LPAR mode, the logical partition hypervisor, not the channel subsystem in this example, ensures that a maximum of one subchannel within a given channel subsystem image for a given device number is configured to a logical partition at any instant in time, regardless of the number of subchannels defined in the I/O-configuration definition that have the same device number.

Described in detail above is processing associated with a Change I/O Device Configuration Request command. As part of the processing to support MCSS, certain error checks are performed, as indicated in FIGS. 7e-7h and described herein.

For example, as shown in FIG. 7e, when the operation code is equal to zero, checks are performed on the CSSID, a specified control unit, and a specified I/O device. If that checking is satisfactory, then the device is added and a successful response code is indicated.

Similarly, when the operation code is equal to one and an operation code qualifier is set to 6 (FIG. 7f), checking is performed on the CSSID, the RCSID, a specified control unit and a specified I/O device. If the checking is successful, then once again the device is added and a successful response code is indicated.

As a further example, when the operation code is equal to one and the operation code qualifier is set to 7 (FIG. 7g), then checks are performed on the CSSID, and the I/O device. If the checking is successful, then the device is deleted and a successful response code is indicated.

Additionally, when the operation code is equal to 2, as indicated in FIG. 7h, then checks are performed on the CSSID and the specified I/O device. If these checks are satisfactory, then the device is deleted and a successful response code is indicated.

In addition to the above described commands that have been extended to support MCSS, the following commands are extended or provided including, for instance, a Store Channel Subsystem Characteristics Command, a Store Configuration component List command and a Store Domain Configuration Component List command, each of which is described below.

The Store Channel Subsystem Characteristics command is used to store information about the characteristics of the channel subsystem. The execution of the store channel subsystem characteristics command does not change any information contained in the channel subsystem. The store channel subsystem characteristics command is executed synchronously and is not interpretively executed.

Figure 14A:
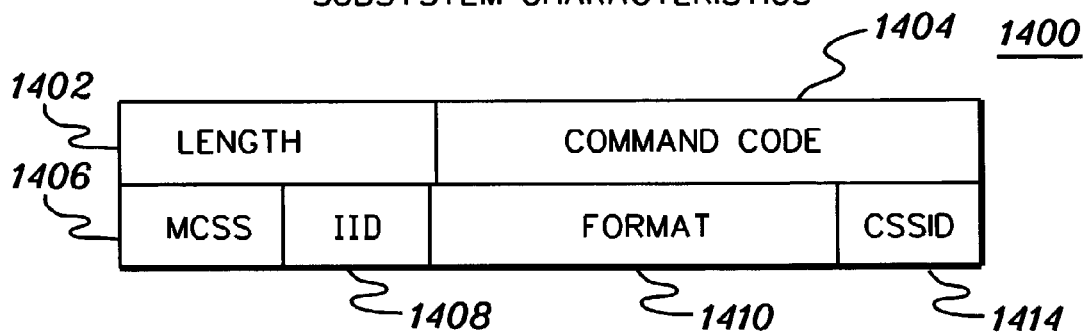
FIG. 14a depicts one embodiment of a request block for a store channel subsystem characteristics command, in accordance with an aspect of the present invention.

One embodiment of a request block for a store channel subsystem characteristics command is described with reference to FIG. 14a. In one example, a command request block 1400 for a store channel subsystem characteristics command includes, for instance:

(a) Length Field 1402: This field specifies the length of the command request block.

(b) Command Code 1404: This field specifies the store channel subsystem characteristics command.

(c) Multiple Channel Subsystem Bit (M) 1406: When the multiple channel subsystem facility is provided by the CPC, and when M is one, the CSSID field is checked for a valid CSSID. If valid, the value in the CSSID field becomes the effective CSSID. If not valid, an appropriate response code may be stored. When M is zero, the default CSSID is the effective CSSID and the CSSID field is zero.

(d) MIF Image Id (IID) 1408: The IID field includes zeros, as one example.

(e) Format 1410: The command request format field includes an unsigned integer whose value specifies the layout of the command request block.

(f) Channel Subsystem Id (CSSID) 1414: When the multiple channel subsystem facility is provided by the CPC, this field may specify the CSSID used to determine the channel subsystem image from which the channel subsystem characteristics are stored. The CSSID value is subject to range, existence, and authorization checking.

Figure 14B:
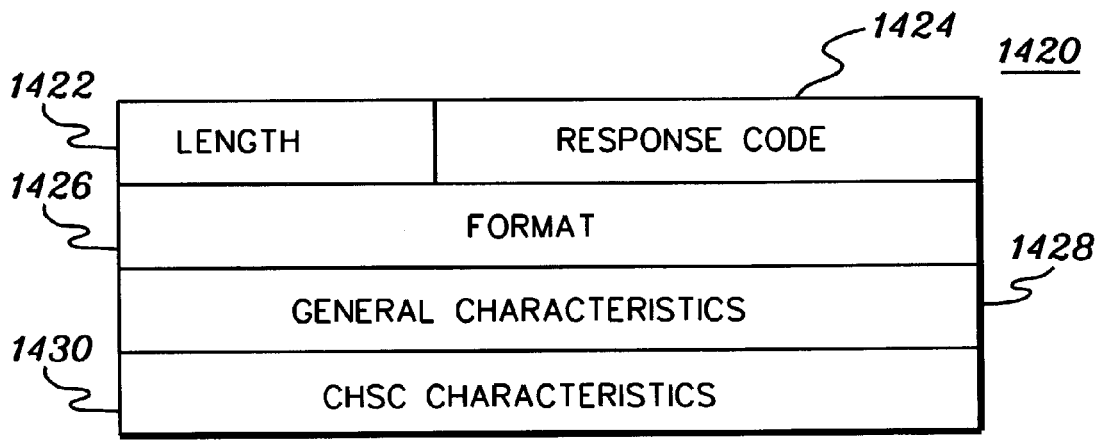
FIG. 14b depicts one embodiment of a response block for the store channel subsystem characteristic command, in accordance with an aspect of the present invention.

One embodiment of a response block for a store channel subsystem characteristics command is described with reference to FIG. 14b. In one example, a store channel subsystem characteristics response block 1420 includes the following:

(a) Length Field 1422: This field specifies the length of the command response code that is stored as the result of an attempt to execute the store channel subsystem characteristics command.

If a response code other than an indication of success is stored in the response code field, no characteristics information is stored as a result of the attempt to execute the command, and the length field specifies a length of, for instance, 8 bytes, for the command response block.

If a response code indicating success is stored in the response code field, both general characteristics and CHSC command characteristics are stored in the command response block. Thus, the length field specifies a command response block length of, for instance, 4,080 bytes.

(b) Response Code 1424: This field includes an unsigned binary integer that describes the results of the attempt to execute the store channel subsystem characteristics command.

(c) Format 1426: The command response format field includes an unsigned integer whose value specifies the layout of the command response block.

(d) General Characteristics 1428: If a response code indicating success is stored in the response code field, the general characteristics field includes information that specifies which of a variety of facilities are provided by the channel subsystem. Some facilities include, for instance, Cancel Subchannel; Multiple Image Facilities; CHSC Subchannel; Dynamic I/O Configuration Facilities; LPAR Mode; Fiber Channel Channel Facilities; Message Processor Channel Configuration Facility; Multiple Channel Subsystem Image Facility; Multiple Channel Subsystem Enhance Facility, etc. Although various facilities are described herein, other or different facilities may exist. When a bit of the general characteristics field corresponding to a particular facility is one, it indicates that that facility is provided.

In addition to an indication of the facilities, the general characteristics field also specifies the highest channel subsystem id whose value is in the range of 0-255.

(e) CHSC Characteristics 1430: If a successful response code is stored in the response code field, the CHSC characteristics field includes information that specifies whether certain CHSC commands are provided by the channel subsystem. Examples of these commands include, for instance, Change Channel Path Configuration, Change Control Unit Configuration, Change I/O Device Configuration, Store Configuration Component List, Store Domain Configuration Component List, and Set Domain Attributes, as well as others. When a bit of the CHSC characteristics field corresponding to a particular command is one, that command is provided.

Another command provided is a Store Configuration Component List command, which is used to obtain a configuration-component list containing identifiers of similar components in the I/O configuration. The type of components included in the configuration-component list is determined by a component-type parameter, which the program specifies in a request block. Execution of the store configuration component list command does not change any information contained in the channel subsystem. The store configuration component list command is executed synchronously and can be interpretively executed under SIE.

Figure 8A:
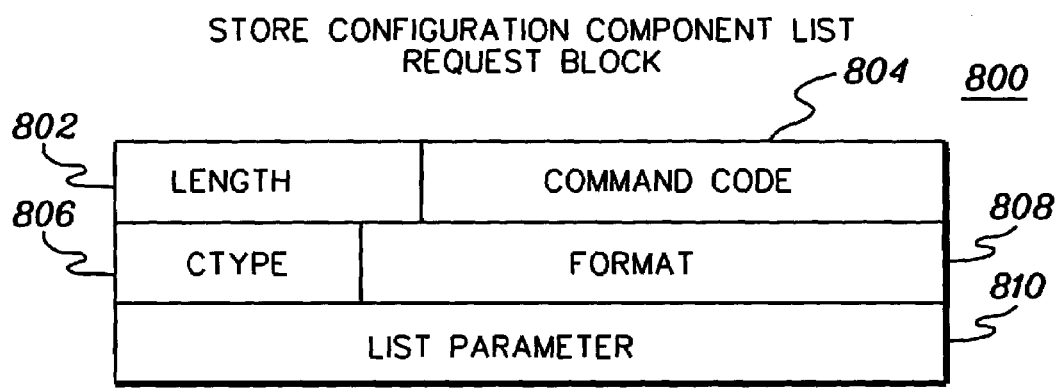
FIG. 8a depicts one embodiment of a request block for a store configuration component list command, in accordance with an aspect of the present invention.

One embodiment of a request block for a store configuration component list command is described with reference to FIG. 8a. In one example, a command request block 800 for a store configuration component list command includes:

(a) Length Field 802: This field specifies the length of the command request block.

(b) Command Code 804: This field specifies the store configuration component list command.

(c) Component Type (CTYPE) 806: This field contains a value that specifies the type of configuration component that is to be listed in the response block. Examples of CTYPE values are, for instance, as follows:

| CTYPE | List Description |
|---|---|
| 0 | Reserved |
| 1 | Control Units On a Channel Path: A list of the control units described in the I/O-configuration as being attached to the CHPID that is specified in the list-parameter field.<br>When the multiple channel subsystem facility is provided by the CPC, byte 0 of the list-parameter field is a flag byte and defined, for instance, as follows:<br>Bit  Meaning<br><br>0  Multiple Channel subsystem Bit (M): When bit 0 (M) is one, byte 4 ofthe list-parameter field is checked for a valid CSSID). If valid, the value in byte 4 becomes the effective CSSID. If not valid, an appropriate response code maybe stored. When M is zero, the default CSSFD is the effective CSSID and byte 4 is to be zero; otherwise a response code may be stored.<br>1–7  Reserved<br>When the multiple channel subsystem facility is provided, byte 4 of the list-parameter field may specify the CSSID of the target channel subsystem image that is used to locate the channel path specified in byte 7. The CSSID is subject to range and existence checking.<br>Bytes 1–3 and 5–6 of the list-parameter field have no meaning and are ignored. Byte 7 of the list-parameter field contains a CHPID value. |
| 2 | Channel-Path-Type Capability: A list of the types of channel-paths that can be attached to the central-processing complex (CPC).<br>The list entry for each type of channel path contains an indicator that specifies whether channel path measurements can be provided for that type of channel-path and an indicator that specifies whether the channel path can be configured as a spanned-channel path.<br>The contents of the list-parameter field have no meaning and are ignored. |
| 3 | Reserved. |
| 4 | Channel subsystem Images, MIF Images & Logical Partitions: When the multiple channel subsystem facility is provided: A matrix that indicates which channel subsystem images and associated MIF-images are configured to which logical partitions for a specified range of channel subsystem images.<br>Byte 0 of the list-parameter field specifies the first CSSID in the range for which information is requested. Byte 1 of the list-parameter field specifies the last CSSID in the range for which information is requested. Bytes 2–7 of the list-parameter field have no meaning and are ignored. |
| 5 | Channel subsystem Image Configuration Characteristics: When the multiple channel subsystem facility is provided: A matrix that indicates the validity and state of configured channel subsystem images and MIF images for a specified range of channel subsystem images.<br>Byte 0 of the list-parameter field specifies the first CSSID in the range for which information is requested. Byte 1 of the list-parameter field specifies the last CSSID in the range for which information is requested. Bytes 2–7 of the list parameter field have no meaning and are ignored. |
| 6 | I/O-Processor & Channel-Path: A list of the IOPs of the central processing complex (CPC) that relate to the CHPID that is specified in the list-parameter.<br>When the multiple channel subsystem facility is provided, byte 0 of the list-parameter field is a flag byte defined, for instance, as follows:<br>Bit  12/16 Meaning<br><br>0  Multiple Channel Subsystem Bit (M): When bit 0 is one, byte 4 of the list-parameter field is checked for a valid CSSID. If valid, the value in byte 4 becomes the effective CSSID. If not valid, an appropriate response code may be |

| CTYPE | List Description |
|---|---|
| | stored. When M is zero, the default CSSID is the effective CSSID and the CSSID field is zero; otherwise a response code may be stored.<br>1–7  Reserved<br>When the multiple channel subsystem facility is provided, byte 4 of the list-parameter field may specify the CSSID of the target channel subsystem image that is used to locate the channel path specified in byte 7. The CSSID is subject to range and existence checking.<br>Bytes 1–3 and 5–6 of the list-parameter have no meaning and are ignored. Byte 7 of the list-parameter contains a CHPID value. |

(d) Format (FMT) 808: The command request format field contains an unsigned integer whose value specifies the layout of the command request block.

(e) List Parameter 810: This field includes information that determines the scope of the component list for the specified component type.

The format and contents of the list-parameter field are dependent on the CTYPE value. The description of each CTYPE value includes a description of the contents of the list-parameter field, when that CTYPE value is specified.

Figure 8B:
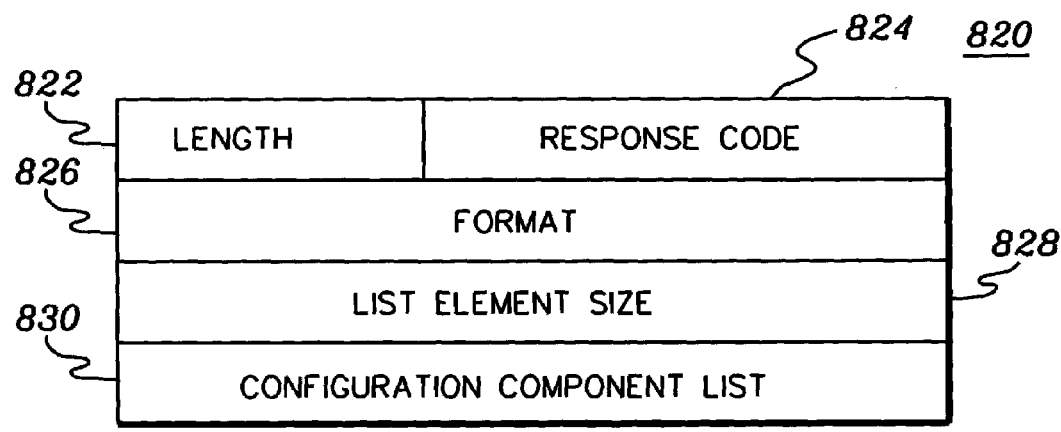
FIG. 8b depicts one embodiment of a response block for the store configuration component list command, in accordance with an aspect of the present invention.

One embodiment of a response block for a store configuration component list command is described with reference to FIG. 8b. In one example, a store configuration component list response block 820 includes the following:

(a) Length Field 822: This field specifies the length of the command-response code that is stored as a result of the attempt to execute the store configuration component list command.

If a response code other than an indication of success is stored in the response-code field, no component list elements are stored as a result of the attempt to execute the command, and length 822 specifies a length of, for instance, eight bytes for the command response block.

If a response code indicating success is stored in the response-code field, at least one component list element is stored in the command-response block as a result of the execution of the command, and length 822 specifies a command-response-block length of, for instance, 16 bytes plus the number of component list elements stored in the configuration-component list times the number of bytes specified in the list element size field.

(b) Response Code 824: This field includes an unsigned binary integer that describes the results of the attempt to execute the store configuration component list command.

(c) Format (FMT) 826: The command-response format field contains an unsigned integer whose value specifies the layout of the command-response block. The value of this field is, for instance, zero.

(d) List Element Size (ES) 828: This field contains an unsigned binary integer that specifies the number of bytes for each entry in the component list.

(e) Configuration Component List 830: When a response code indicating success is stored, one or more component list entries are stored in contiguous locations. The number of component list entries stored is determined by subtracting 16 bytes from the size of the command-response block and dividing the remainder by the ES value.

The size and format of the component list entries are dependent on the CTYPE value. The following is a description of the component list entries for each CTYPE value defined:

| CTYPE | Component List Entry |
|---|---|
| 1 | Control Units On a Channel Path: Each component list entry is, for instance, two bytes, and includes a control unit number that identifies a control unit.<br>The control unit numbers contained in adjacent component list entries have no special numerical arrangement with regard to each other. For example, the control unit numbers may or may not be in numerical sequence from one component list entry to the next. The collection of control unit numbers used to identify the collection of control units that are accessible on the specified channel path may not include every number in the numerical sequence defined by the lowest and highest control-unit numbers used. |
| 2 | Channel-Path-Type Capability: Each component list entry is, for instance, two bytes. The contents of each component list entry is described as follows:<br>When one, bit 0 of byte 0 indicates that the CPC can provide channel-path measurements for the specified channel-path type.<br>When zero, bit 0 indicates that the CPC does not provide channel-path measurements for the specified channel-path type.<br>When one, bit 1 indicates that a channel path of the specified type can be configured as a spanned-channel path. When zero, bit 0 indicates that the specified channel path cannot be configured as a spanned-channel path. |

-continued

| CTYPE | Component List Entry |
|---|---|
| | Byte 1 contains an unsigned binary integer that specifies a type of channel path that can be attached to the CPC. |
| 4 | Channel subsystem Images, MIF Images, & Logical Partitions: Each component-list entry is, for instance, 16 bytes. The contents and significance of each list entry is described, for instance, as follows: Each component-list entry represents configuration information pertaining to a single channel subsystem image. Component-list entries are stored in ascending channel subsystem-image ID (CSSID) sequence beginning with the first CSSID in the range specified in the command request block. The maximum number of configurable channel subsystem images is model dependent. The number of component-list entries returned by this command may be equal to or less than the number in the range specified in the command-request block. The issuing program can determine the number of returned component-list entries by using the technique described above. Each byte in a component list entry represents configuration information pertaining to a MIF image within the channel subsystem-image. Component-list-entry bytes are stored in ascending MIF-image ID (IID) sequence. If a component-list-entry byte contains a non-zero value, the value is a logical partition number (PN) and that partition is configured to the corresponding channel subsystem image and MIF image. If a component-list-entry byte contains a zero, then no partition is configured to the corresponding channel subsystem image and MIF image. In effect, this command returns a two-dimensional matrix of partition numbers that can be indexed by CSSID (row) and IID (column). Each component-list entry is a complete row of the matrix. |
| 5 | Channel subsystem Image Configuration Characteristics: Each component-list entry is, for instance, 16 bytes. The contents and significance of each list entry is described, for instance, as follows: Each component-list entry represents configuration characteristics information pertaining to a single channel subsystem image. Component-list entries are stored in ascending channel subsystem-image ID (CSSID) sequence beginning with the first CSSID in the range specified in the command-request block. The maximum number of configurable channel subsystem images is model dependent. The number of component-list entries returned by this command may be equal to or less than the number in the range specified in the command request block. The issuing program can determine the number of returned component-list entries by using the technique described above. Each byte in a component list entry is a flag byte that represents configuration characteristics information pertaining to a MIF image within the channel subsystem image. Component-list-entry bytes are stored in ascending MIF-image ID (IID) sequence. The meaning of each bit in each component-list entry flag byte is, for instance, as follows: |
| | Bit 0: When bit 0 is one, the corresponding channel subsystem image ID (CSSID) and MIF image ID (IID) are recognized as valid identifiers. When bit 0 is zero, the corresponding IID is not recognized as a valid identifier. |
| | Bits 1–2: When bit 0 is one, bits 1–2 contain a value which specifies the state of the channel subsystem image identified by the recognized CSSID and the MIF image identified by the recognized IID. The values are: |
| | Value CSSID.IID State |
| | 0 Not configured state: There is no logical-partition configured to the corresponding channel subsystem image and MIF image. |
| | 1 Configured state: A logical partition is configured to the corresponding channel subsystem image and MIF image. |
| | Bit 3–7: Bits 3–7 are reserved and are zero. If any of the flag bytes in a component-list entry indicates a MIF image ID that is recognized, the corresponding channel subsystem image ID is also recognized. Thus, if all of the flag bytes in a component-list entry indicate MIF image IDs that are not recognized, then the corresponding channel subsystem image ID is not recognized. |
| 6 | I/O Processor & Channel Path: Each component list entry is, for instance, 8 bytes. The content of each list entry is described, for instance, as follows: Byte 0 contains a validity mask that applies to bytes 1–7 of the |

| CTYPE | Component List Entry |
|---|---|
| | entry. Byte 0 is valid even though bit-position 0 is zero. Bit positions 1–7 correspond to bytes 1ndash7 of the entry. When a bit in positions 1–7 is one, the corresponding byte is valid. When a bit in positions 1–7 is zero, the corresponding byte is not valid. On a model where not all IOPs can access the specified channel path, byte 1 contains an IOP number of an IOP that may access the specified channel path during a start or other process. A valid IOP number is in the range of 0–255, as an example. Bytes 2–7 are reserved. |

Yet another command employed is a Store Domain Configuration Component List command, which is used to obtain a configuration-component list that includes identifiers of similar components within a domain of the I/O configuration. The store domain configuration component list command is provided, when the CPC is operating in LPAR mode.

For the purpose of this command description, the term "domain" refers to an explicit or implicit portion of the CPC, including a subset of the total collection of CPC I/O-configuration components. A logical partition or a logical partition cluster are examples of domains. A logical-partition cluster is a collection of the logical partitions within a CPC that are associated with the same logical partition cluster name for a given type of logical partition cluster.

The type of components included in the configuration-component list is determined by a component-type parameter, which the program specifies in the request block. The store domain configuration component list command is executed synchronously and is not interpretively executed under SIE.

Figure 9A:
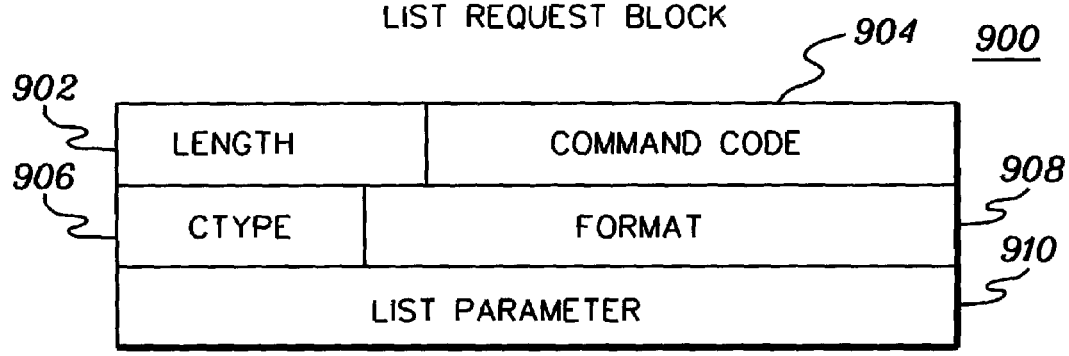
FIG. 9a depicts one embodiment of a request block for a store domain configuration component list command, in accordance with an aspect of the present invention.

One embodiment of a request block for a store domain configuration component list command is described with reference to FIG. 9a. In one example, a command request block 900 for a store domain configuration component list includes the following (a) Length Field 902: This field specifies the length of the command-request-block.

(b) Command Code 904: This field specifies the store domain configuration component list command.

(c) Component Type (CTYPE) 906: This field includes a value that specifies the type of configuration component that is to be listed in the response block.

Examples of CTYPE values are as follows:

| CTYPE | List Description |
|---|---|
| 0–2 | Reserved |
| 3 | Managed Channel Paths: The list of managed channel paths within a channel subsystem image, as described in the I/O-configuration definition for the logical partition cluster that includes the logical partition in which the issuing program is executing. When the multiple channel subsystem facility is provided, byte 0 of the list parameter field is a flag byte defined, for instance, as follows: |
| | 6/8 Bit 12/16 Meaning |
| | 0 Multiple Channel Subsystem Bit (M): When bit 0 (M) is one, byte 4 of the list-parameter field is checked for a valid CSSID. If valid, the value in byte 4 becomes the effective CSSID. If not valid, an appropriate response code may be stored. When M |

| CTYPE | List Description |
|---|---|
| | is zero, the default CSSID is the effective CSSID and byte 4 is to be zero. |
| 1–7 | Reserved. When the multiple channel subsystem facility is provided, byte 4 of the list-parameter field may specify the CSSID of the target channel subsystem image that is used to locate the managed channel paths being stored. The CSSID is subject to range, existence, and authorization checking. Bytes 1–3 and 5–7 have no meaning and are ignored. |

(d) Format (FMT) 908: The command-request format field contains an unsigned integer whose value specifies the layout of the command-request block.

(e) List Parameter 910: This field includes information that determines the scope of the component list for the specified component type. The format and contents of the list-parameter field are dependent on the CTYPE value. The description of each CTYPE value includes a description of the contents of the list-parameter field, when the CTYPE value is specified.

Figure 9B:
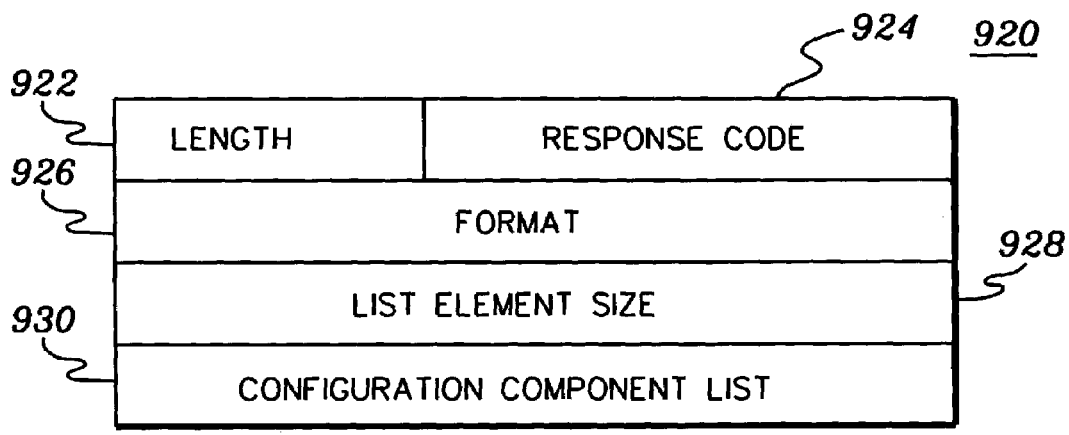
FIG. 9b depicts one embodiment of a response block for a store domain configuration component list command, in accordance with an aspect of the present invention.

In one example, a command response block 920 (FIG. 9b) for a store domain configuration component list command includes the following:

(a) Length Field 922: This field specifies the length of the command-response block. The length depends on the response code that is stored as a result of the attempt to execute the store domain configuration component list command.

If a response code other than a code indicating success is stored in the response-code field, no component list elements are stored as a result of the attempt to execute the command, and length 922 specifies a length of, for instance, eight bytes for the command response block.

If a response code indicating success is stored in the response-code field, at least one component list element is stored in the command response block as a result of the execution of the command, and length 922 specifies a command response block length of, for instance, 16 bytes plus the number of component list elements stored in the configuration-component list times the number of bytes specified in the ES field.

(b) Response Code 924: This field includes an unsigned binary integer that describes the results of the attempt to execute the store domain configuration component list command.

(c) Format (FMT) 926: The command response format field contains an unsigned integer whose value specifies the layout of the command-response block.

(d) List Element Size (ES) 928: This field includes an unsigned binary integer that specifies the number of bytes for each entry in the component list.

(e) Configuration Component List 930: When a response code indicating success is stored, one or more component list entries are stored in contiguous locations beginning at byte 0. The number of component list entries stored is determined by subtracting, for instance, 16 bytes from the size of the command-response block and dividing the remainder by the ES value.

The size and format of the component list entries are dependent on the CTYPE value. The following is a description of the component list entries for a defined CTYPE value:

| CTYPE | Component List Entry |
|---|---|
| 3 | Managed Channel Paths: Each component list entry is, for instance, 2 bytes. Byte 0 contains zero. Byte 1 contains a CHPID value specifying the CHPID within the target channel subsystem image of a managed channel path for the logical-partition cluster that includes the logical partition in which the issuing program is executing. |

Described above are various CHSC commands that support MCSS. In addition to the CHSC commands, applicable channel path reconfiguration Service Call Logical Processor (SCLP) commands are modified to be capable of operating on a specified channel subsystem image. For example, SCLP commands used for dynamic reconfiguration of channel paths are enhanced to be able to identify a particular channel subsystem image on which to operate. That is, the commands are changed to use either a default CSSID provided by the machine or a specified CSSID to designate the channel subsystem image that includes the channel paths.

One such command that has changed is a Configure Channel Path Command, which is used to add a channel path in the designated channel subsystem image to the configuration. The channel path to be added is designated by a CHPID specified in a command parameter of the command.

Figure 10A:
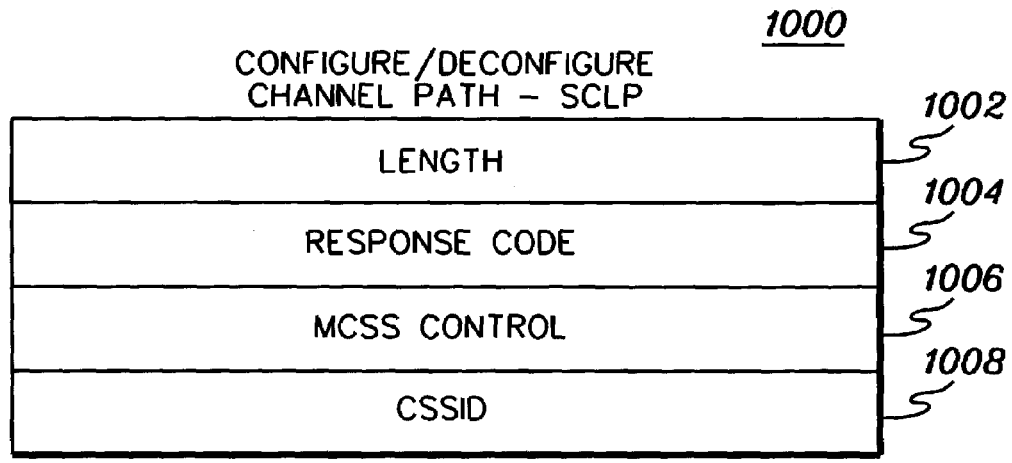
FIG. 10a depicts one embodiment of a control block associated with a configure channel path command and a deconfigure channel path command, in accordance with an aspect of the present invention.

One example of a control block associated with the command is described with reference to FIG. 10*a*. This control block is used for a request, as well as a response. A control block 1000 includes, for instance:

(a) Length Field 1002: This field indicates the length of the control block.

(b) Response Code 1004: This field includes a value that describes the results of the attempt to execute the command.

(c) MCSS Control 1006: This field indicates whether a designated channel subsystem image is specified in the control block.

(d) CSSID 1008: This field specifies the designated channel subsystem image that includes a channel path to be added to the configuration.

In one example, when the length field indicates that the control block is 8 bytes (or another chosen size), the designated channel subsystem image is the default channel subsystem image. When the control block length is greater than 8 bytes, the MCSS control specifies whether the designated channel subsystem image is specified in the control block. When the control block length is greater than 8 bytes and the MCSS control is zero, the designated channel subsystem image is the default channel subsystem image. When the control block length is greater than 8 bytes and the MCSS control is one, the channel subsystem image is designated by the channel subsystem image identifier in the control block.

In response to executing this command, subchannel images in a designated MIF image (provided, for example, in the SIE state description under which control the logical partition is running or in an associated control block) that are configured to the logical partition are changed by the command; other subchannel images are unchanged. A receiver message path is configured, if the message receiving option is enabled for the partition. Status indications pertaining to the CHPID are cleared and PAM bits for the CHPID are set to one at the subchannels; other subchannel indications are unchanged. No channel report word (CRW) is generated.

Another command that has changed to support MCSS is a Deconfigure Channel Path command, which is used to remove a channel path in the designated channel subsystem image from the configuration and place it in standby state. The channel path to be removed is designated by a CHPID specified in a command parameter of the command. A control block, similar to the one of FIG. 10*a*, is used with this command.

Similar to the configure command, when the control block length is 8 bytes (or another chosen size), the designated channel subsystem image is the default channel subsystem image. When the control block length is greater than 8 bytes, the MCSS control specifies whether the designated channel subsystem image is specified in the control block. When the control block length is greater than 8 bytes and the MCSS control is zero, the designated channel subsystem image is the default channel subsystem image. When the control block length is greater than 8 bytes and the MCSS control is one, the channel subsystem image is designated by the channel subsystem image identifier in the control block.

In response to executing this command, subchannel images in a designated MIF image that are configured to the logical partition are changed by the command; other subchannel images are unchanged. Status indications pertaining to the CHPID are cleared and PAM bits for the CHPID are reset to zero at the subchannels; other subchannel indications are unchanged. No channel report word is generated, even when the path is reset.

Figure 10B:
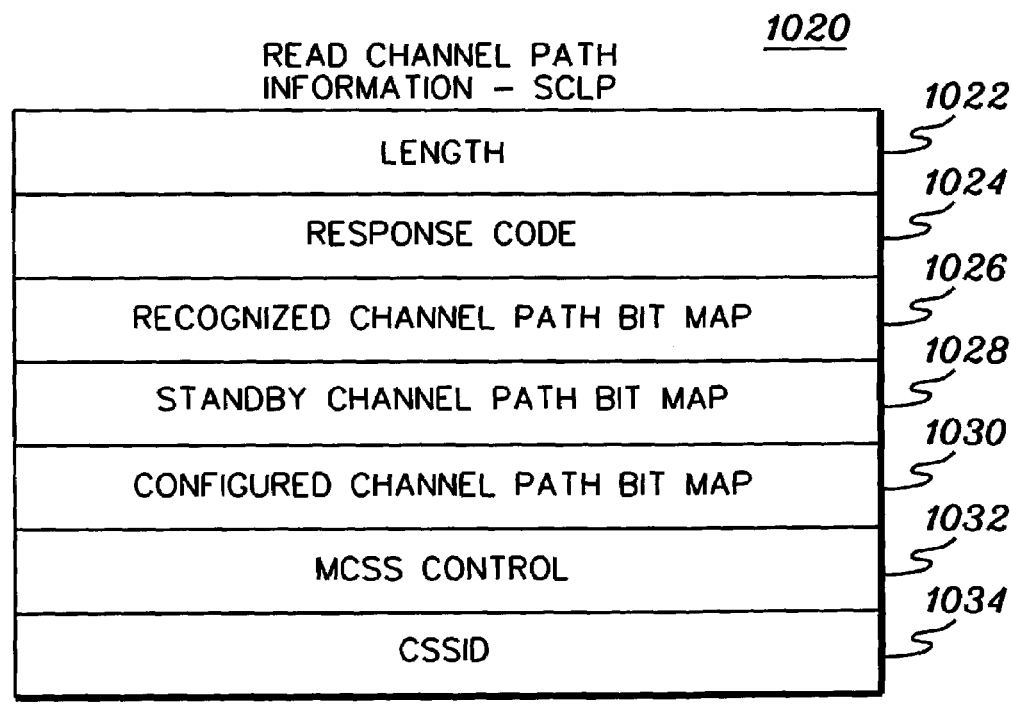
FIG. 10b depicts one embodiment of a control block associated with a read channel path information command, in accordance with an aspect of the present invention.

Yet another SCLP command that supports MCSS is a Read Channel Path Information command, which is used to store a plurality of maps of CHPID information for the designated channel subsystem image in a control block. One example of such a control block is described with reference to FIG. 10*b*.

In one example, a control block 1020 includes, for instance, the following:

(a) Length Field 1022: This field indicates the length of the control block.

(b) Response Code 1024: This field includes a value that describes the results of the attempt to execute the command.

(c) Recognized Channel Path Bit Map 1026: This map indicates whether a channel path is recognized. It includes a bit corresponding to each CHPID. If a bit is one, the CHPID is recognized.

(d) Standby Channel Path Bit Map 1028: This map indicates whether a channel path is in standby state and may be added to the configuration. If a bit corresponding to a CHPID is one, the channel path is in standby state and may be added to the configuration. Otherwise, it is reserved or already configured. If a CHPID is not recognized, its bit is zero.

(e) Configured Channel Path Bit Map 1030: This map indicates whether a channel path is in the configuration.

When a bit corresponding to a CHPID is one, the channel path is in the configuration. If a CHPID is not recognized, its bit is zero.

(f) MCSS Control 1032: This field indicates whether the channel subsystem image is specified in the control block.

(g) CSSID 1034: This field specifies a designated channel subsystem image for which the CHPID maps are provided.

In one example, when the length field indicates that the control block length is 104 bytes (or another chosen size), the designated channel subsystem image is the default channel subsystem image. When the control block length is greater than 104 bytes, the MCSS control specifies whether the designated channel subsystem image is specified in the control block. When the control block length is greater than 104 bytes and the MCSS control is zero, the designated channel subsystem image is the default channel subsystem image. When the control block length is greater than 104 bytes and the MCSS control is one, the channel subsystem image is designated by the channel subsystem image identifer in the control block.

Similar to the SCLP commands, LPAR hypervisor PCCALL functions that preform channel related configuration operations are enhanced to be able to identify a particular channel subsystem image on which to operate, and in some cases, to determine the scope of the function performed by the command (e.g., channel subsystem image-wide, logical partition, zone relocation, etc.). Examples of PCCALL functions that are changed include, for instance, Configure Channel Path, Deconfigure Channel Path and Image Reset. These functions are enhanced to specify a CSSID, which is used in conjunction with the MIF image id to identify a particular MIF image. The image reset function is further enhanced by adding a set of controls that determine whether the scope of the function is restricted to the specified channel subsystem image or is defined by other parameters, such as a partition number or relocation-zone number. Each of these function is described below.

The Configure Channel Path function is used to add a channel path or channel path image in the designated MIF image to the configuration. The channel path to be added is designated by a CHPID specified in a general register used by the function.

Figure 11A:
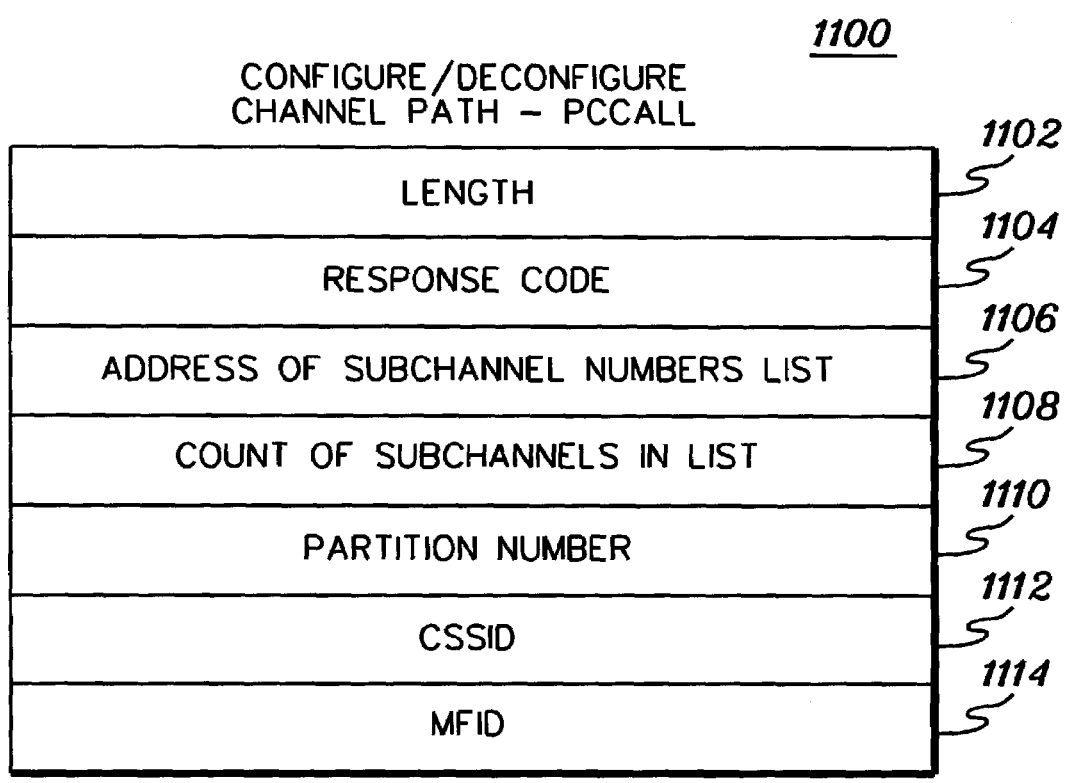
FIG. 11a depicts one embodiment of a control block associated with a configure channel path function and a deconfigure channel path function, in accordance with an aspect of the present invention.

One example of a control block associated with the function is described with reference to FIG. 11a. This control block is used for a request, as well as a response. A control lock 1100 includes, for instance:

(a) Length Field 1102: This field indicates the length of the control block.

(b) Response Code 1104: This field includes a value that describes the results of the attempt to execute the function.

(c) Address of Subchannel Numbers List 1106: This field indicates the address of a list of subchannel numbers.

(d) Count of Subchannels In List 1108: This field provides a count of the subchannels in the list designated by address 1106.

(e) Partition Number 1110: This field specifies a logical partition to which a designated channel path or channel path image is to be configured.

(f) CSSID 112: This field specifies a designated channel subsystem image id.

(g) MIFID 1114: This field specifies a designated MIF image that includes a channel path or channel path image to be added to the configuration.

The designated channel path or channel path image is configured to the logical partition designated in the control block. The MIF image is designated by the channel subsystem image identifier and the MIF image identifier in the control block.

In response to executing the function, for a shared channel path, subchannel images configured to the specified channel path or channel path image in the designated MIF image are changed. For an unshared channel path, the subchannel numbers list designated by the control block indicates which subchannels in the designated MIF image are affected. No channel report word is generated. Status indications pertaining to the CHPID are cleared and PAM bits for the CHPID are set to one; other subchannel indications are unchanged.

In addition to the configure command, a PCCALL Deconfigure Channel Path command is used to remove a channel path or channel path image in the designated MIF image from the configuration. The channel path to be removed is designated by a CHPID specified in a general register used by the function. A control block similar to the one of FIG. 11a is used with this function.

The designated channel path or channel path image of the MIF image is deconfigured from the logical partition designated by the control block. The MIF image is designated by the channel subsystem image identifier and the MIF image identifier in the control block.

In response to executing this function, for a shared channel path, subchannel images configured to the specified channel path or channel path image in the designated MIF image are changed. For an unshared channel path, the subchannel numbers list designated by the control block indicates which subchannels in the designated MIF image are affected.

PAM bits for the CHPID are reset to zeros in the subchannels. For an I/O channel path, indications of allegiance, control unit busy, or device busy that pertain to the path are cleared in the subchannels, similar to a channel path reset, except that no CRW is generated.

Another function enhanced for MCSS is an Image Reset PCCALL function, which signals the channel subsystem to reset a designated MIF image. The reset may affect channel paths, subchannels, among other I/O components (e.g., message vectors, authorization controls, etc.).

Figure 11B:
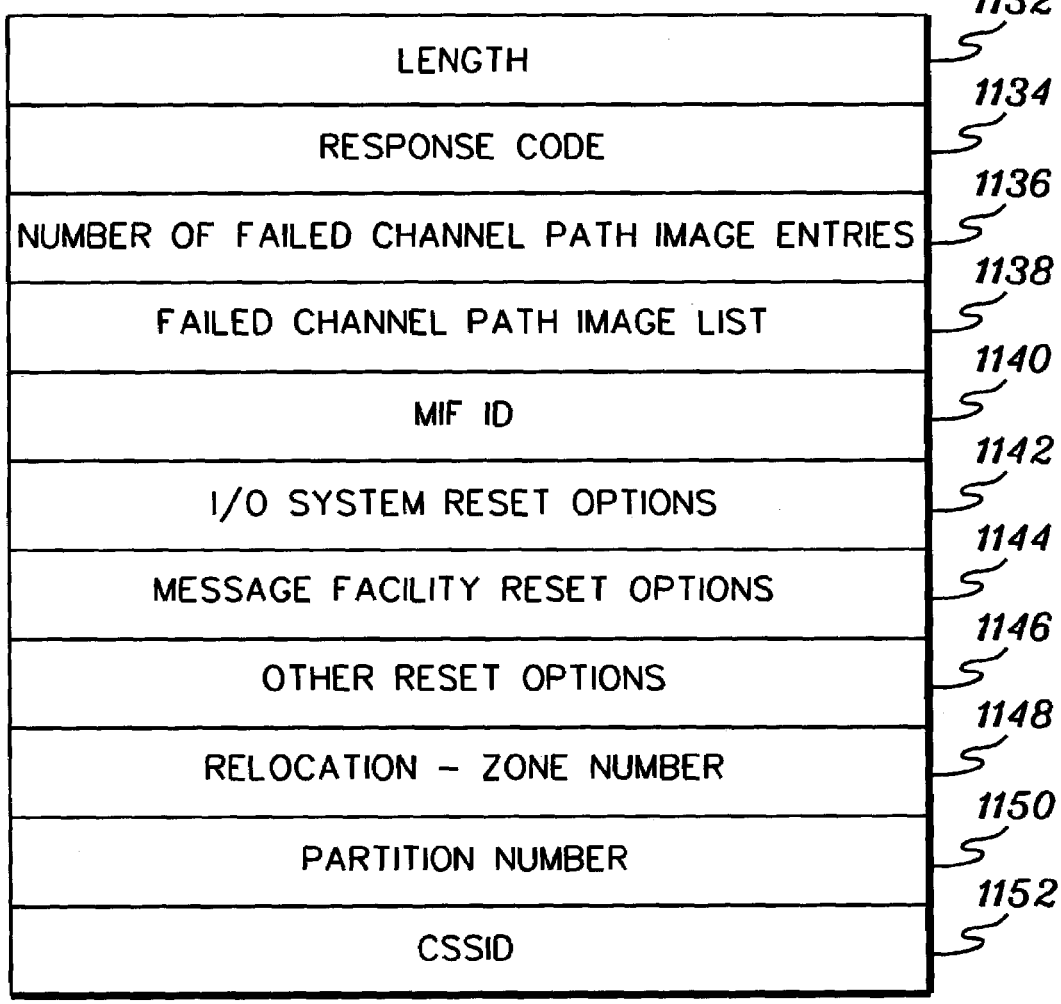
FIG. 11b depicts one embodiment of a control block associated with an image reset function, in accordance with an aspect of the present invention.

One example of a control block associated with the Image Reset function is described with reference to FIG. 11b. A control block 1130 includes, for instance:

(a) Length Field 1132: This field specifies the length of the control block.

(b) Response Code 1134: This field includes a value that describes the results of the attempt to execute the function.

(c) Number of Failed Channel Path Image Entry 1136: This field indicates the number of failed channel path image entries.

(d) Failed Channel Path Image List 1138: This field includes a list of CHPIDs for I/O channel path and message path images in the designated MIF image that could not be reset. The images are placed in a check stop or permanent error state.

(e) MIF Image Identifier 1140: This field specifies a designated MIF image to be reset.

(f) I/O System Reset Options 1142: This field provides one or more options to reset an I/O system. For instance, a TPF mode control is provided. When this control is one, it indicates that the TPF channel queuing, if installed, is enabled for the I/O channel path images on the designated MIF image. Otherwise, TPF queuing is disabled for the designated MIF image.

Another I/O system reset option is a deactivate option. When one, the deactivate option indicates that a deactivate function is performed; otherwise an activate function is performed.

The deactivate option is used, for instance, if the designated MIF image is no longer needed or not to be used until image reset for the designated MIF image is reissued. For example, when an operator deactivates a logical partition and its resources become available to other partitions. Deactivation releases logical path controls at control units configured to the channel path images in the designated MIF image, so that the controls may be used to establish connections to other MIF images.

The activate option is used, for instance, if a logical partition is IPLed by LPAR, or a system reset is performed for a logical partition with the intent of using it without an IPL. For example, to execute manually entered code.

(g) Message Facility Reset Option 1144: This field designates one or more options to be used to reset a message facility. For instance, an SCP-initiated reset option is provided. When one, no reset or image reset signal is sent on a message path in the designated MIF image, and if a reset relocation zone bound resources control of the other reset options (described below) is one, the channel subsystem state and fencing authority value for the designated relocation zone are unchanged. When this control is one, signals are sent, and if the reset relocation zone bound resources control is one, the fencing authority value for the designated relocation zone is set to zeros and the channel subsystem state for the designated relocation zone is set to the not-isolated state.

The SCP initiated reset option is used, for instance, when the designated MIF image is permitted to continue to receive and execute fencing commands. This occurs when the partition program issues an SCP initiated reset command.

(h) Other Reset Options 1146: This field includes one or more other reset options. For instance, a reset partition bound resources control is provided that governs the effect of image reset on resources associated with a logical partition. When this control is one, resources that are associated with the logical partition designated by a partition number in the control block are reset. When the reset partition bound resources control is zero, partition bound resources are not reset and the partition number is ignored. In one example, adjunct-processor queues are considered partition bound resources.

Another option is a reset relocation zone bound resources control that governs the effect of image reset on resources associated with a relocation zone. When the reset relocation zone bound resources control is one, resources that are associated with the relocation zone designated by the relocation zone number in the control block are reset. When this control is zero, resources associated with a relocation zone are not reset and the relocation zone number is ignored. Examples of relocation zone bound resources include, for instance, message vectors, adapter interruption facility controls and fencing controls.

(i) Relocation Zone Number 1148: This field indicates a number of a relocation zone.

(j) Partition Number 1150: This field designates a logical partition.

(k) CSSID 1152: This field designates a channel subsystem image. The MIF image is designated by the channel subsystem image identifier and the MIF image identifier in the control block.

Various actions are taken by the channel subsystem, when it resets the designated MIF image (referred to herein as the image reset function). When the image reset function is completed, a response code and a failed channel path images list are stored in the control block. Further, an image reset facility available channel report is made pending. The image reset facility available channel report can be used by the LPAR manager to determine which pending CRWs for the designated MIF image can be discarded and which are to be presented to the program that is subsequently executed in the logical partition associated with the image. No image reset facility available channel report is presented to a program in a logical partition, in one embodiment.

One resource affected by the image reset function is the adjunct processor. If the reset partition bound resources control is one, image reset performs an AP queue reset of each AP queue in the designated logical partition. An AP reset is performed, if the existing AP paths of the adjunct processor connect to AP queues in the designated logical partition, and no AP path of the AP connect to another logical partition.

Another resource affected is the authorized image. If the reset relocation zone bound resources control is one, and the SCP initiated reset control is zero, the authorization image for the designated relocation zone is reset. The fencing authority value for the designated relocation zone is set to zeros and the channel subsystem state for the designated relocation zone is set to the not-isolated state.

If the reset relocation zone bound resources control is one and the SCP initiated reset control is one, the authorization image for the designated relocation zone is unchanged.

A yet further resource affected by the image reset function are the channel path images. In response to an image reset function, the I/O channel path images configured to the designated MIF images are initialized. The manner in which they are reset is dependent on the type of channel path.

Another resource affected are the message path images. In response to an image reset function, message path images that are configured to the designated MIF image are initialized. This includes, for instance, sending the reset or image reset signal on a path and recognizing a valid response, if indicated by the SCP initiated reset control; and initializing channel subsystem controls for the message path image.

If the SCP initiated reset control is zero, a reset signal is sent on each receiver type message path having an image that is reset. Otherwise, no reset or image reset signal is sent on the path. If the SCP initiated reset control is zero, an image reset signal is sent on each shared sender type message path having an image that is reset. Otherwise, no reset or image reset signal is sent on the path.

Further, if the SCP initiated reset control is zero, a reset signal or image reset signal is sent on each unshared sender type message path having an image that is reset. Otherwise, no reset or image reset signal is sent on the path. When an image reset or reset signal is recognized, a response acknowledges the signal. The effect of image reset on the associated message path state indicators is undefined.

A further resource affected are the message vector images. If the reset relocation zone bound resources control is one, message vector images associated with the designated relocation zone are released. Local cache and list notification tokens associated with the designated relocation zone are invalidated, and the list notification global summary is reset. Otherwise, the local cache vector images and tokens, and the list notification vector images and tokens are unchanged.

When a local cache or list notification token is assigned for the designated relocation zone and then released, a token with identical contents is not reassigned until after an image reset with the reset relocation zone bound resources control set to one is completed for the designated relocation zone. (Local cache and list notification token are described in, one or more of the following, as examples: Elko et al., U.S. Pat. No. 5,317,739 entitled "Method And Apparatus For Coupling Data Processing Systems," issued May 31, 1994; and Elko et al., U.S. Pat. No. 5,537,574, entitled "Sysplex Shared Data Coherency Method," issued Jul. 16, 1996, each of which is hereby incorporated herein by reference in its entirety.)

A yet further resource affected by the image reset function are I/O subchannel images. I/O subchannel images configured to the designated MIF image are initialized. The subchannel images are initialized as for an I/O system reset performed when MIF is not installed, except that the following subchannel fields are not changed: interruption subclass code, enabled bit, relocation zone number, interruption zone number, and interruption interlock control bit, as examples.

Additionally, CHSC subchannel or ADM subchannel resources are affected. Those subchannels configured to the designated MIF image are initialized in a similar manner as an I/O subchannel image.

Yet further, message subchannel images are affected. If the reset message facility control is one, message subchannel images that are configured to the designated MIF image are initialized. Otherwise, no message subchannel images are initialized.

As described above, with the MCSS facility, thousands of channel paths are available for use. However, there is a constraint in allowing an operating system image to access more than 256 channel paths because of the prevalent usage of the 8-bit unique value called the channel path identifier. Thus, in accordance with an aspect of the present invention, a facility is provided, referred to herein as a Multiple Channel Subsystem Enhanced (MCSSE) facility, that enables an operating system image to access more than 256 channel paths, with minimum disruption to the operating system. For example, the MCSSE facility provides controls that allow an enhanced operating system image access to more than one channel subsystem image, while keeping the multiple channel subsystem construct transparent to operating system images that do not need the added I/O capacity or are not aware of more than one channel subsystem image. That is, without MCSSE, there still may be multiple channel subsystem images, but an operating system only has access to one image. With MCSSE, an operating system may access more than one image.

In one embodiment, the Multiple Channel Subsystem Enhanced facility provides a plurality of controls to an operating system image that enables that operating system image access to more than one channel subsystem image. In one example, these controls include:

1. An enablement control indicating whether the operating system image is authorized to access more than one channel subsystem image. If not, then the operating system image uses the default channel subsystem image. The initial state of the enablement control of each operating system image is the disabled stated. This enforces compatibility in that the operating system cannot access MCSSE features, and that asynchronous events produced by the CPC (e.g., CRW machine check, I/O-resource-accessibility notification) outside the single, default logical channel subsystem (a.k.a., channel subsystem image) are not presented to the operating system.

2. An authorization list indicating which channel subsystem images the operating system is allowed to access, if it is authorized to access more than one channel subsystem image.

3. An MIF extension specifying the implied MIF image identifier (IID) to be used by the operating system image in each channel subsystem that it is allowed to access.

An operating system explicitly enables the MCSSE facility to gain access to multiple channel subsystem images. The multiple channel subsystem image construct is transparent to an operating system that has not enabled the MCSSE facility. The default channel subsystem image is used for such an operating system image, and in this case, the operating system image does not specify a CSSID in its I/O request, rather the CSSID of the default channel subsystem image is specified by the hypervisor, when executing on behalf of the operating system image or by the machine when the operating system is being interpretively executed.

An operating system that has enabled the MCSSE facility may have access to more than one channel subsystem image. Such an operating system may explicitly specify a CSSID, or indicate that the default channel subsystem image is to be used. When the default channel subsystem image is to be used, the CSSID of the default channel subsystem image is specified by the hypervisor or SIE. When the operating system image explicitly specifies the CSSID, it is checked against the authorization vector (i.e., the CAV), and the I/O request is either authorized or rejected. For example, the CSSID is used as an index into the CAV. If the entry pointed to by the index is zero, the request is rejected, since the operating system is not authorized to use that CSS.

The authorization vector is initially established during configuration, and may be modified by dynamic I/O configuration commands. The MIF image identifier is implicitly specified (by the hypervisor or machine) for the default channel subsystem image and each channel subsystem image. The corresponding image identifier for each channel subsystem image is specified by configuration controls either at IML or by dynamic I/O configuration commands executed by an authorized program in the IOCDS.

In one embodiment, in order to enable MCSSE, a command is implemented using the Channel Subsystem Call (CHSC) instruction. In one example, this command is a Set Domain Attributes (SDA) command, which is used by an operating system to signal the CPC to enable MCSSE for the operating system image. When MCSSE is enabled, it is still possible to request I/O in the default channel subsystem image, but being enabled permits requests to also overtly specify a particular channel subsystem image (via its CSSID) in order to request I/O in such a specified channel subsystem image.

The set domain attributes command is used to convey information from a program to a channel subsystem. The scope of a domain is specifically stated for each individual operation that is defined. The operation code is used to specify the particular operation and associated data, when applicable to that operation. The domain for this operation encompasses the logical partition and all current and future channel subsystem images associated with the logical partition. In one example, the set domain attributes command is executed synchronously, and is not interpretively executed.

Figure 12A:
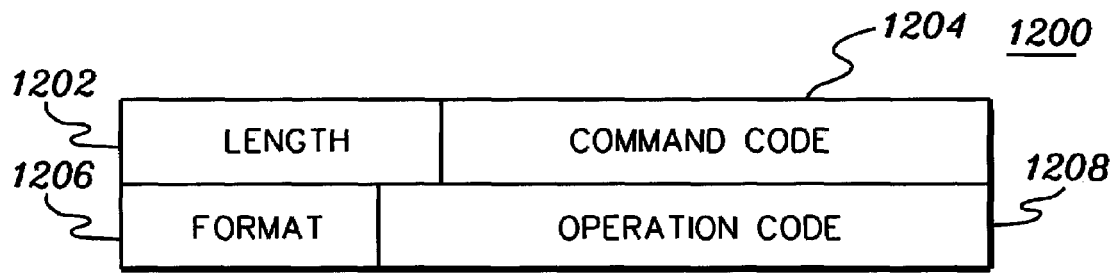
FIG. 12a depicts one embodiment of a request block for a set domain attributes command, in accordance with an aspect of the present invention.

One example of a command request block for the set domain attributes command is described with reference to FIG. 12a. In one example, a request block 1200 for a set domain attributes command includes the following:

(a) Length Field 1202: This field specifies the length of a command request block.

(b) Command Code 1204: This field specifies the set domain attributes command.

(c) Format (FMT) 1206: The command request format field includes an unsigned integer whose value species the layout of the command request block.

(d) Operation Code (OC) 1208: This field includes a value that specifies the operation that is to be performed. In one example, an operation code of zero enables the Multiple Channel Subsystem Enhanced (MCSSE) facility.

Figure 12B:
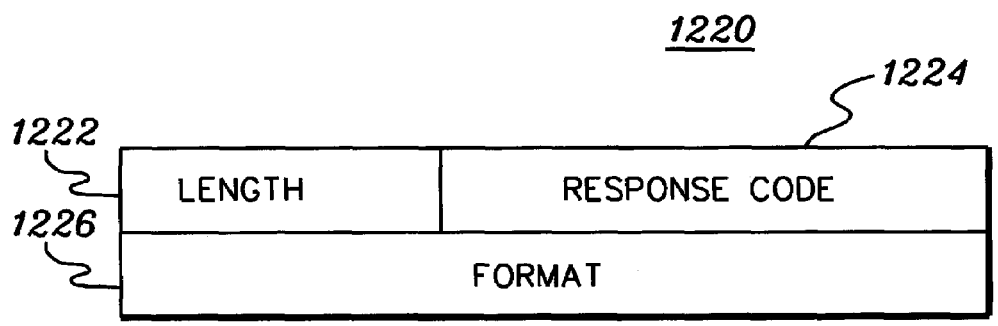
FIG. 12b depicts one embodiment of a response block for the set domain attributes command, in accordance with an aspect of the present invention.

One embodiment of a command response block for the set domain attributes command is described with reference to FIG. 12*b*. In one example, a command response block 1220 for the set domain attributes command includes the following fields:

(a) Length Field 1222: This field specifies the length of the command response block.

(b) Response code 1224: This field includes an unsigned integer that describes the results of the attempt to execute the set domain attributes command.

(c) Format 1226: The command response format field includes an unsigned integer whose value specifies the layout of the command response block.

When the Multiple Channel Subsystem Enhanced facility is provided by the CPC, then when the enable MCSSE operation is executed, the requesting logical partition is permitted to use a set of channel subsystem images, each member of the set including a CSSID and corresponding MIF image id (IID). The default CSSID and corresponding IID are maintained for a CHSC command that might use the default, even though the default also appears as a member of the set.

An internal action of the enable MCSSE operation that is indirectly observable by the requesting program is to establish in the SIE state description of the operating system image the CSSID authorization vector (CAV). In one example, the CAV is a string of one to 256 consecutive bytes. When the associated operating system specifies the CSSID, that CSSID value indexes into the CAV, and thus, points to a one byte entry. The entry, if zero, indicates that the corresponding CSSID is not authorized for use by the operating system image. If non-zero, the corresponding CSSID is authorized and the non-zero value is the associated MIF image identification to be used. This is how the execution time relationship of logical partition to CSS image to MIF image is determined. When the CAV does not exist (i.e., MCSSE is not enabled), the default CSSID and IID are determined from two fields in the SIE state description.

In one example, bits 1-28 of the 31-bit address of the CSSID-authorization vector are used to form the CSSID authorization vector origin (CAVO) of the SIE state description of the requesting virtual CPU. When the logical partition includes multiple virtual CPUs, the CAVO of each state description of each virtual CPU of the logical partition is changed in a coherent manner. Each such CAVO references either the same or equivalent CSSID-authorization vector.

The state control for the enablement is maintained by the LPAR hypervisor as state-description content and is subject to subsystem reset of the logical partition. For this operation, the LPAR hypervisor does not execute SDA on behalf of the logical partition.

In addition to the above, a Store Domain Configuration Attributes List (SDCAL) CHSC command is defined to return a list of information, where each list entry describes information about a particular channel subsystem image that is available to the operating system image. In one example, the first list entry is the default channel subsystem image. By using the list of channel subsystem images, the operating system can know the identification of the other channel subsystem images, thereby allowing for various other CHSC commands to be successfully executed in order to determine more about the extended parts of the I/O configuration definition associated with the operating system image.

The store domain configuration attributes list command is used to obtain a configuration attribute list containing identifiers of similar components within a domain of the I/O configuration. In one embodiment, the term domain refers to an explicit or implicit portion of the CPC, including a subset of the total collection of CPC I/O configuration components. A logical partition or a logical partition cluster are examples of domains. A logical partition cluster is a collection of the logical partitions within a CPC that are associated with the same logical partition cluster name for a given type of logical partition cluster.

The type of components included in the configuration attributes list is determined by an attribute type parameter, which the program specifies in the request block. Execution of the store domain configuration attributes list command does not change any information contained in the channel subsystem. In one example, the store domain configuration attributes list command is executed synchronously and is not interpretively executed.

Figure 13A:
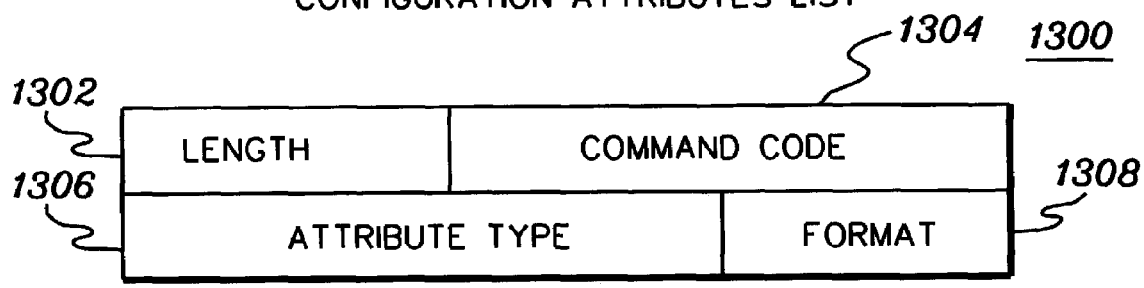
FIG. 13a depicts one embodiment of a request block for a store domain configuration attributes list command, in accordance with an aspect of the present invention.

One example of a command request block for the store domain configuration attributes list is described with reference to FIG. 13*a*. In one example, a request block 1300 includes the following fields.

(a) Length Field 1302: This field includes the length of the command request block.

(b) Command Code 1304: This field specifies the store domain configuration attributes list command.

(c) Attribute type (ATYPE) 1306: This field includes a value that specifies the type of configuration attribute that is to be listed in the response block. In one example, an attribute type value of Channel Subsystem Images, MIF Images and Logical Partitions is provided. When the multiple channel subsystem facility is provided, a list of channel subsystem image ids (CSSIDs), MIF images (IIDs), and the partition number (PN) that are described in the I/O configuration definition for the logical partition in which the issuing program is executing, is provided.

(d) Format 1308: The command request format field includes an unsigned integer whose value specifies the layout of the command request block.

Figure 13B:
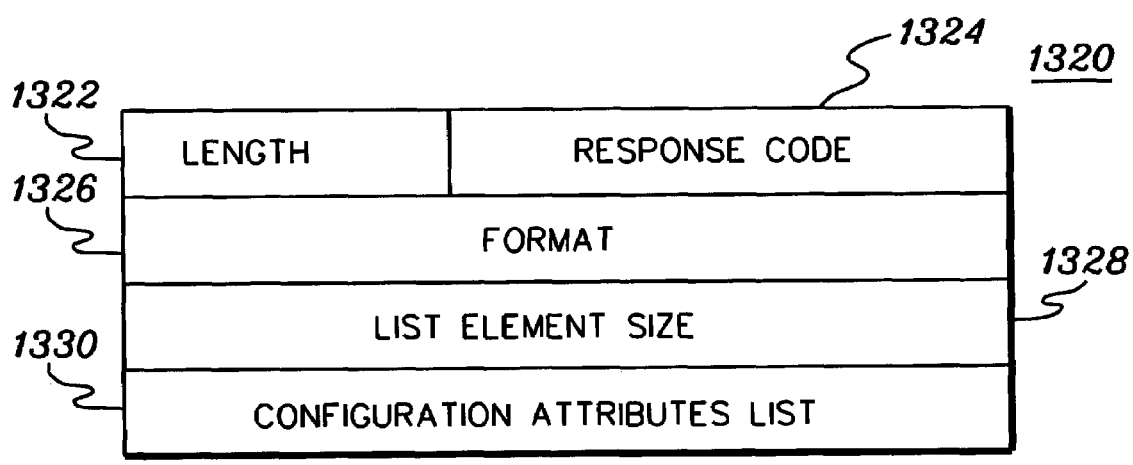
FIG. 13b depicts one embodiment of a response block for the store domain configuration attributes list command, in accordance with an aspect of the present invention.

In one example, a command response block 1320 (FIG. 13*b*) includes, for instance, the following:

(a) Length Field 1322: This field specifies the length of the command response block. The length depends on the response code that is stored as a result of the attempt to execute the store domain configuration attributes list command.

(b) Response Code 1324: This field includes an unsigned binary integer that describes the results of the attempt to execute the store domain configuration attributes list command.

(c) Format 1326: The command response format field includes an unsigned integer, whose value specifies the layout of the command response block.

(d) List Element Size 1328: This field includes an unsigned integer that specifies the number of bytes for each entry in the attribute list.

(e) Configuration Attributes List 1330: When a successful response code is stored, one or more attribute list entries are stored in contiguous locations of the configuration attributes list. The number of attribute list entries stored is determined, in one example, by subtracting 16 bytes from the size of the command response block and dividing the remainder by the list element size value. The size and format of the attribute list entries are dependent on the ATYPE value.

The following is a description of the attribute list entries for an ATYPE value that indicates Channel Subsystem Images, MIF images and Logical Partitions. Each attribute list entry has, for instance, 4 bytes. The contents of each list entry includes, for instance:

Byte 0 includes the CSSID of a channel subsystem image that is in the I/O configuration definition of the logical partition in which the issuing program is executing.

Byte 1 includes the IID of a MIF image that is configured in the channel subsystem image identified by the CSSID.

Byte 2 includes the partition number of the logical partition in which the issuing program is executing.

Byte 3 is reserved and contains zeros.

In one example, the first attribute list entry specifies the default CSSID and IID of the logical partition in which the issuing program is executing. Other than the first attribute list entry, the attribute list entries have no special numeric arrangement, i.e., they are not sorted and may or may not be in numeric sequence.

When multiple channel subsystem images are configured to the logical partition in which the issuing program is executing, multiple attribute list entries are returned. In one example, one is returned for each configured channel subsystem image, regardless of whether the logical partition is enabled to utilize multiple channel subsystem images.

The multiple logical channel subsystem (MCSS) facility extends the z/Architecture channel subsystem, so that it can provide up to, for instance, 65,536 channel paths in a manner that is transparent to many of the programs (i.e., the operating systems and their associated applications) operating in each of the configured logical partitions on the eServer zSeries system. This is accomplished by virtualizing the channel subsystem into multiple logical channel subsystems, as described herein. With such a virtualization, while a CSS is limited to a number of channels (e.g., 256), the total system (e.g., CPC) can support a much greater number of channels (e.g., 64 k). Further, with this virtualization, the only operating system programming that is aware of multiple logical channel subsystem images is that which deals directly with configuration of the logical channel subsystem images.

The provision of more than 256 channel paths advantageously enables the merging of workloads of multiple S/390 and eServer zSeries, such as G4, G5, G6, and z/900's, onto a single footprint. With MCCS support, such consolidations can be accomplished with minimum effort with respect to I/O capacity and I/O configuration planning. For example, the I/O configuration definitions for each of the smaller machines can simply be assigned to different logical channel subsystem definitions. Without MCSS, each I/O definition set for each of the machines to be merged would have to be integrated/merged together into a single I/O definition set in a manner that supports the specific I/O requirements of each of the predecessor systems being consolidated. As the I/O capacity planning process for any large scale server is often very costly in terms of planning, defining and measuring/testing, the ability to minimize this consolidation effort with as few I/O configuration restrictions as possible is beneficial. MCSS provides this ability with a minimal amount of disruption.

Prior to MCSS, the primary relationship connecting a program in a logical partition to an I/O device is Logical Partition→MIF image. The execution time relationship is one to one and the configuration choice is one to 256. A program in an LPAR specifies the subchannel number which, by virtue of MIF, becomes associated with the subchannel in the MIF image assigned to the logical partition and the channel path (of the one to eight channel paths possible per subchannel) providing connectivity to the device represented by the subchannel. The MIF image assignment is provided by the machine, so the program continues to observe the fiction of a wholly owned subchannel and set of channel paths. The machine understands, for a shared channel path, that the subchannel is really a subchannel image of the associated MIF image that is assigned to the shared channel path. On a maximally configured CPC, there are MIF images, but only one channel subsystem, one channel path set, and thus, only a maximum of 256 channel paths. MIF, by itself, does not increase the aggregate I/O bandwidth of a CPC.

With MCSS, the primary relationship connecting a program in a logical partition to an I/O device is Logical Partition→CSS→MIF image. For logical partition→CSS (logical channel subsystem), the execution time relationship is one to one and the configuration choice is one to 256, but then a second one to 256 relationship applies (i.e., CSS→MIF image), giving a net one to 65,536 configuration relationship choice. Furthermore, each CSS has a distinct channel path set, thus increasing the maximum number of channel paths from 256 to 65,536. The program continues to observe wholly-owned subchannels and channel paths, even though the machine provides two levels of indirection. It is solely the manager that needs to absorb the new structure.

The Logical Partition→CSS association is managed by authorized system configuration commands and by manual controls in the service processor, but the association is a hidden, default relationship to the software executing within the logical partition, other than the manager program. Similarly, the CSS→MIF image association is established as a default relationship, transparent to software executing within the logical partition, again except for the manager. It is this level of transparency that makes the channel path image appear to be a channel path, and a subchannel image appear to be a subchannel to the software.

Although various embodiments are described above, these are only examples. Additions, deletions and/or modifications to the above embodiments may be made, without departing from the spirit of aspects of the present invention. For instance, although a computing environment is described above, many different computing environments may be used. For example, a computing environment that includes a plurality of multiple channel subsystems may be provided. Also, the computing environment need not be based on the z/Architecture.

Further, as another example, depending on the channel path type, channel paths which are configured to a single channel subsystem image may be shared by any of the logical partitions that are associated with that channel subsystem image.

Moreover, even though in the above embodiments, a channel path includes a control unit, this is not necessary. A channel path may not connect to a control unit or a device, such as with Ethernet channel paths or channel to channel adapters, as examples. These types of channel paths, as well as others are within the spirit of one or more aspects of the present invention.

As yet another example, although an LPAR hypervisor is given as an example, other hypervisors, such as a virtual machine hypervisor, as well as others, may be used.

Further, in yet another embodiment, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

Additionally, although the commands described herein have various fields, more, less or different fields may be provided. Further, the positions of the fields in the figures do not necessarily indicate the position within a control block. Other positions may be available. Similarly, although in some contexts, specific bytes or bits are described, these are only examples. Other bytes or bits may be used. Further, other sizes may be provided.

Moreover, in addition to the commands described above, various other commands may be changed to support MCSS. These changes include, for instance, adding a CSSID value to further qualify a subchannel or channel path specification. Additionally, the LPAR hypervisor and SIE extensions, described herein, apply to coupling facility instructions used to access coupling facility channel paths.

As another example, although different configuration statements are provided with various parameters, the parameters and/or statements may be different and/or others may be added or deleted.

Likewise, in a further example, even though data structures of the IOCDS are described, there may be more, different or less structures and information within the structures can vary.

The above are only some examples of the enhancements/modifications that can be made. Others are possible, without departing from the spirit of one or more aspects of the present invention.

The use of the term "obtaining" in the claims includes, for instance, having, being provided, providing, creating, defining, configuring, etc. Further, hardware is used herein to include everything in the system that is not software, including, for instance, physical components, firmware, microcode, licensed internal code, etc.

The present invention can be included in an article of manufacture (e.g., one or more computer program products) having, for instance, computer usable media. The media has embodied therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of extending the functionality of channel subsystems, said method comprising:
   configuring a channel subsystem as a plurality of channel subsystem images, said channel subsystem directing a flow of information between one or more input/output devices and main storage coupled to the channel subsystem, and said channel subsystem comprising at least:
   a first channel subsystem image identified by a first channel subsystem image identifier, said first channel subsystem image appearing to a program as an independent channel subsystem and comprising a first set of one or more channel paths and a first multiple image facility (MIF) having one or more MIF images, each of said one or more MIF images being identified by a MIF image identifier (IID); and
   a second channel subsystem image identified by a second channel subsystem image identifier, said second channel subsystem image appearing to a program as an independent channel subsystem and comprising a second set of one or more channel paths and a second multiple image facility having one or more MIF images, each of said one or more MIF images of the second MIF being identified by a MIF image identifier (IID); and
   identifying a channel path of the first set of channel paths by a concatenation of the first channel subsystem image identifier and a first channel path identifier, and a channel path of the second set of channel paths by a concatenation of the second channel subsystem image identifier and a second channel path identifier.

2. The method of claim 1, wherein the program is an operating system of a logical partition coupled to the channel subsystem.

3. The method of claim 1, wherein the channel subsystem comprises a plurality of channel paths, and wherein the first channel subsystem image comprises a unique subset of the plurality of channel paths of the channel subsystem.

4. The method of claim 3, wherein a channel path of the plurality of channel paths is represented by a channel path identifier usable by the program, and wherein a size of the channel path identifier is not increased to accommodate the plurality of channel paths, even though the size is insufficient to identify the plurality of channel paths.

5. The method of claim 1, wherein it is transparent to one or more programs using the channel subsystem that the channel subsystem is configured as a plurality of channel subsystem images.

6. The method of claim 1, wherein a program to configure the channel subsystem is aware of the plurality of channel subsystem images, while one or more other programs have no knowledge of the plurality of channel subsystem images, but still exploit one or more channel subsystem images.

7. The method of claim 1, wherein a channel subsystem configured as one channel subsystem image is capable of having configured thereto up to a maximum of n channel paths, and wherein a channel subsystem configured as a plurality of channel subsystem images is capable of having configured thereto up to the maximum of n channel paths times the number of channel subsystem images in the plurality of channel subsystem images.

8. The method of claim 1, further comprising assigning multiple channel subsystem images of the plurality of channel subsystem images to a plurality of logical partitions coupled to the channel subsystem.

9. The method of claim 1, wherein at least one of the first channel subsystem image identifier and the second channel subsystem image identifier is used by one or more commands to access the channel subsystem.

10. The method of claim 1, wherein at least one of the first channel subsystem image identifier and the second channel subsystem image identifier is implicitly specified in a control block for use by one or more channel instructions, wherein a program operating in a logical partition coupled to the channel subsystem need not specify the channel subsystem image identifier.

11. The method of claim 10, wherein the channel subsystem image identifier is implicitly specified by a logical partition hypervisor coupled to the logical partition.

12. The method of claim 1, further comprising enabling the configuring of the channel subsystem.

13. The method of claim 1, wherein said configuring comprises defining a channel subsystem image of the plurality of channel subsystem images, said defining comprising at least one of:
specifying one or more channel paths of the channel subsystem image;
assigning one or more control units to the one or more channel paths of the channel subsystem image; and
indicating one or more input/output devices to be assigned to the one or more control units.

14. The method of claim 13, wherein a control unit of the one or more control units is further assigned to at least one other channel subsystem image of the plurality of channel subsystem images.

15. The method of claim 13, wherein an input/output device of the one or more input/output devices is associated with multiple channel subsystem images of the plurality of channel subsystem images.

16. A channel subsystem directing a flow of information between one or more input/output devices and main storage coupled to the channel subsystem, said channel subsystem comprising:
a memory, said memory comprising one or more control blocks to define;
a first channel subsystem image identified by a first channel subsystem image identifier, said first channel subsystem image appearing to a program as an independent channel subsystem and comprising a first set of one or more channel paths and a first multiple image facility (MIF) having one or more MIF images, each of said one or more MIF images being identified by a MIF image identifier (IID), wherein a channel path of the first set of channel paths is identified by a concatenation of the first channel subsystem image identifier and a first channel path identifier; and
a second channel subsystem image identified by a second channel subsystem image identifier, said second channel subsystem image appearing to a program as an independent channel subsystem and comprising a second set of one or more channel paths and a second multiple image facility having one or more MIF images, each of said one or more MIF images of the second MIF being identified by a MIF image identifier (IID), wherein a channel path of the second set of channel paths is identified by a concatenation of the second channel subsystem image identifier and a second channel path identifier.

17. The system of claim 16, wherein the program is an operating system of a logical partition coupled to the channel subsystem.

18. The system of claim 16, wherein the channel subsystem comprises a plurality of channel paths, and wherein the first channel subsystem image comprises a unique subset of the plurality of channel paths of the channel subsystem.

19. The system of claim 18, wherein a channel path of the plurality of channel paths is represented by a channel path identifier usable by the program, and wherein a size of the channel path identifier is not increased to accommodate the plurality of channel paths, even though the size is insufficient to identify the plurality of channel paths.

20. The system of claim 16, wherein it is transparent to one or more programs using the channel subsystem that the channel subsystem is configured as a plurality of channel subsystem images.

21. The system of claim 16, wherein a program to configure the channel subsystem is aware of the plurality of channel subsystem images, while one or more other programs have no knowledge of the plurality of channel subsystem images, but still exploit one or more channel subsystem images.

22. The system of claim 16, wherein a channel subsystem configured as one channel subsystem image is capable of having configured thereto up to a maximum of n channel paths, and wherein a channel subsystem configured as a plurality of channel subsystem images is capable of having configured thereto up to the maximum of n channel paths times the number of channel subsystem images in the plurality of channel subsystem images.

23. The system of claim 16, further comprising means for assigning multiple channel subsystem images of the plurality of channel subsystem images to a plurality of logical partitions coupled to the channel subsystem.

24. The system of claim 16, wherein at least one of the first channel subsystem image identifier and the second channel subsystem identifier is used by one or more commands to access the channel subsystem.

25. The system of claim 16, wherein at least one of the first channel subsystem image identifier and the second channel subsystem image identifier is implicitly specified in a control block for use by one or more channel instructions, wherein a program operating in a logical partition coupled to the channel subsystem need not specify the channel subsystem image identifier.

26. The system of claim 25, wherein the channel subsystem image identifier is implicitly specified by a logical partition hypervisor coupled to the logical partition.

27. The system of claim 16, further comprising means for enabling the configuring of the channel subsystem.

28. The system of claim 16, wherein said means for configuring comprises means for defining a channel subsystem image of the plurality of channel subsystem images, said means for defining comprising at least one of:
means for specifying one or more channel paths of the channel subsystem image;
means for assigning one or more control units to the one or more channel paths of the channel subsystem image; and
means for indicating one or more input/output devices to be assigned to the one or more control units.

29. The system of claim 28, wherein a control unit of the one or more control units is further assigned to at least one other channel subsystem image of the plurality of channel subsystem images.

30. The system of claim 28, wherein an input/output device of the one or more input/output devices is associated with multiple channel subsystem images of the plurality of channel subsystem images.

31. An input/output subsystem directing a flow of information between one or more input/output devices and main storage coupled to the input/output subsystem, said input/output subsystem comprising:
 a memory, said memory comprising one or more control blocks to define;
 a first input/output subsystem image identified by a first input/output subsystem image identifier, said first input/output subsystem image appearing to a program as an independent input/output subsystem and comprising a first set of one or more input/output paths and a first multiple image facility (MIF) having one or more MIF images, each of said one or more MIF images being identified by a MIF image identifier, wherein an input/output path of the first set of input/output paths is identified by a concatenation of the first input/output subsystem image identifier and a first input/output path identifier; and
 a second input/output subsystem image identified by a second input/output subsystem image identifier, said second input/output subsystem image appearing to a program as an independent input/output subsystem and comprising a second set of one or more input/output paths and a second multiple image facility having one or more MIF images, each of said one or more MIF images of the second MIF being identified by a MIF image identifier (IID), wherein an input/output path of the second set of channel paths is identified by a concatenation of the second input/output subsystem image identifier and a second input/output path identifier.

32. At least one program storage device readable by a machine embodying at least one program of instructions executable by the machine to perform a method of extending the functionality of channel subsystems, said method comprising:
 configuring a channel subsystem as a plurality of channel subsystem images, said channel subsystem directing a flow of information between one or more input/output devices and main storage coupled to the channel subsystem, and said channel subsystem comprising at least:
 a first channel subsystem image identified by a first channel subsystem image identifier, said first channel subsystem image appearing to a program as an independent channel subsystem and comprising a first set of one or more channel paths and a first multiple image facility (MIF) having one or more MIF images, each of said one or more MIF images being identified by a MIF image identifier (IID); and
 a second channel subsystem image identified by a second channel subsystem image identifier, said second channel subsystem image appearing to a program as an independent channel subsystem and comprising a second set of one or more channel paths and a second multiple image facility having one or more MIF images, each of said one or more MIF images of the second MIF being identified by a MIF image identifier (IID); and
 identifying a channel path of the first set of channel paths by a concatenation of the first channel subsystem image identifier and a first channel path identifier, and a channel path of the second set of channel paths by a concatenation of the second channel subsystem image identifier and a second channel path identifier.

33. The at least one program storage device of claim 32, wherein the program is an operating system of a logical partition coupled to the channel subsystem.

34. The at least one program storage device of claim 32, wherein the channel subsystem comprises a plurality of channel paths, and wherein the first channel subsystem image comprises a unique subset of the plurality of channel paths of the channel subsystem.

35. The at least one program storage device of claim 34, wherein a channel path of the plurality of channel paths is represented by a channel path identifier usable by the program, and wherein a size of the channel path identifier is not increased to accommodate the plurality of channel paths, even though the size is insufficient to identify the plurality of channel paths.

36. The at least one program storage device of claim 32, wherein it is transparent to one or more programs using the channel subsystem that the channel subsystem is configured as a plurality of channel subsystem images.

37. The at least one program storage device of claim 32, wherein a program to configure the channel subsystem is aware of the plurality of channel subsystem images, while one or more other programs have no knowledge of the plurality of channel subsystem images, but still exploit one or more channel subsystem images.

38. The at least one program storage device of claim 32, wherein a channel subsystem configured as one channel subsystem image is capable of having configured thereto up to a maximum of n channel paths, and wherein a channel subsystem configured as a plurality of channel subsystem images is capable of having configured thereto up to the maximum of n channel paths times the number of channel subsystem images in the plurality of channel subsystem images.

39. The at least one program storage device of claim 32, wherein said method further comprises assigning multiple channel subsystem images of the plurality of channel subsystem images to a plurality of logical partitions coupled to the channel subsystem.

40. The at least one program storage device of claim 32, wherein at least one of the first channel subsystem image identifier and the second channel subsystem image identifier is used by one or more commands to access the channel subsystem.

41. The at least one program storage device of claim 32, wherein at least one of the first channel subsystem image identifier and the second channel subsystem image identifier is implicitly specified in a control block for use by one or more channel instructions, wherein a program operating in a logical partition coupled to the channel subsystem need not specify the channel subsystem image identifier.

42. The at least one program storage device of claim 41, wherein the channel subsystem image identifier is implicitly specified by a logical partition hypervisor coupled to the logical partition.

43. The at least one program storage device of claim 32, wherein said method further comprises enabling the configuring of the channel subsystem.

44. The at least one program storage device of claim 32, wherein said configuring comprises defining a channel subsystem image of the plurality of input/output subsystem images, said defining comprising at least one of:
  specifying one or more input/output paths of the channel subsystem image;
  assigning one or more control units to the one or more channel paths of the channel subsystem image; and
  indicating one or more input/output devices to be assigned to the one or more control units.

45. The at least one program storage device of claim 44, wherein a control unit of the one or more control units is further assigned to at least one other channel subsystem image of the plurality of channel subsystem images.

46. The at least one program storage device of claim 44, wherein an input/output device of the one or more input/output devices is associated with multiple channel subsystem images of the plurality of channel subsystem images.

* * * * *